United States Patent
Bird et al.

(10) Patent No.: US 7,715,032 B2
(45) Date of Patent: May 11, 2010

(54) BULK COMMUNICATIONS PROCESS USING MULTIPLE DELIVERY MEDIA

(75) Inventors: Nicholas Rowland Bird, Bilgola Plateau (AU); Kevin Bryan Levine, North Bondi (AU); Robert Silver, Queenscliff (AU); Michael Robert Stewart, Glebe (AU); Alexander John Omillian, Surry Hills (AU); Paul Huntley Ginns, Newtown (AU); Michael Markham, Turramurra (AU)

(73) Assignee: ConnXion Ventures Limited, Sydney (AU)

( * ) Notice: Subject to any disclaimer, the term of this patent is extended or adjusted under 35 U.S.C. 154(b) by 1112 days.

(21) Appl. No.: 10/523,153

(22) PCT Filed: Jul. 29, 2003
(Under 37 CFR 1.47)

(86) PCT No.: PCT/AU03/00954

§ 371 (c)(1),
(2), (4) Date: Oct. 6, 2005

(87) PCT Pub. No.: WO03/060452

PCT Pub. Date: Jul. 24, 2003

(65) Prior Publication Data

US 2008/0278740 A1    Nov. 13, 2008

(30) Foreign Application Priority Data

Jul. 29, 2002    (AU) .............................. 2002950435

(51) Int. Cl.
*G06F 15/16* (2006.01)
(52) U.S. Cl. ........................ 358/1.15; 358/450; 709/203
(58) Field of Classification Search ................ 358/1.15, 358/1.12, 1.13, 1.18, 450; 709/14, 203
See application file for complete search history.

(56) References Cited

U.S. PATENT DOCUMENTS 5,892,909 A    4/1999    Grasso et al.

(Continued)

FOREIGN PATENT DOCUMENTS

EP    1 126 394 A1    8/2001

(Continued)

OTHER PUBLICATIONS

Yeo, C. K., Hui, S. C., Soon, I. Y. and Lau, C. T., A unified messaging system on the Internet, Microprocessors and Microsystems, vol. 24, No. 10, pp. 523-530, IPC Business Press Ltd., London, GB.
Japanese Decision of Rejection dated Aug. 18, 2009 (with English Translation).

*Primary Examiner*—Chan S Park
(74) *Attorney, Agent, or Firm*—Fitch, Even, Tabin & Flannery

(57) ABSTRACT

A method (100), a system and, a computer program product for bulk communication of information to recipients via multiple delivery media are disclosed. The media include facsimile, email, surface mail, SMS messaging, and archiving (and is adapted for new media types in the future). A single interface is used to receive information (106, 108, 110) for distribution including one or more template documents (110) and data (106) specific to each recipient. At least one document based on the received information (106, 108, 110) is transmitted using a specified delivery media (144, 150, 156, 162, 168) for each recipient based on the recipients' delivery preferences (122, 176). Escalating (172, 178) transmission of the document may occur using a different delivery media for any recipients for whom transmission by the specified delivery media fails. The escalating step (172, 178) may depend upon status information (176) from a carrier regarding delivery of the document to each recipient.

23 Claims, 54 Drawing Sheets

U.S. PATENT DOCUMENTS

| | | |
|---|---|---|
| 6,446,115 B2 * | 9/2002 | Powers .................. 709/206 |
| 7,076,533 B1 * | 7/2006 | Knox et al. .............. 709/217 |
| 2002/0087704 A1 | 7/2002 | Chesnais et al. |
| 2002/0184086 A1 * | 12/2002 | Linde ..................... 705/14 |
| 2003/0065779 A1 * | 4/2003 | Malik et al. ............. 709/225 |

FOREIGN PATENT DOCUMENTS

| | | |
|---|---|---|
| EP | 1 130 869 A1 | 9/2001 |
| JP | 6125358 A | 5/1994 |
| JP | 09-233216 | 9/1997 |
| JP | 10304006 A | 11/1998 |
| JP | 2000284937 A | 10/2000 |
| JP | 2001237873 A | 8/2001 |
| JP | 2001331745 A | 11/2001 |
| JP | 2002025828 A | 1/2002 |
| JP | 2002-057837 | 2/2002 |
| JP | 2003288311 A | 10/2003 |
| WO | 98/32272 A1 | 7/1998 |
| WO | 99/37070 A1 | 7/1999 |
| WO | WO 02/086669 A2 | 10/2002 |

* cited by examiner

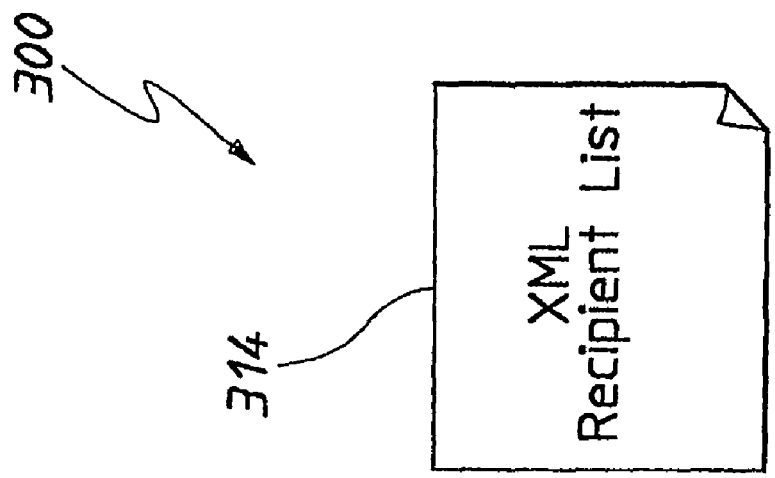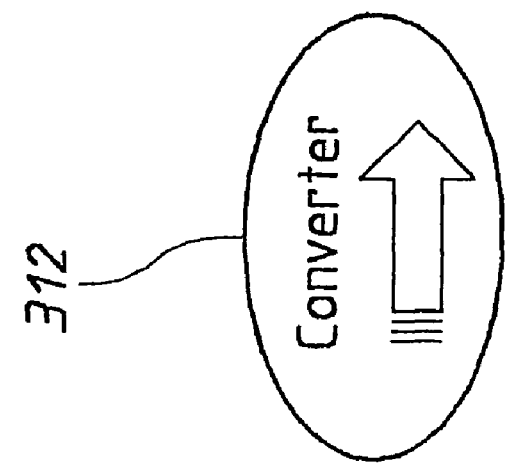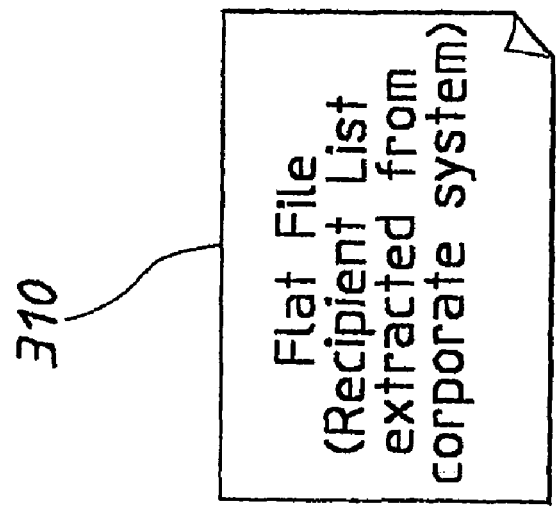
FIG. 3

```
<?xml version="1.0" encoding="UTF-8"?>
<xsd:schema xmlns:xs="http://www.w3.org/2001/XMLSchema" xmlns:xsd="http://www.w3.org/2001/XMLSchema">
  <xsd:element name="recipient-list">
    <xsd:complexType>
      <xsd:sequence>
        <xsd:element name="recipient" minOccurs="0" maxOccurs="unbounded">
          <xsd:complexType>
            <xsd:sequence>
              <xsd:element name="personal-details">
                <xsd:complexType>
                  <xsd:sequence>
                    <xsd:element name="title" type="xsd:string"/>
                    <xsd:element name="firstname" type="xsd:string"/>
                    <xsd:element name="lastname" type="xsd:string"/>
                    <xsd:element name="address" type="xsd:string"/>
                    <xsd:element name="city-country" type="xsd:string"/>
                    <xsd:element name="department" type="xsd:string"/>
                    <xsd:element name="emailaddress" type="xsd:string"/>
                  </xsd:sequence>
                </xsd:complexType>
              </xsd:element>
```

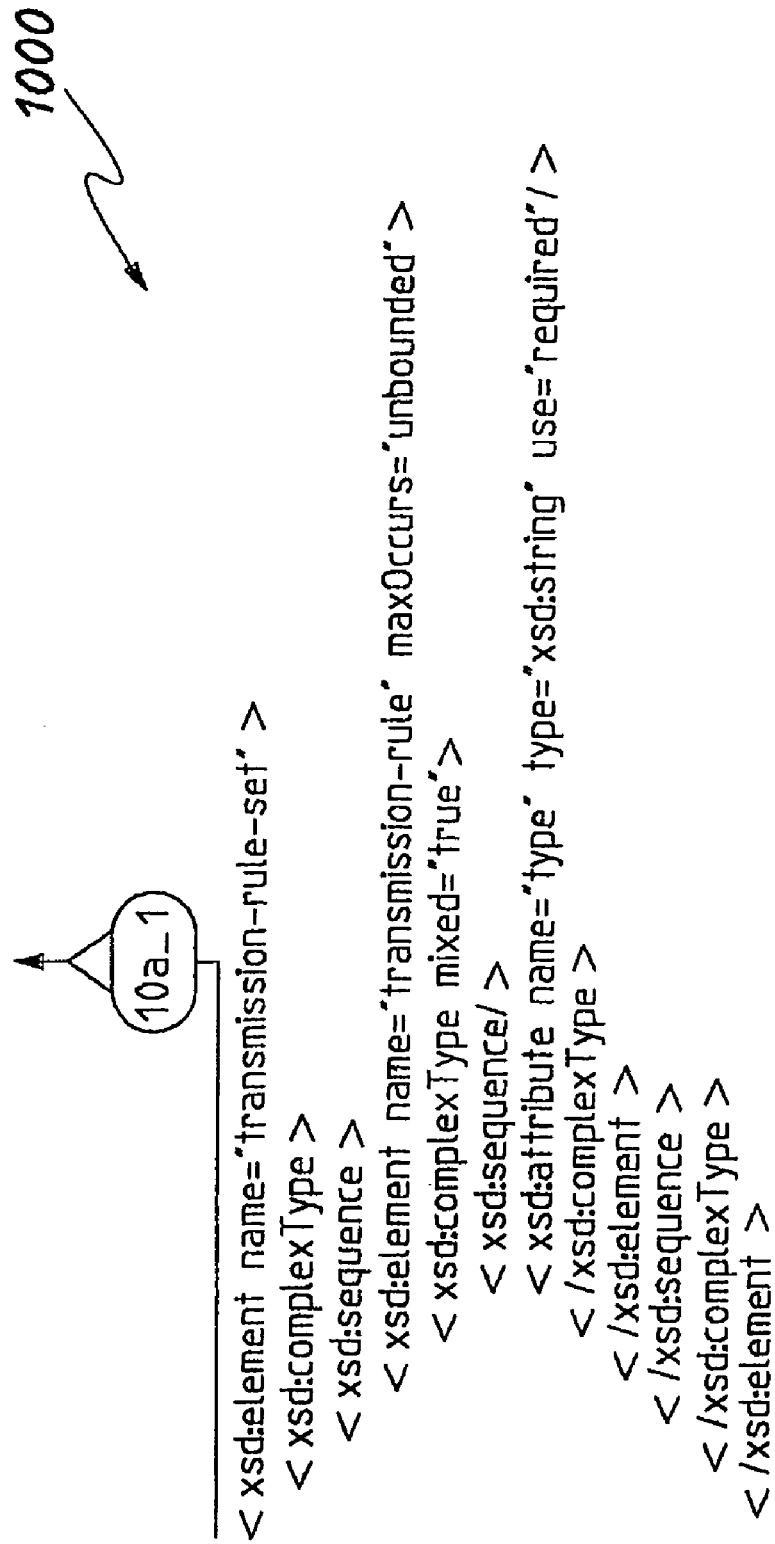
FIG. 10a_2

```
<xsd:element name="media-set">
  <xsd:complexType>
    <xsd:sequence>
      <xsd:element name="media-type" maxOccurs="unbounded">
        <xsd:complexType>
          <xsd:sequence>
            <xsd:element name="email-address" type="xsd:string"/>
            <xsd:element name="surface-mail-address" minOccurs="0">
              <xsd:complexType>
                <xsd:sequence>
                  <xsd:element name="street-address" minOccurs="0"/>
                                                     type="xsd:string"/>
                  <xsd:element name="suburb" type="xsd:string"/>
                  <xsd:element name="state" type="xsd:string"/>
                  <xsd:element name="country" type="xsd:string"/>
                  <xsd:element name="postcode" type="xsd:string"/>
```

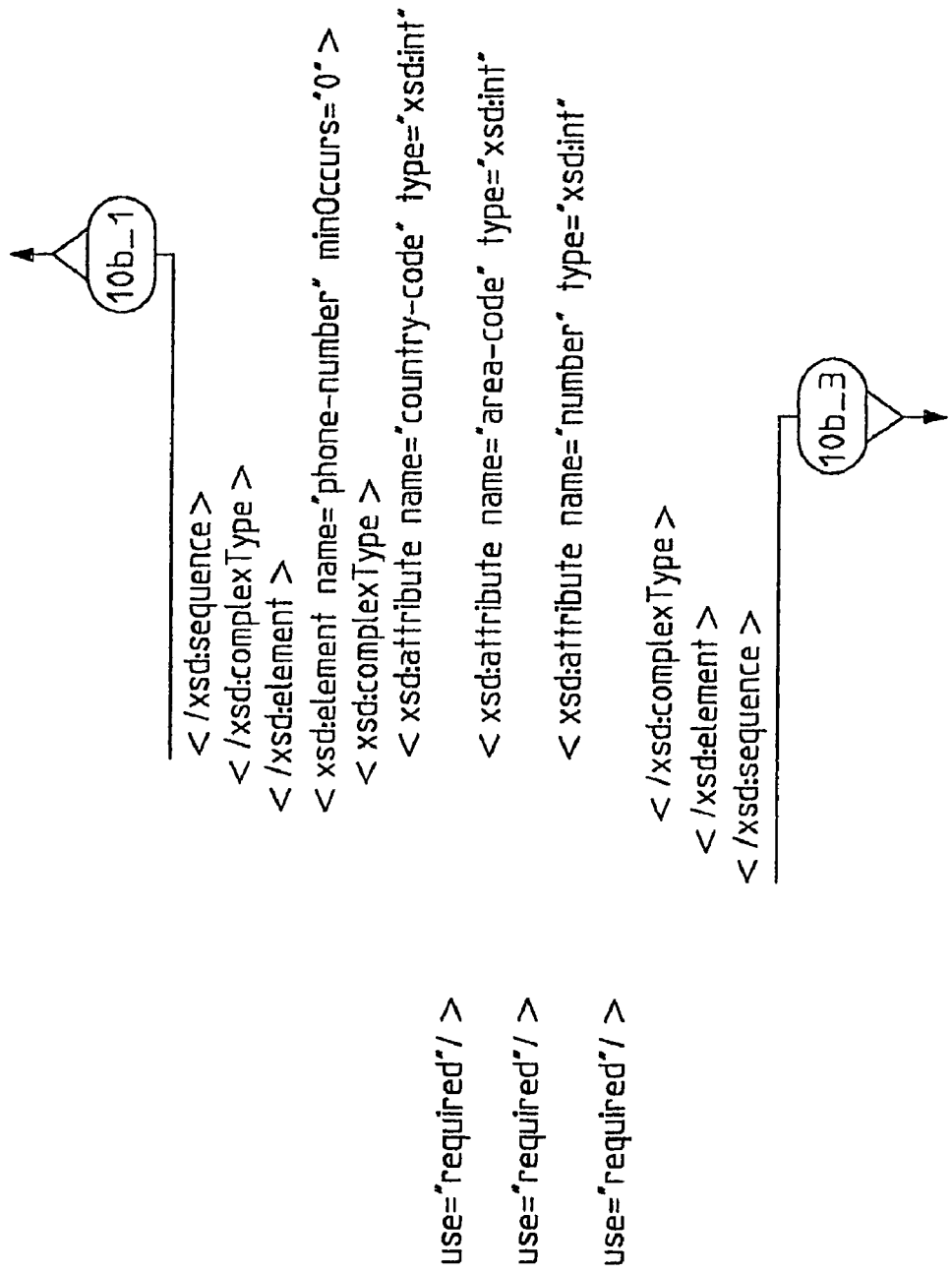
FIG. 10b_2

```
<xsd:attribute name="type" type="xsd:string" use="required"/>
<xsd:attribute name="carrier" type="xsd:string" use="optional"/>
</xsd:complexType>
</xsd:element>
</xsd:sequence>
</xsd:complexType>
</xsd:element>
<xsd:element name="recipient-data">
<xsd:complexType>
<xsd:sequence>
<xsd:element name="xml-data" minOccurs="0" maxOccurs="unbounded">
<xsd:complexType mixed="true">
<xsd:sequence>
<xsd:any processContents="skip" minOccurs="0" maxOccurs="unbounded"/>
</xsd:sequence>
<xsd:attribute name="name" type="xsd:string" use="required"/>
</xsd:complexType>
</xsd:element>
```

FIG. 10b_3

```
<xsd:element name="merge-field" minOccurs="0" maxOccurs="unbounded" >
  <xsd:complexType mixed="true" >
    <xsd:sequence >
      <xsd:element name="merge-field" minOccurs="0" maxOccurs="unbounded" >
        <xsd:complexType mixed="true" >
          <xsd:sequence >
            <xsd:attribute name="name" type="xsd:string" use="required" />
            <xsd:attribute name="access" type="xsd:string" use="required" />
            <xsd:attribute name="type" type="xsd:string" use="required" />
          </xsd:sequence>
        </xsd:complexType>
      </xsd:element>
    </xsd:sequence>
    <xsd:attribute name="name" type="xsd:string" use="required" />
    <xsd:attribute name="access" type="xsd:string" />
  </xsd:complexType>
</xsd:element>
```

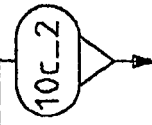

*FIG. 10c_1*

```
<xsd:attribute name="type" type="xsd:string" use="required"/>
</xsd:complexType>
</xsd:element>
</xsd:sequence>
<xsd:attribute name="name" type="xsd:string" use="required"/>
<xsd:attribute name="access" type="xsd:string" use="required"/>
<xsd:attribute name="type" type="xsd:string" use="required"/>
</xsd:complexType>
</xsd:element>
</xsd:sequence>
</xsd:complexType>
</xsd:element>
</xsd:sequence>
</xsd:complexType>
</xsd:element>
</xsd:sequence>
</xsd:complexType>
</xsd:element>
</xsd:schema>
```

FIG. 10c_2

Dear [[cust_name]].

This is to remind you that payment of our invoice dated [[date]] has not been received. You have an outstanding balance of [[account_balance]]. We would appreciate your prompt attention to this matter.

Yours faithfully.

J. Parker

FIG. 13

| Attempt | Transmission 1 | Transmission 2 | Transmission 3 |
|---------|----------------|----------------|----------------|
| 1 | Fax | E-mail | - |
| 2 | Paper | SMS | - |
| 3 | - | - | - |

*FIG. 14*

Please enter your details to log on

Customer ID  acme
User ID  pwill
Password  *****

Logon   Reset   Help

MENU
- Job Submission
- Status Report
- Administration
- Logoff
- Customers
- Job Control
- Job Configuration
- Console
- Proxy Setting System Control Centre [control]    Mike Markham [mmarkham]

1900

Job Submission details

Account: Control Enterprise 1

Job reference: Invoice213

Job type: Budget Invoice Test 1

Recipient files: -----uploaded files-----    [Remove]
                                              [Browse] [Upload]

Job start time: Date [9 Jul ▽]  Time [2 ▽] [2C ▽]

[Submit]    [Cancel]    [Help]

JOB STATUS REPORT FOR ACME PTY LTD (ACME)

Summary

| | | | | | |
|---|---|---|---|---|---|
| Job ID | 34656 | Job reference | Invoice 3 | Job status | Attempt 2 in progress |
| Job type | Invoices | Interface type | Enterprise | Account | Essential Mail |
| Recipients | 763 | Job started | 15 Feb 03 at 22:21 | Report prepared | 16 Feb 03 at 02:52 |
| User ID | Mary Atkins (MaryA) | | | | |

Message Delivery Status

| Progress | Sent | 1st Attempt | 2nd Attempt | 3rd Attempt | Total | Failed | In |
|---|---|---|---|---|---|---|---|
| Master | 763 | 745 | 12 | - | 757 | 2 | 4 |
| Copy | 94 | 84 | 5 | - | 89 | 2 | 3 |
| | | | ........Delivered........ | | | | |

Master Message Delivery Details

| Ref | Name | 1st Attempt | 2nd Attempt | 3rd Attempt |
|---|---|---|---|---|
| carr04 | Ms Pat Carr | 16-FAX-22:40 | IP-EML | 3rd Attempt |
| watson14 | Dr Fred Watson | 13-FAX-22:40 | IP-PAP | |
| biggs01 | Mr John Biggs | OK-FAX-22:40 | | |
| mathews01 | Mr William Mathews | OK-EML-22:56 | | |
| smith02 | Mrs Sandra Smith | 05-FAX-22:41 | OK-EML-01:22.1 | |
| smith03 | Mr Bruce Smith | OK-PAP-22:41 | | |

Number of successful Deliveries

| | |
|---|---|
| E-mail | 501 |
| Fax | 198 |
| SMS | 11 |
| Paper | 35 |

| | |
|---|---|
| | 5 |
| | 4 |
| | 0 |
| | 1 |

*FIG.20a*

Copy Message Delivery Details

| Ref | Name | 1st Attempt | 2nd Attempt | 3rd Attempt |
|---|---|---|---|---|
| carr04 | Ms Pat Carr | OK-EML-23:31 | OK-SMS-22:44 | |
| biggs01 | Mr John Biggs | OK-SMS-22:43 | | |
| mathews01 | Mr William Mathews | OK-SMS-22:43 | | |
| smith02 | Mrs Sandra Smith | OK-EML-22:55 | OK-SMS-22:43[1] | |
|  |  |  | OK-PAP-23:21 | |

E-mail Attachments Opened

Attachment X1: Month to date shipments
Attachment X2: Special Offer

| Ref | Name | E-mail attachments Opened | |
|---|---|---|---|
| biggs01 | Mr John Biggs | X1-23:42 | X2-23:40 |
| mathews01 | Mr William Mathews | X2-23:49 | |
| smith02 | Mrs Sandra Smith | X1-01:29[1] | |

| MENU | System Control Centre (control) |
| --- | --- |
| | System Administrator (admin) |
| Job Submission | |
| Status Report | Java mapping class |
| Administration | Filename [InvoicesJavaMappingClass.class] [Delete] |
| Customers | [                                    ] [Browse] [Import] |
| Job Control | Java mapping class resource |
| Job Configuration | Filename [InvoicesMapRecipients.xls] [Delete] |
| Console | [                                    ] [Browse] [Import] |
| Proxy Setting | [ Add New JVC Recource Record ] |
| | Configuration data |
| | Filename [DuplexPaperConfig.xm] [Delete] |
| | Medium  ○ Email  ○ Fax  ○ SMS  ⊙ Paper |
| | [                                    ] [Browse] [Import] |
| | [ Add New Config Data Record ] |
| | Template |
| | Filename [Invoices.xls] [Delete] |
| | Medium  ○ Email  ○ Fax  ○ SMS  ⊙ Paper |
| | Type    ○ Subject  ○ Body  ⊙ Other |
| | Sequence [0] |
| | Name     [  ] |
| | FO Engine [0] |
| | [                                    ] [Browse] [Import] |
| | [ Add New Template Record ] |

Template artifact
Filename  [AcmeLogo.jpg]  [Delete]
[                    ] [Browse] [Import]

Template artifact
Filename  [symbol.gif]  [Delete]
[                    ] [Browse] [Import]

[Add New Template Artifact Record]

Export files as a specified ZIP archive
Zip Filepath
[C:\JobConfiguration s\systemcontrol centre_bobby_2003-05-30.zip]

[Export to Specified Zip Filepath]

[Submit]  [Delete]  [Cancel]  [Help]

*FIG.21b*

```
<? xml version="1.0" encoding="UTF-8" ?>
<recipient-list xmlns:xsi="http://www.w3.org/2001/XMLSchema-instance"
xsi:noNamespaceSchemaLocation="http://systemsoftware1/flexemessaging/schema/rList.xsd">

<jobs>
        <account> FTP jobs </account>
        <job-reference> BillRun1 </job-reference>
        <job-type test="25"> Invoices </job-type>

<recipient-file> sydney-recipients.csv </recipient-file>
        <recipient-file> melbourne-recipients.csv </recipient-file>
        <recipient-file> perth-recipients.csv </recipient-file>

</jobs>
    ... etc....
```

FIG. 22

```
<? xml version="1.0" encoding="UTF-8" ?>
<recipient-list xmlns:xsi="http://www.w3.org/2000/XMLSchema-instance"
xsi:noNamespaceSchemaLocation="http://systemsoftware1/flexemessaging/schema/rlist.xsd" >

<recipient >

<personal-details >
    <title > Mr </title >
    <first-name > John </firstname >
    <last-name > Wilson </lastname >
    <reference > A23432 </reference >
</personal-details >

<destination-preference >
    <attempt > office-email home-fax smsl </attempt >
    <attempt > home-addr </attempt >
<destination-preference >
```

```
<destination media="email" id="office-email" >
  <email-address > j.wilson@bigpond.com </email-address >
</destination>
</destinations>

<recipient-data >
<merge-field name="payment_invoiceline" access="direct" >
  <type="collection">
    <merge-field name="ff_date" access="direct" type="string" >
      7 Feb 02
    </merge-field>
    <merge-field name="ff_description" access="direct" type="string" >
      Payment received. Thank you Mr John Wilson.
    </merge-field
    <merge-field name="ff_invoice_amt" access="direct" type="string" >
      92.33
    </merge-field>
</recipient_data >

</recipient >
```

FIG. 24c

```
<?xml version="1.0" encoding="UTF-8" ?>
<edipost-config>
    < duplex >true</duplex >
    < omr > single 782 </omr >
    < document-numbering > true </document-numbering >
    < test-job > true </test-job >
    < mailing-category > 0 (normal Mail) </mailing-category >
    < paper-bin > 0 (Xerox: Letterhead) </paper-bin >
    < sorting-parameters > sort, error, pagelimit, postcode; </sorting-parameters>

< barcoding > true </barcoding >
    < barcoding-report > true </barcoding-report >
    < address-position > y -10 0 </address-position >
    < job_name > BUDINV </job_name >
</edipost-config>
```

FIG. 26

```
<? xml version="1.0" ?>
<XFlat Name="employees_schema" Description="Schema for CSV flat file">
<SequenceDef Name="employees" Description="employees flat file">
  <RecordDef Name="employee" FieldSep="," RecSep="\N" MaxOccur="0">
    <FieldDef Name="refno" NullAllowed="No"
      MinFieldLength="9" MaxFieldLength="11"
      DataType="Integer" MinValue="0"
      QuotedValue="Yes"/>
    <FieldDef Name="name" NullAllowed="No"
      QuotedValue="Yes"/>
    <FieldDef Name="salary" NullAllowed="no"
      DataType="Float" MinValue="0"
      QuotedValue="Yes"/>
  </RecordDef>
</SequenceDef>
</XFlat>
```

*FIG.27*

```
< ?xml version="1.0" encoding="UTF-8" ? >
< xsd:schema xmlns:xs="http:// www.w3.org/2001/XMLSchema" xmlns:xsd="http://www.w3.org/2001/XMLSchema" >
  < xsd:element name="recipient-list" >
    < xsd:complexType >
      < xsd:sequense >
        < xsd:element name="recipient" minOccurs="1" maxOccurs="unbounded" >
          < xsd:complexType >
            < xsd:sequense >
              < xsd:element name="personal-details" minOccurs="1" maxOccurs="1" >
                < xsd:complexType >
                  < xsd:sequense >
                    < xsd:element name="title" type="xsd:string"/ >
                    < xsd:element name="first-name" type="xsd:string"/ >
                    < xsd:element name="last-name" type="xsd:string"/ >
                    < xsd:element name="user-data" type="xsd:string"/ >
                  < xsd:sequense >
                < xsd:complexType >
              < xsd:element >
              < xsd:element name="destination-preference" minOccurs="1" maxOccurs="1" >
                < xsd:complexType >
```

FIG.30a

```
</xsd:complexType>
  </xsd:element>
 </xsd:sequence>
</xsd:complexType>
  </xsd:element>
<xsd:element name="recipient-data" minOccurs="0" maxOccurs="1">
  <xsd:complexType mixed="true">
    <xsd:sequence>
      <xsd:any processContents="skip" minOccurs="0" maxOccurs="unbounded"/>
    </xsd:sequence>
  </xsd:complexType>
</xsd:element>
     </xsd:sequence>
    </xsd:complexType>
   </xsd:element>
  </xsd:sequence>
 </xsd:complexType>
</xsd:element>
</xsd:schema>
```

BULK COMMUNICATIONS PROCESS USING MULTIPLE DELIVERY MEDIA

RELATED APPLICATION

The present application claims the benefit of the earlier filing date of Australian Provisional Patent Application No. 2002950435 filed on 29 Jul. 2002 in the name of Trade Wind Communications Ltd and having the same title, the contents of which are incorporated by reference herein.

FIELD OF THE INVENTION

The present invention relates generally to bulk communications and in particular to methods and systems for bulk communications using multiple delivery media.

BACKGROUND

Businesses, companies, and organizations (simply originators hereinafter) use bulk communications with their clients, suppliers, and other parties (simply recipients hereinafter) for a variety of reasons. Typically, such bulk communications are carried out using one of the following media: Surface Mail, Email, Facsimile, and Short Message Service (SMS) messages sent to recipients' mobile phones.

Originators of communications have different types of bulk communications with their recipients ranging from ad-hoc marketing communications through to recurring delivery of essential information such as invoices, statements, and reminder notices. Generally, these bulk communications have the following common elements:
- A list of recipient information is provided separately, often needing to be extracted from a corporate database or accounting system;
- A form of document template is used;
- Data from the recipient list is merged, or overlaid, onto the template document; and
- The final 'merged' document is delivered to the customer.

Communication with recipients can originate from different departments or entities of the originator and be carried out in different ways depending on the type of communication media being used. In carrying out these various communications, the originators use different interfaces and technology depending on whether originators are sending information out via Surface Mail, Email, Facsimile, or SMS. The originators may choose to host some or all of the technology required for the relevant communications in-house, but in other cases the originators may out-source the communications.

Mail merge software applications exist for generating address stickers for envelopes and for merging and printing letters. Originators may also have proprietary systems and printing departments set up in-house to manage surface mail merging. Mailing houses provide originators with the ability to outsource their surface mailing requirements. Generally, customized scripts are written to map data extracted from the originators' databases and overlay the extracted data onto pre-printed paper stock.

Facsimile (fax) machines have the capability to store lists and do bulk message delivery. Depending on the size of the communication, bulk emailing can be carried out using tools such as Microsoft Outlook. This application enables a user to merge data fields of a data repository into a Microsoft Word document and then email a merged document to a recipient list via its mail merge tools. Other software applications beside Microsoft Outlook and Microsoft Word have similar functionality. For software solutions in this area, fax cards and fax print drivers, etc., must be installed on the network or the workstation that the software is installed. Businesses or companies also provide bulk fax and email services. Some require personalized documents for the different recipients to be supplied by the originators; others carry out merging of data for the originator. Enterprise Resource Planning (ERP) and accounting software may also support the capability to email or fax from within the application or software package. However, this is usually geared to individual communications (i.e., send a single email or fax from within the package at a certain point within a business process), rather than allowing for a bulk personalisation and delivery.

Originators may adapt their systems to issue SMS messages via a carrier. Usually, this is done using 'email to SMS' type services that enable an email to be sent to a specified address, formatted in a given manner, and then forwarded on as an SMS message to a mobile phone. Originators may enable the bulk outsourcing of SMS messaging, but generally do not provide a capability, or support provision by third party products of a capability to merge personalized data from the same database as the other delivery mechanisms.

Limited, combined services exist, usually capable of forwarding emails to fax or to SMS. Amongst other things, these services do not provide formatting and merge functionality. Such services do not allow for specific formatting rules to be specified for the different delivery mechanisms whilst using the same recipient list and database, and do not support surface mail as one of the delivery options.

MessagingDirect (from ACI) offers e-Courier. E-Courier 1 is a direct electronic billing and payment solution. These tools seek to combine traditional direct business-to-business paper transactions with the speed, efficiency and flexibility of electronic delivery. Both also attempt to facilitate a streamlined business process through direct e-business: digitally signed, legally binding and securely delivered end-to-end e-transactions, such as bills, statements, invoices, confirmations, policies. The entire business process aims to be online, enabling e-transactions to flow through an electronic channel directly between businesses and their customers, partners and suppliers. The MessagingDirect system does not support a unified interface for email, Fax or Surface Mail delivery. The MessagingDirect product requires all recipients to enroll with the service.

MessageReach and Fax MailMERGE (from Xpedite) have different offerings for different media, but do not simultaneously personalize and deliver a single recipient list to multiple media.

Pulse Enterprise (from Esker Software) is another similar application, but does not incorporate escalation, is not offered as an ASP model (or as a Web Service), and does not support surface mail delivery. Pulse Enterprise also requires Fax cards, etc., to be installed along with the software. The company making use of Pulse Enterprise must install the software and hardware in their environment and manage Pulse Enterprise as well as all Fax, SMS, Email interfaces etc. Pulse Enterprise includes a General Document Recognition™ (GDR) component. General Document Recognition™ seeks to automate the conversion of text and print-stream data into multiple electronic formats and the processing and delivery of these documents to any receiving device.

Thus, a need clearly exists for an automated service that enables originators to use one bulk communications service with a single common interface and to re-use the same set of recipient data, so that bulk communications to recipients can be carried out via all existing, different media including Conventional or Surface Mail, Email, Fax and SMS (and any other new delivery media that might arise in the future). Further, a need clearly exists for an automated service that enables an originator to manage the delivery of messages to recipients based on each recipient's preference for receiving the information including how that information is delivered if unsuccessful on a first media, without the need for the originator to install and manage technology specific to a particular delivery type. Still further, a need exists for an automated service that can format and deliver data via a single interface to the full spectrum of delivery media (Fax, Email, SMS, Paper and Archiving) based on the recipients' preferences.

SUMMARY

In accordance with a first aspect of the invention, there is provided a method for bulk communication of information to recipients via multiple delivery media including facsimile, email, surface mail, and SMS messaging. Preferably, this includes the ability to expand to other new media types in the future. Information for distribution including information regarding recipients is received via a single interface. The received information may include one or more template documents and data specific to each recipient (including embeddable image data). At least one document based on the received information is transmitted using a specified one of the delivery media for each of the recipients based on the recipients' delivery preferences.

Preferably, the method includes the step of escalating transmission of the at least one document using a different one of the delivery media for each of one or more of the recipients for whom transmission by the specified delivery media fails. The at least one document may be converted into a format suitable for the specified one or different one of delivery media for each recipient. The formatted document may then be sent to a carrier for transmission using the specified one or the different one of the delivery media. A report from the carrier regarding the transmission may be processed to provide status information regarding delivery of the document to each recipient. In turn, the escalating step may be dependent upon the status information.

The method may further include the step of merging the one or more template documents and the data specific to each recipient (optionally including image data specific to each recipient) to provide the at least one document for each of the recipients. The method may also include the steps of determining a document template type for each delivery media and selecting a merging process for the document template type. The data specific to each recipient may be provided to the respective merging process. The delivery media may include archiving in order to facilitate recipient requests for additional copies of merged template documents at some time in the future.

Further aspects of the invention include a system and a computer program product for bulk communication of information to recipients via multiple delivery media including facsimile, email, surface mail, and SMS messaging (and able to be extended to other new media types), based on the method described above. These and further aspects of the invention are described in greater detail hereinafter.

BRIEF DESCRIPTION OF THE DRAWINGS

A small number of embodiments of the invention are described hereinafter with reference to the accompanying drawings, in which:

FIG. 3 is a block diagram illustrating a pluggable data file converter in accordance with the embodiment of the invention;

FIGS. 10a-10c are a listing of the recipient list XML schema in accordance with the embodiment of the invention;

FIG. 13 depicts a template;

FIG. 14 illustrates the redirection/escalation information contained within a recipient record;

FIG. 16 illustrates a log on screen that may be practiced;

FIG. 18 illustrates an administration panel for viewing a user;

FIG. 19 illustrates an enterprise interface job submission screen;

FIG. 20 illustrates an example of a status report;

FIGS. 21A and 21B illustrates a job configuration panel;

FIG. 22 illustrates a file containing the definition of a messaging job to be submitted by the FTP interface;

FIG. 26 shows an example of the configuration parameters for a paper job;

FIG. 27 shows an example of one type of resource in a Java_Mapping_Class_Resource record;

DETAILED DESCRIPTION

Figure 1A:
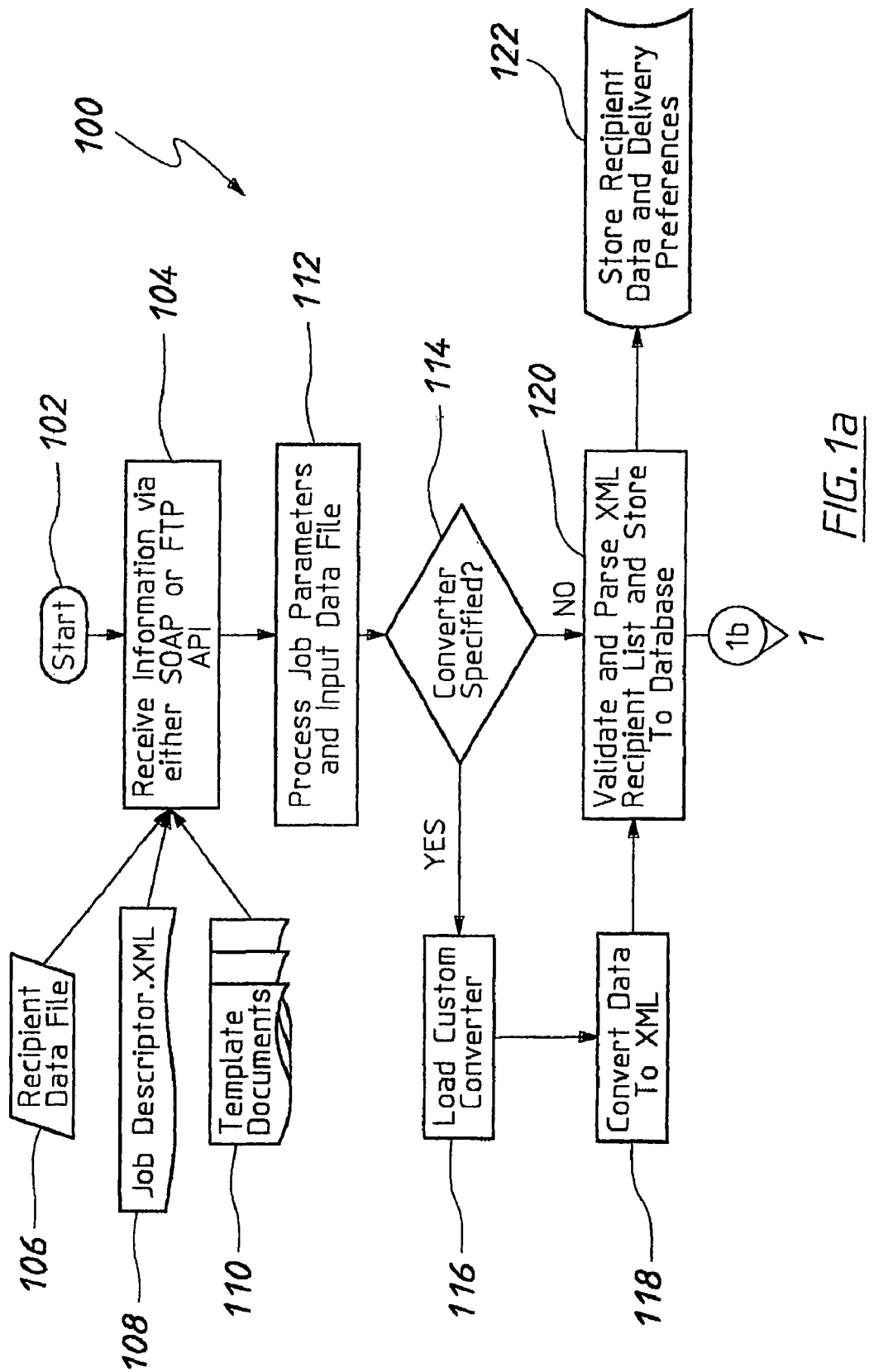
FIG. 1 is a detailed flow diagram illustrating a process for handling messages in accordance with an embodiment of the invention.
Figure 1B:
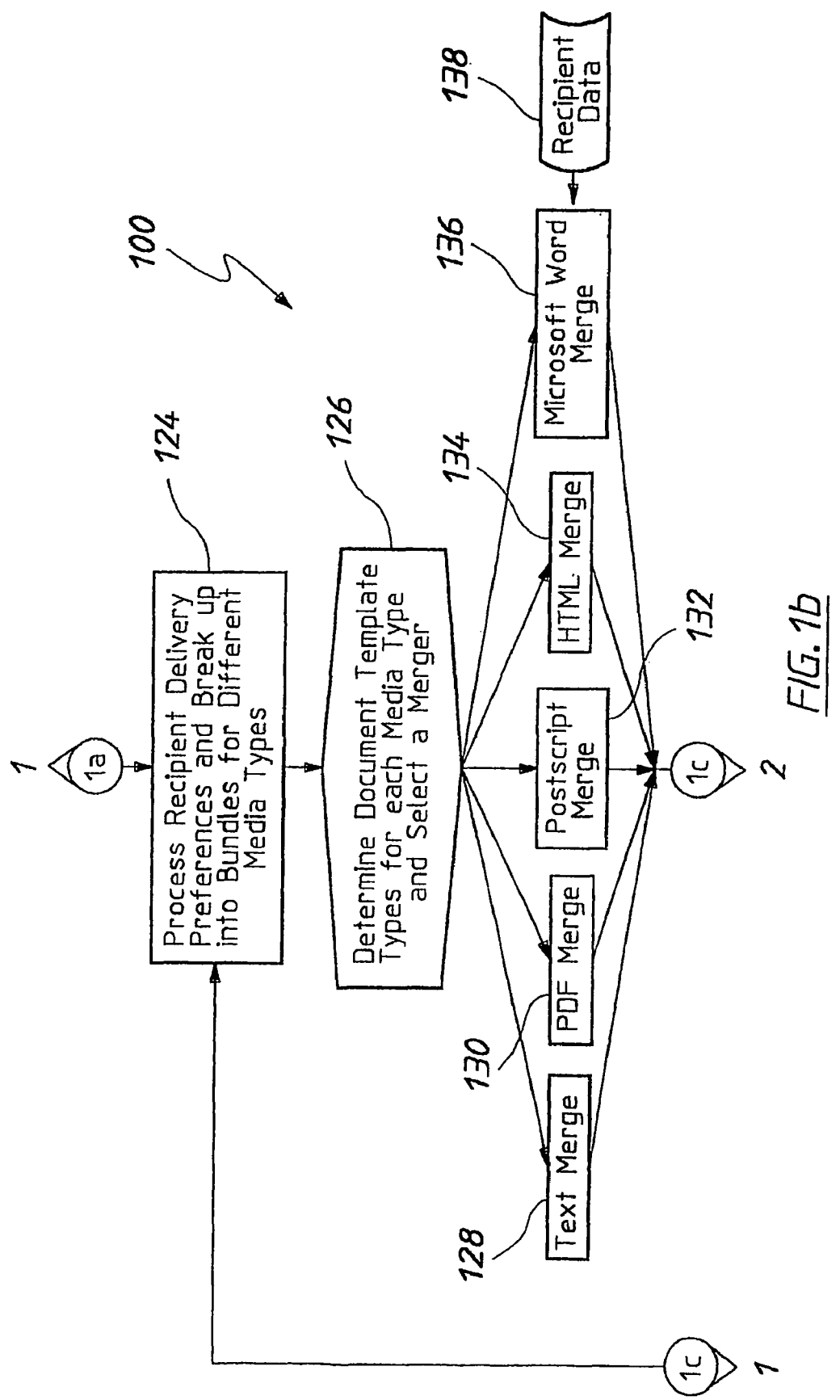
Figure 1C:
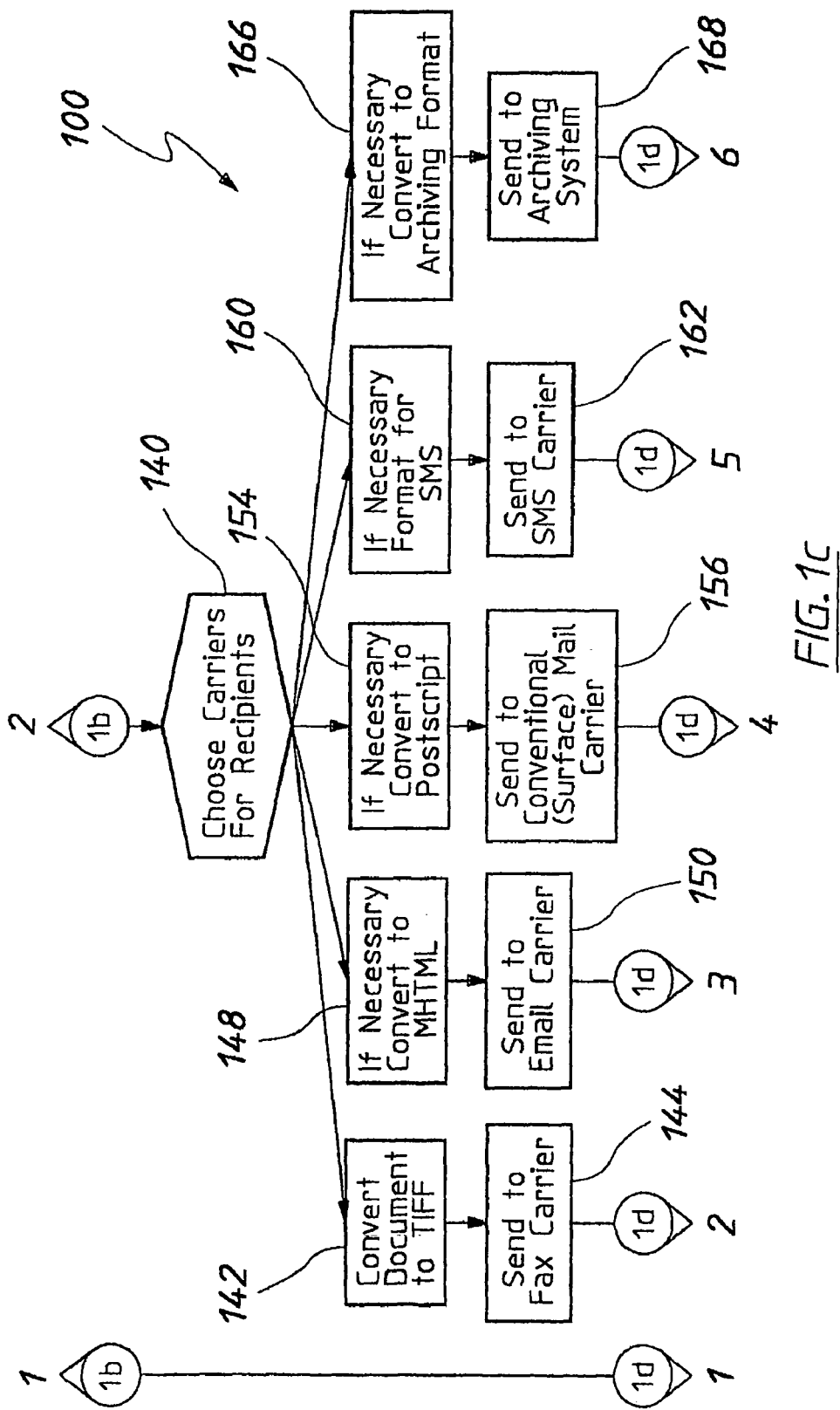
Figure 1D:
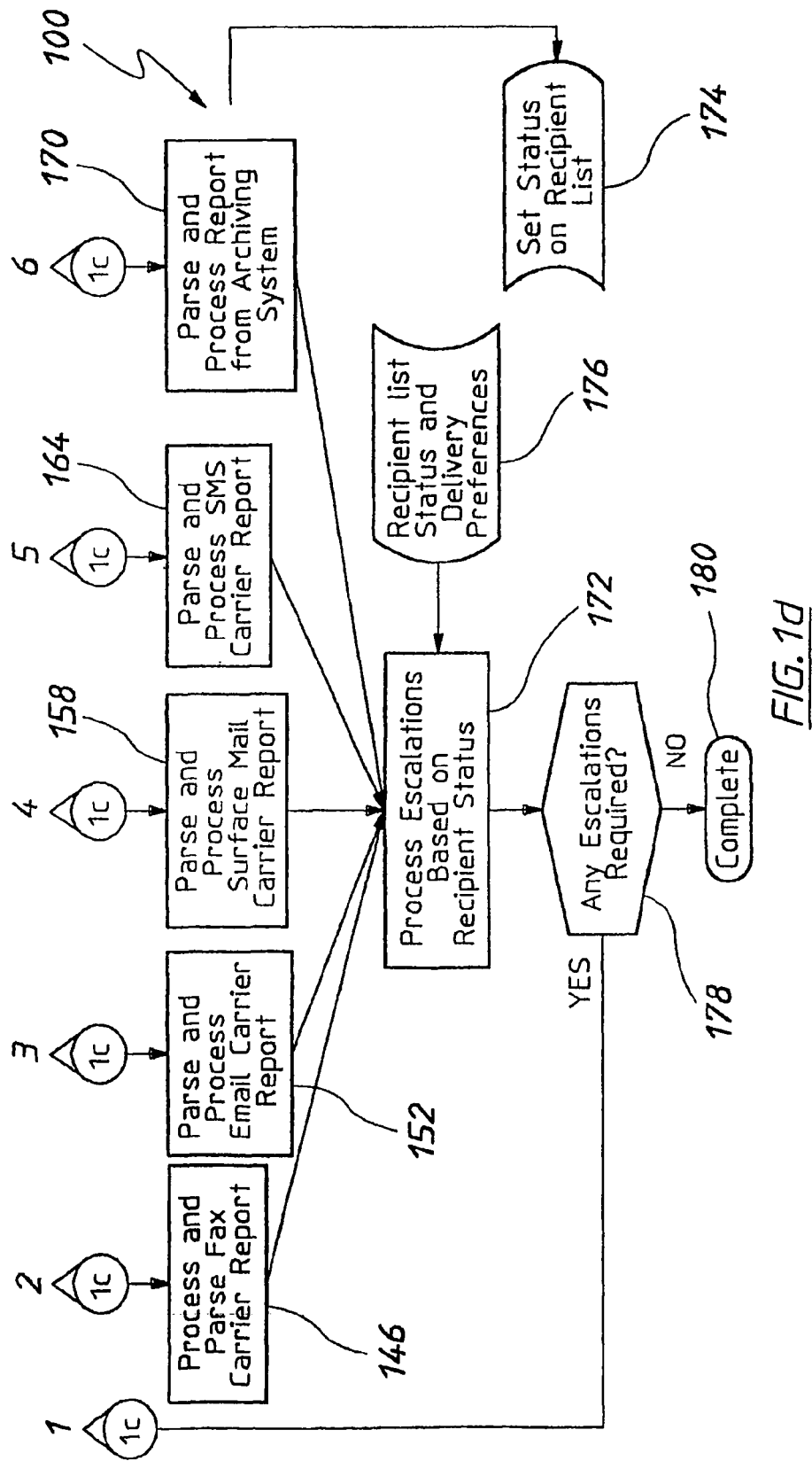

Methods, systems, and computer program products are disclosed for bulk communication of information to a single set of recipients via multiple delivery media based on the recipients' delivery preferences and incorporating escalation. Preferably, the method, the system and the computer program enable a service that is delivered as a Web Service. Further, the delivery media include Surface Mail, Email, Encrypted Email, Facsimile, SMS, and Archiving (and caters for inclusion of other media types in the future. In the following description, numerous specific details are set forth including communications networks, communications protocols, data formats such as MHTML, Postscript, and the like. However, it will be apparent to those skilled in the art that, in the light of this disclosure, modifications and/or substitutions may be made without departing from the scope and spirit of the invention. In other instances, details well known to those skilled in the art may be omitted so as not to obscure the invention.

The terms "escalation", "escalate", "escalating" and other forms of the word "escalate" mean re-directing in the context of this document. Thus, the phrase "escalating transmission of at least one document using a different one of the delivery media" means that the transmission is re-directed using another media.

The recipient specifies, amongst other things, by which medium, delivery of information is preferred. Further, the recipient is able to specify the media by which information is to be delivered if the delivery cannot be achieved using the preferred media. Thus, in the event of delivery failure, the escalation to different media is according to the recipients' preferences. Preferably, the process is implemented using computer software that has been developed in an object-oriented manner, made up of multiple sub-components. The user interface to the software is preferably delivered as a web service. More preferably, the software application is written in Java and the eXtensible Markup Language (XML). A general overview is provided immediately hereinafter, followed by a more detailed description of an embodiment of the invention with reference to the drawings.

Some portions of the following description are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. At times principally for reasons of common usage, these signals are conveniently referred to as bits, values, elements, symbols, characters, terms, numbers, or the like.

However, the above and similar terms are to be associated with the appropriate physical quantities and are merely convenient labels applied to these quantities. Unless specifically stated otherwise, and as apparent from the following, it will be appreciated by those skilled in the art that passages herein utilizing terms such as "computing", "merging", "calculating", "converting", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatuses for performing the operations of the methods. Such an apparatus may be specially constructed for the required purposes, or may comprise a general-purpose computer or other device selectively activated or reconfigured by a computer program stored in the computer. The algorithms and displays presented herein are not inherently related to any particular computer or other apparatus. Various general-purpose machines may be used with programs in accordance with the teachings herein. Alternatively, the construction of more specialized apparatus to perform the required method steps may be appropriate. For example, an Internet Directory Server computer may be configured to populate a directory stored thereon by installing computer programs for performing the calculations, comparisons and selection steps described below.

Further, the present specification also discloses computer program products including a computer readable medium having a computer program for performing the operations of the methods stored thereon. The computer readable medium is taken herein to include any transmission medium for communicating the computer program between a source and a destination. The transmission medium may include storage devices such as magnetic or optical disks, memory chips, or other storage devices suitable for interfacing with a general-purpose computer. The transmission medium may also include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and coding thereof may be used to implement the teachings of the disclosure contained herein.

Where reference is made in any one or more of the accompanying drawings to steps and/or features, which have the same reference numerals, those steps and/or features have for the purposes of this description the same function(s) or operation(s), unless the contrary intention appears.

For ease of reference, the description is set forth hereinafter with the following subheadings:

A. First Embodiment

I. Overview,
II. Message Processing,
III. Service Interface(s),
IV. Pluggable Data File Converter,
V. Document Merger,
VI. Preference Rules Process,
VII. Transmitters,
VIII. Carrier Interfaces,
IX. Escalation Processor,
X. Reporting,
XI. Concurrency/Pipelining of Merge/Transmission.

B. Second Embodiment

I. Overview,
II. Concepts,
III. The Web Interface,
IV. System Architecture,
V. Data File Structures,
VII. The Database Structure,
VIII. Java Mapping Classes and XSL Templates.

A. First Embodiment

I. Overview

Significant aspects of the bulk communications process and system in accordance with an embodiment of the invention include:

- An originator can carry out bulk communication with recipients using one service, via a single interface and using a single recipient list, but can deliver via all currently available media including Conventional (Surface) Mail, Email (encrypted and non-encrypted), Fax and SMS, as well as delivery of documents to a hosted Document Archiving and Retrieval system (and ability to expand to other media technology in future).
- Delivery preferences can be specified for individual recipients, as well as escalation rules. So for example, a recipient can specify that the recipient prefers to receive communications via Fax, but that information is preferably received by Surface Mail if the Fax fails. This can be done at an individual recipient level as well as at an overall level.
- There is one Application Programming Interface (API) into the system. Via this one API, delivery can be carried out using any of Fax, Email, Encrypted Email, SMS, Surface Mail and Archiving (and other future media types when available).
- The process has been designed in a componentised manner to cater easily for the integration of future types of delivery media (e.g. WAP, other Wireless etc.)
- A single recipient list can be used for delivery to all of the different target media. The recipient list can be in any format and the process converts the list into XML. A variety of input recipient file formats are supported and data conversion is carried out to XML format.
- Merging (personalization) can be carried out using fields within the recipient list for all of the different delivery media This includes personalization of SMS text messages, email body and subject text, as well as document merge for Word, Portable Document Format (PDF), Hyper-Text Markup Language (HTML) and MIME-HTML (MHTML). MIME stands for Multipurpose Internet Mail Extensions. Document merging is supported using state of the art XML document formats and XSL and XSL-FO style sheets for data formatting and presentation.
- The service manages all interfaces to carriers, including surface-mail mailing houses and to a hosted archiving service. Software need not be installed or managed at the originator. Different carriers may be supported for the same media type, and the originator can specify their preferred carrier.
- Integrated reporting of delivery results, including reporting on escalations that have occurred and the success/failure for all recipients across different media types is provided. An integrated reporting interface is provided that enables a user to view the messaging and escalation status of individual recipients.
- The process is designed for the 'bulk mailing' scenario where a large number of recipients are being targeted, in an analogous manner to the way in which large numbers of recipients are targeted by conventional surface mail mailing houses.

The process or system utilizes one or more of the following techniques to provide features not found in other messaging services:

- The process recognizes the common elements required in communications with recipients and encapsulates those elements in an XML document. These elements include a recipient's delivery preferences and a set of escalation criteria. The delivery preferences and escalation criteria are specified using a shorthand notation. A proprietary XML schema is also defined to describe the XML document format.
- The process provides a remotely accessible and secure electronic interface or common interface. The single Application Programming Interface (API) supports all forms of messaging in a consistent manner. The common interface can be accessed by either the File Transfer Protocol (FTP) or Simple Object Access Protocol (SOAP). The interface can also be accessed via a Web user interface.
- The service provides data merging (personalization) capabilities enabling the service to merge recipient data into a variety of document formats including PDF, HTML, MHTML, Microsoft Word, and Text. The service preferably uses an eXtensible Stylesheet Language Formatting Objects (XSL-FO) formatting engine to carry out the data merging. The personalization capability includes the ability to personalize the subject line and body text of email messages as well as messages being sent via SMS.
- The API supports a mechanism for specifying a data converter. The service has special code built in that enables customized data converters to be written and plugged in dynamically. The data converters take the recipient data in any format (i.e., as extracted from an organisation's accounting or ERP systems) and convert the recipient data into a common XML format for feeding into the messaging engine.
- The service manages all of the following carrier interfaces: SMS, Email, Encrypted Email, Fax, Conventional (Surface) Mail and Archiving. This is done by having a separate code layer in the system that presents a common carrier interface to the rest of the messaging engine. This also enables future media types to be easily incorporated into the service (e.g. WAP). The service can also store preferences that the originator may have regarding the choice of carrier.
- The service re-uses the one single set of input data for all of the different document-template and delivery-media types. The service does this by carrying out the document merging in one module or component, and the formatting for presentation to the carrier interface in a separate module.
- The service provides a single, integrated reporting interface to the user by taking the different types of reports that are received back from the carriers and converting the reports into a common format for storage in a relational database. The service then reconciles these delivery reports against the individual messaging recipients in order to track delivery and drive the escalation procedures. This enables the service to provide reports to the user on the success and failure of individual messages and show the escalation path that has been taken for individual recipients.
- The service has been implemented in a manner that enables a high volume of messaging throughput. The service does this by breaking out the steps in the messaging process into different components. These components are then executed concurrently, so that many different steps are being executed simultaneously.

II. Message Processing

FIG. 1 illustrates diagrammatically the messaging process 100 that can be implemented in software. Processing commences in step 102. A recipient data file 106, jobDescriptor.XML 108, and template documents 110 are received via the API at step 104. The details of jobDescriptor.XML 108 are described in detail hereinafter. In step 112, the job parameters are processed and the data file is input. In step 114, a check is made to determine if the data converter has been specified. If step 114 returns true (YES), processing continues at step 116 and the custom converter that was specified is loaded. In step 118, the data is converted to XML using the custom converter, and processing then continues at step 120. If step 114 returns false (NO), processing continues at step 120.

In step 120, the XML recipient list is validated and parsed, and then stored to a database. This produces stored recipient data and delivery preferences 122. In step 124, recipient delivery preferences are processed and broken up into bundles for different media types. In step 126, a check is made to determine the document template types for each media type and a corresponding document merger is selected. The Document Template is the same for all recipients for a specific media type. The Document Merger takes each individual recipient's data and merges that data into the document template to produce a personalized document for that recipient. The Document Template may be an XSL template. Alternately, MS Word Templates and HTML Templates are supported. This is the 'Template Type'. Depending on the template type, a different document merger (an XSL-FO Merger, an MS Word Merger, a HTML Merger etc.) is loaded. From step 126, one or more of several merge steps or operations may be performed. The merge steps include text merge 128, PDF merge 130, Postscript merge 132, HTML merge 134, and Microsoft Word merge 136. It will be appreciated by those skilled in the art, in the light of this disclosure, that other types of merges may be practiced without departing from the scope and spirit of the invention. Recipient data 138 is provided to the merge steps 128-136.

From each of steps 128-136, processing continues at step 140. In step 140, a check is made to choose delivery carriers for recipients. This is done by re-examining the outcome of the previous Process Recipient Delivery Preferences step 124 in combination with the preferred carrier for each media configured for the originator of this Job. The combination of these two pieces of information is used to decide on the carrier modules to use. If a fax is to be sent, processing continues through the path including steps 142-144. If an email is to be sent, processing continues through the path including steps 148-152. If surface mail is to be sent, processing continues through the path including steps 154-158. If an SMS message is to be sent, processing continues through the path including steps 160-164. If the document is to be archived, processing continues through the path including steps 166-170.

For the fax path, the merged document is converted to a bitmap format, which is preferably TIFF in step 142. In step 144, the TIFF format document is sent to a fax carrier for transmission. In step 146, a fax carrier report that is generated is processed and parsed. The status of the transmission is set on the recipient list. Processing then continues at step 172.

For the email path, the merged document is converted in step 148 to MHTML format, if necessary. Often, conversion to MHTML is not required because the document remains as a PDF, HTML or Microsoft Word Attachment. In step 150, the email message containing the document either as an attachment or as embedded MTHML, is sent to an email carrier for transmission. In step 152, an email carrier report that is generated is processed and parsed. The status of the transmission is set on the recipient list. Processing then continues at step 172.

For the surface mail path, the merged document is converted in step 154 to the Postscript format, if necessary. In step 156, the Postscript format document is sent to a conventional surface mail carrier for transmission. In step 158, a surface mail carrier report that is generated is processed and parsed. The status of the transmission is set on the recipient list. Processing then continues at step 172.

For the SMS message path, the merged document is formatted in step 160 for SMS, if necessary. In step 162, the SMS format document is sent to an SMS carrier for transmission. In step 164, an SMS carrier report that is generated is processed and parsed. The status of the transmission is set on the recipient list. Processing then continues at step 172.

For the archiving path, the merged document is formatted in step 166 for archiving, if necessary. This format is generally PDF or Postscript, however no particular format is mandated by the archiving system and so the format is dependent on the originator's preferences. In step 168, the formatted document is sent to the archiving system. In step 170, a report that is generated by the archiving system is processed and parsed. The status of the transmission is set on the recipient list. Processing then continues at step 172.

In step 172, escalations are processed, if necessary, dependent on the recipient list status and delivery preferences 176. In step 178, a check is made to determine if any escalations are required. If step 178 returns true (YES), processing continues at step 124 in respect of the recipients for whom escalation occurs. Otherwise, if step 178 returns false (NO), processing terminates in step 180.

Figure 11:
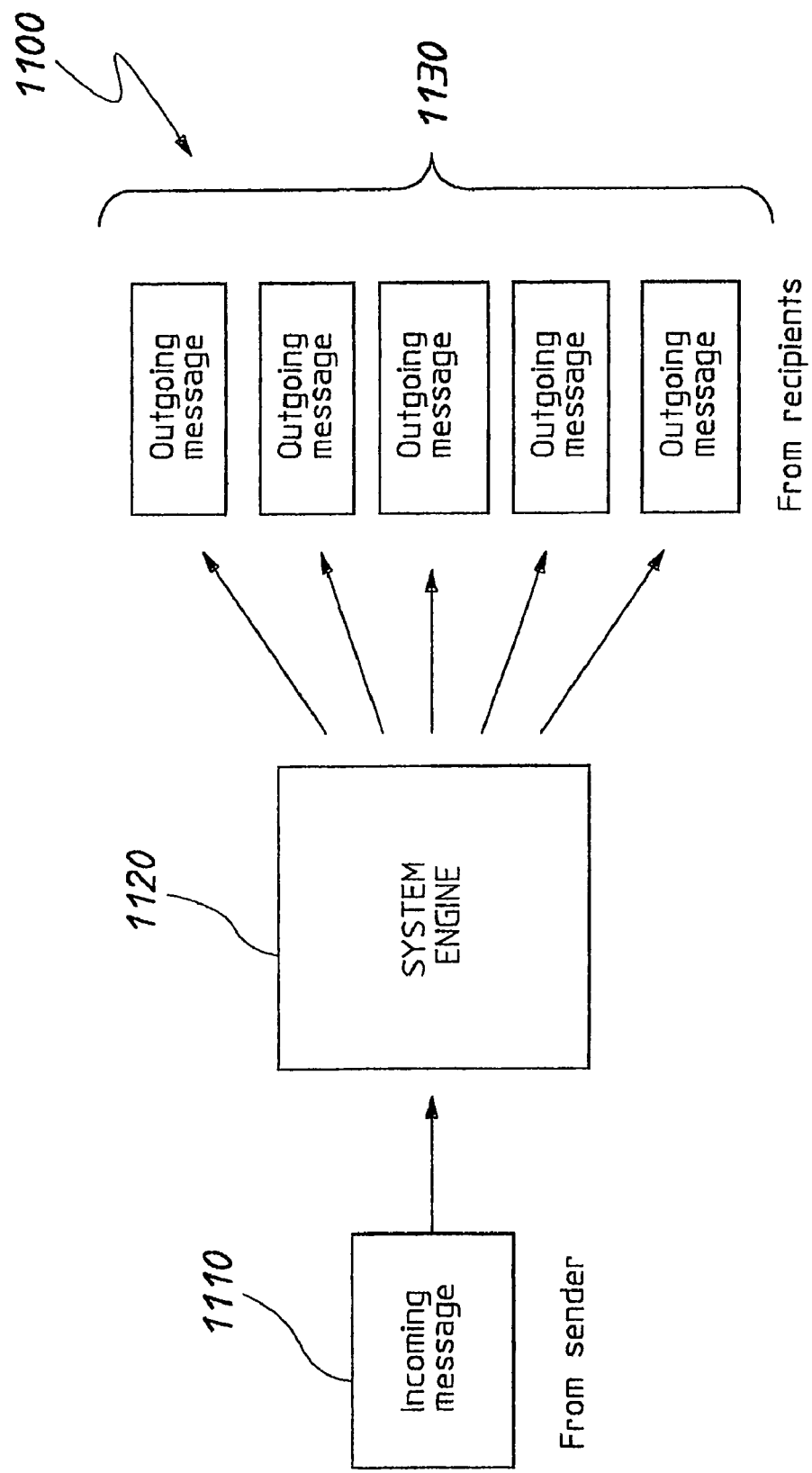
FIG. 11 is a block diagram of a message distribution system in accordance with another embodiment of the invention.

The software architecture used to provide the process 100 of FIG. 1 is depicted in the class diagram of FIGS. 11 and 11A-11M of Australian Provisional Patent Application No. 2002950435, which is incorporated by reference. In Australian Provisional Application No. 2002950435, FIG. 11 depicts the arrangement of the portions in FIGS. 11A-11M. The class diagram provides a detailed description of the application architecture and the components that make up the application. The components include escalation processing, status processing, job submission and processing, merging, formatting and carrier transmission. The schema communicates several aspects of the architecture.

Additional aspects of this process are described in detail hereinafter.

III. Service Interface(s)

Figure 2:
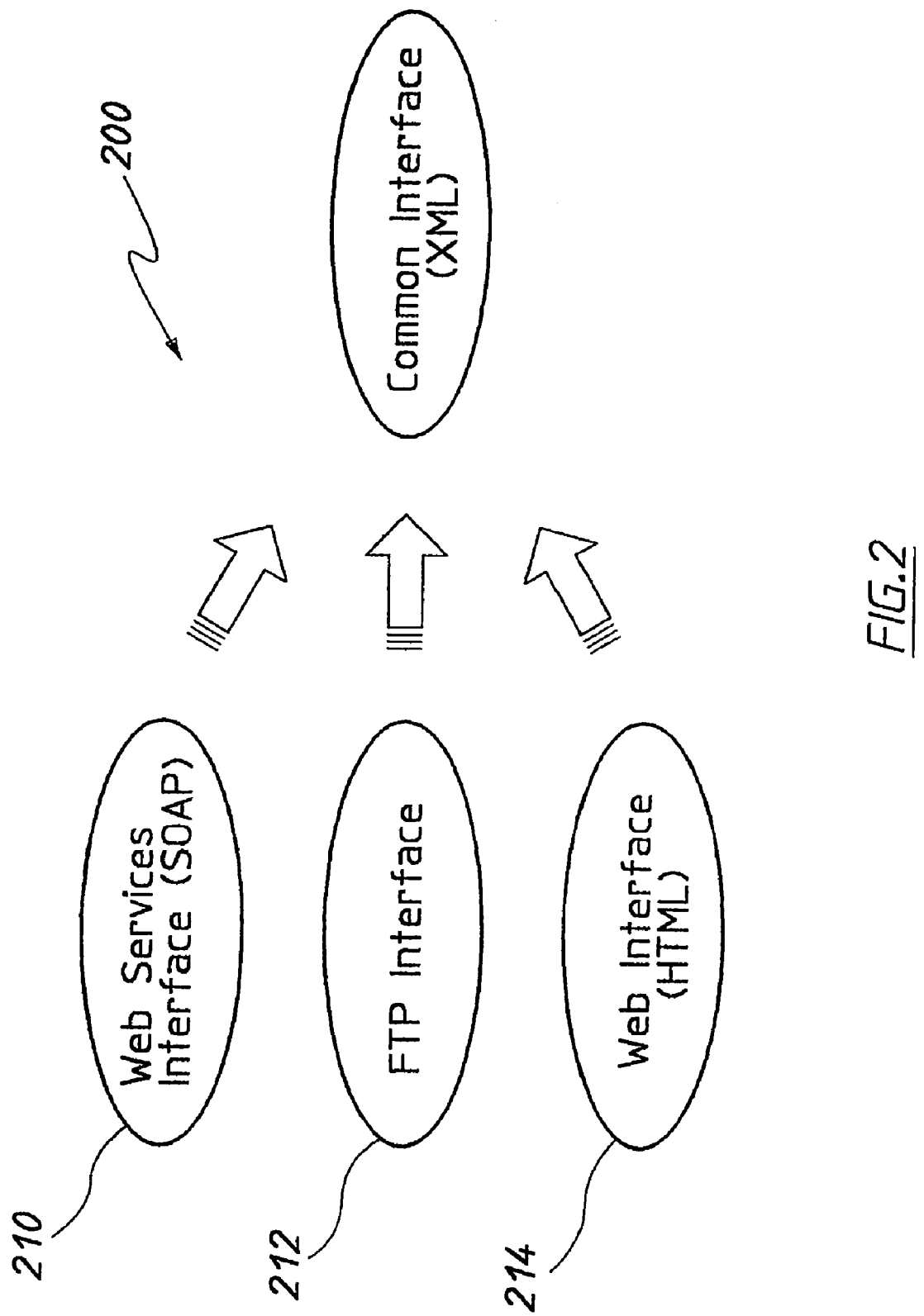
FIG. 2 is a block diagram illustrating a services interface for three different access methods in accordance with the embodiment of the invention.

The embodiment of the invention is preferably provided as a hosted service, commonly known as the Application Service Provider (ASP) model. Preferably, three different access methods are used for accessing the hosted service and are supported by three different interface components, respectively. The services interface 200 is depicted in FIG. 2 including a Web Services Interface (SOAP) 210, an FTP interface 212, and a Web Graphical User interface (Browser/HTML based) 214. The three external interface components 210, 212 and 214 all utilise the same underlying common interface component 216, which is preferably XML.

A Web Service is a formal interface described by the Universal Description, Discovery and Integration (UDDI) and Web Services Definition Language (WSDL) standards. The hosted service provides an interface 210 that conforms to this standard. FTP (File Transfer Protocol) is a common protocol for transferring files over the Internet. The hosted service provides the FTP interface 212, because this interface 212 is a commonly understood interface that is easy for originators to access. The Web Graphical User interface 214 is provided to enable originators to submit jobs manually via a graphical user interface.

The various interfaces 210, 212, 214 are lightweight and marshal data into a common format for submission to an underlying common interface 216 as shown in FIG. 2. The interface parameters are passed as XML. An XML Schema has also been defined to describe a job. This schema provides a mechanism for providing different document templates for different media, and also for specifying other preferences for a particular job. The format of this common XML Job Description File ('JobDescriptor' XML) 108 of FIG. 1, including important tags within this XML schema, is set forth in Table 1.

TABLE 1

| Tag | Description |
| --- | --- |
| <job_type> | The job_type tag allows for an overall job type to be set which defines the media via which all recipients are sent messages. This tag takes precedence over the transmission_rules tag, which is intended for use with the impending escalation functionality, allowing for a set of transmission rules to be supplied as escalation rules at a job level rather than at the recipient level.<br>Supported job types include:<br><job_type>FAX ONLY</job_type><br><job_type>EMAIL ONLY</job_type><br><job_type>FAX AND EMAIL</job_type><br><job_type>FAX AND EMAIL AND SMS<job_type><br>(. . . etc - all combinations of media are allowed)<br><job_type>LIST PREFERENCE</job_type><br>The LIST PREFERENCE job type uses the transmission rules set at a recipient level. See description of the RecipientData.xml for more details. |
| <transmission_rules> | The transmission_rules tag allows for a set of transmission rules to be defined at the job level. These rules are applied to all recipients for that particular job, e.g.,<br><transmission_rules>f:e</transmission_rules> |
| <fax_template> | The fax template tag allows a template to be defined for documents produced for the purpose of fax transmission, e.g.,<br><fax_template>AcmeRelativeImage.xsl</fax_template> |
| <email_template> | The email template tag allows a template to be defined for documents produced for the purpose of email transmission, e.g.<br><email_template>AcmeRelativeImage.xsl</email_template> |
| <paper_template> | The paper template tag allows a template to be defined for documents produced for the purpose of sending via snail mail, e.g.,<br><paper_template>AcmeRelativeImage.xsl</paper_template> |
| <email_body_template> | The email body template allows for a text email body to be included which are sent to all recipients receiving messaging via the email media. This tag contains text data that is included as the email body. The tag may contain merge fields that are defined <<ff_(merge_field_name)>>. The merge field tags are created by holding down the alt key and typing 0171 to create << and 0187 to create >>, e.g.,<br><email_body_template><br>Dear <<ff_firstname>>,<br>Please find included your statement for the month of <<ff_month>>.<br>Regards<br><<ff_creditmanager>><br></email_body_template> |
| <email_subject_template> | The email subject template allows for a text email subject to be included that is sent to all recipients receiving messaging via the email media. This tag contains text data that are included as the email subject. The tag may contain merge fields that are defined <<ff_(merge_field_name)>>. The merge field tags are created by holding down the alt key and typing 0171 to create << and 0187 to create >>, e.g.,<br><email_subject_template><br>Please find included your statement for the month of <<ff_month>>.<br></email_subject_template> |
| <sms_template> | The email subject template allows for an SMS message body to be included to be sent to recipients. This tag contains text data that is sent as the SMS body and may contain merge fields that are defined <<ff_(merge_field_name)>>. The merge field tags are created by holding down the alt key and typing 0171 to create << and 0187 to create >>, e.g.,<br><sms_template><br>Your statement for the month of <<ff_month>> has been emailed to <<ff_emailaddress>>.<br></sms_template> |

TABLE 1-continued

| Tag | Description |
|---|---|
| <associated_image> | The associated image tag allows for the inclusion of 0-n images which may be required as part of a document merge, e.g. <associated_image>Acme.gif</associated_image> |
| <recipient_list> | The recipient list tag defines the recipient data that is used to supply all recipient details and merge data. See description of RecipientData.xml for more information. E.g., <recipient_list>AcmeSmall.xml</recipient_list> |

IV. Pluggable Data File Converter

Originators using the hosted service submit a file containing information about the recipients being targeted as part of a particular bulk communication. These files may be extracts from an internal database or accounting system of a business, organization, etc. The embodiment of the invention standardises on XML input files, and thus data conversion 300 converts the recipient list file 310 into XML 314 as shown FIG. 3. For example, the recipient list file 310 may be a text or flat file. This done using a data file converter 312, which is preferably a component that enables customized converters to be plugged into the underlying platform. The conversion of the input files is then transparent to the user of the service. In the embodiment of the invention, data conversion is implemented as follows:

A Java interface is defined called CustomMapperInterface

The Java interface has the following method defined:
        ConvertFile(Hashmap hm, Destination d)

The JobDescriptor.xml input file has a 'CustomJavaMapping' tag that indicates whether a custom mapper is to be used, a 'CustomJavaClassName' tag, whereby a conversion Class can be specified, and 'JavaMappingFile' tags whereby a keyed set of file names can be specified.

The Job processing engine uses Java's reflection capability to instantiate the Custom Java Converter Class and passes the JavaMappingFile parameters to the Custom Java Converter class in a Hashmap.

The Custom Java Class then processes the file parameters and generates the converted file.

V. Document Merger

The embodiment of the invention formats data for delivery to different types of media.

Figure 4:
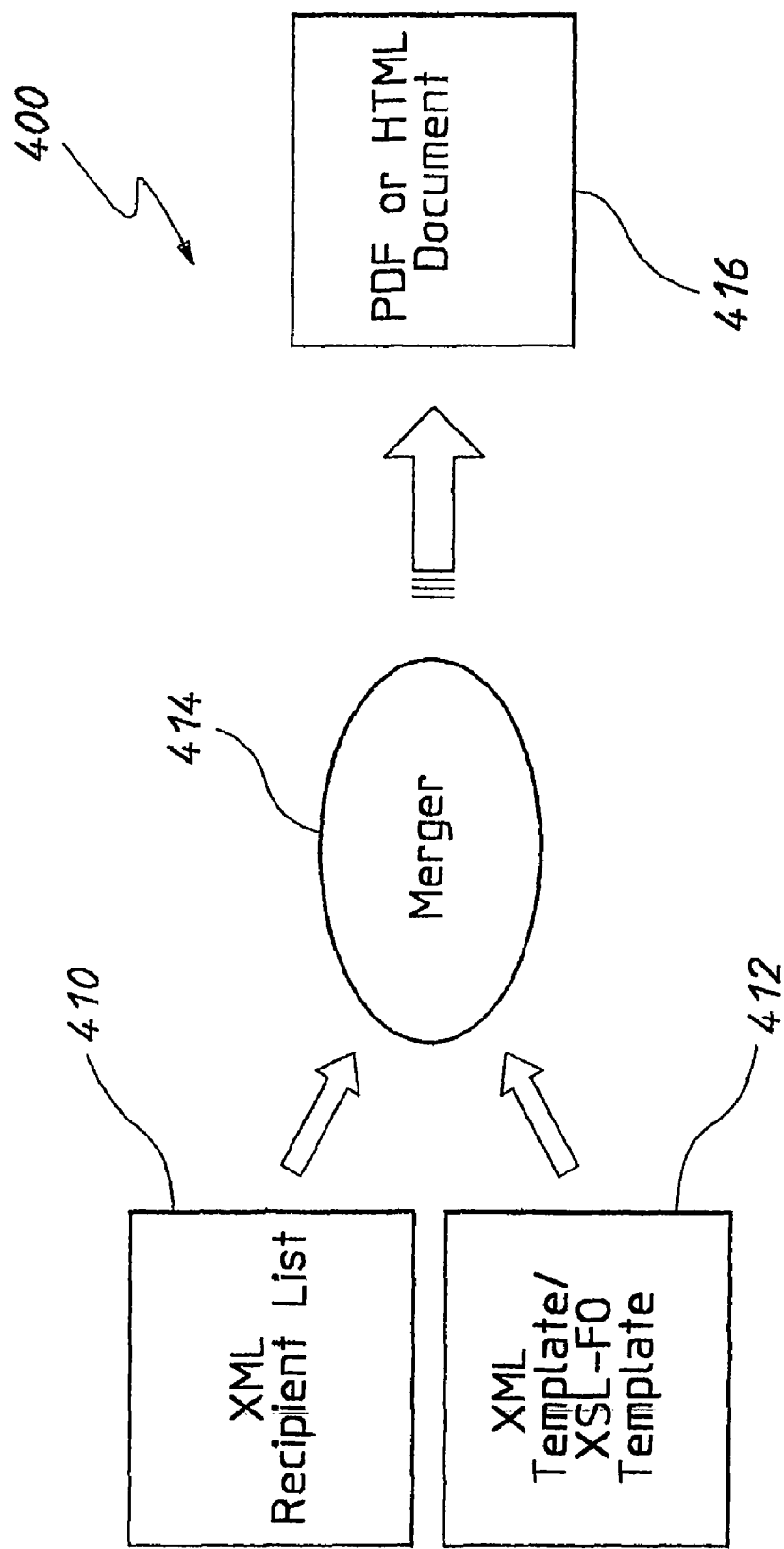
FIG. 4 is a block diagram illustrating a document merger in accordance with the embodiment of the invention.
Figure 5A:
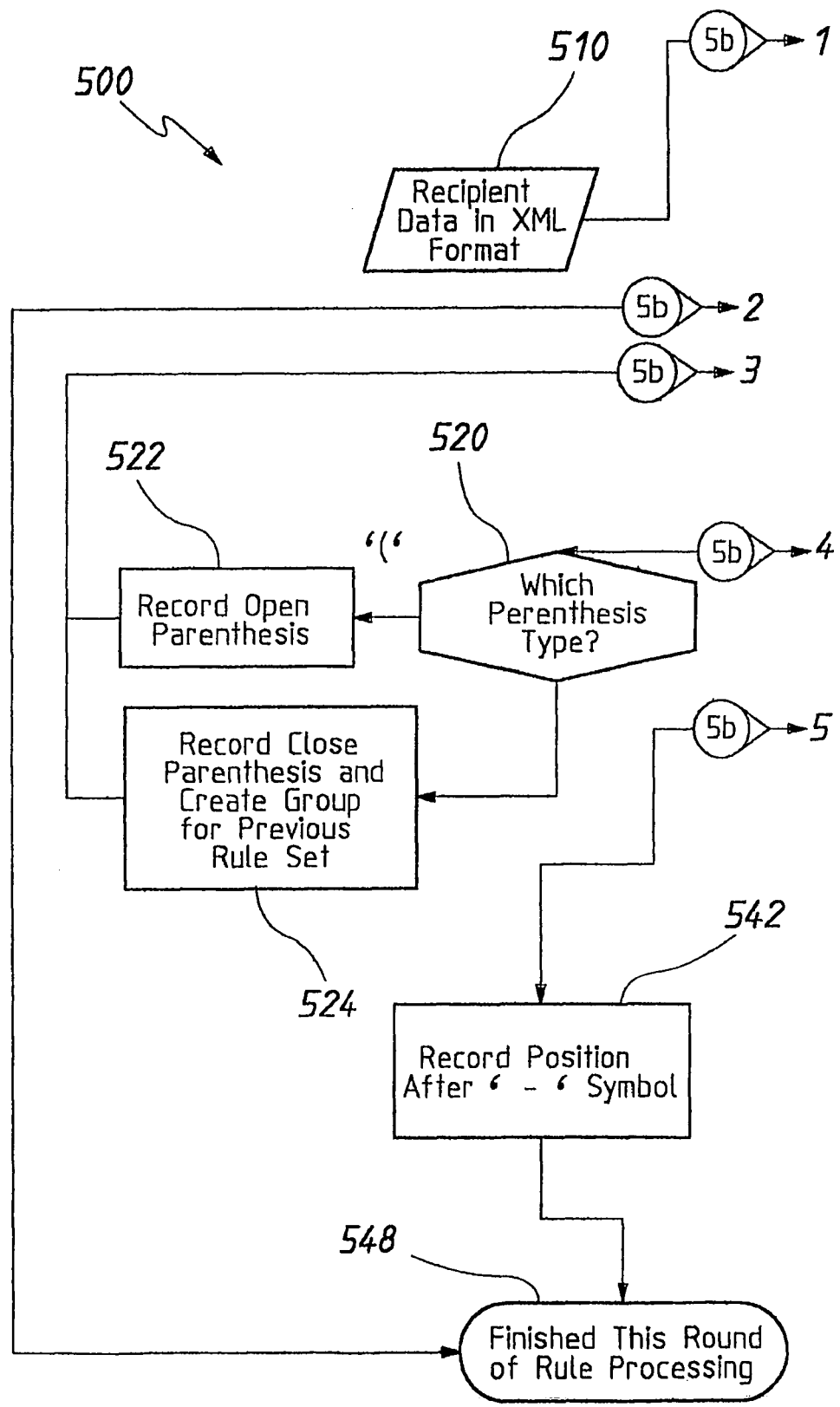
FIG. 5 is a detailed flow diagram illustrating a process for handling preference rules for recipients and corresponding delivery media for each recipient in accordance with the embodiment of the invention.
Figure 5B:
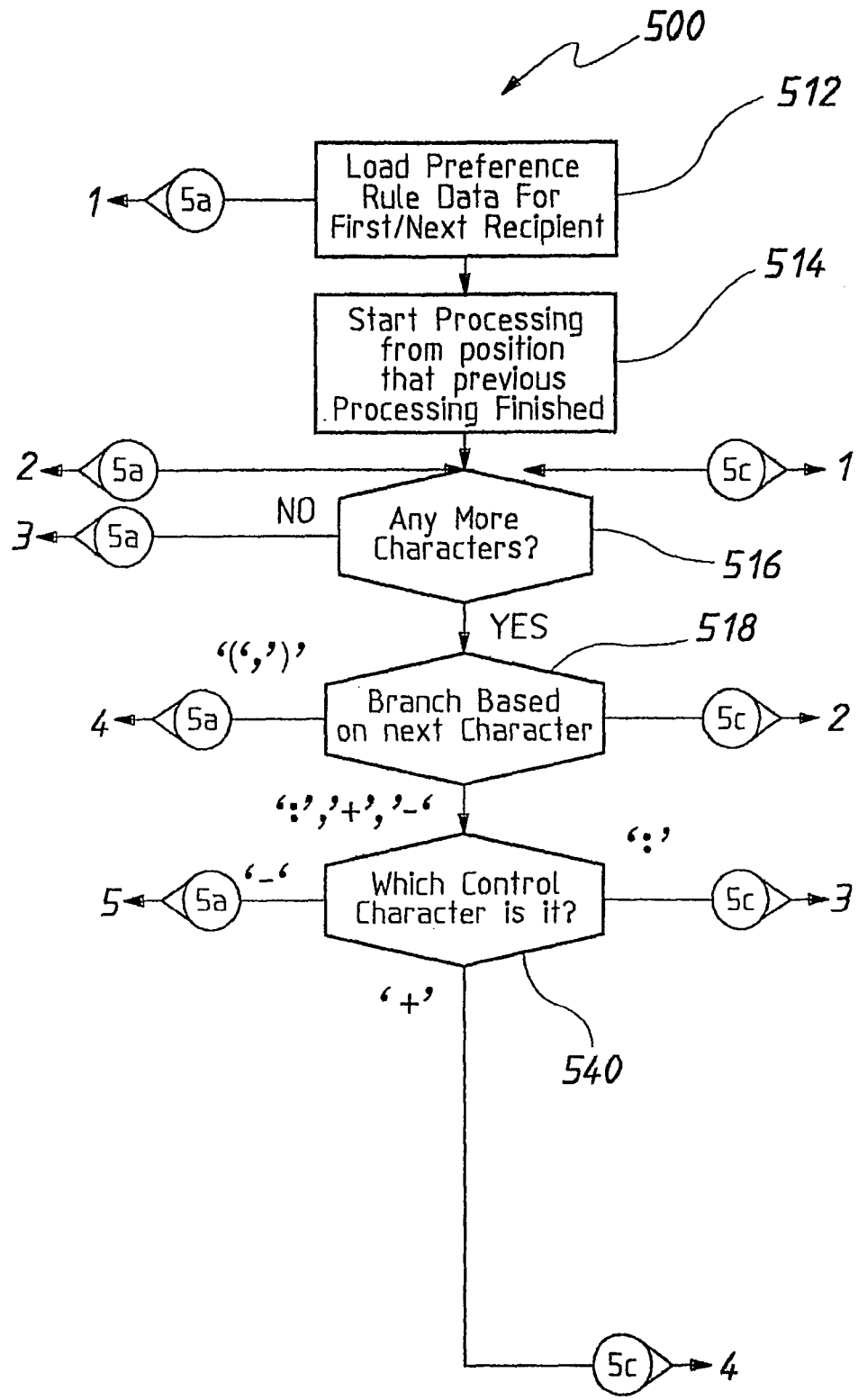
Figure 5C:
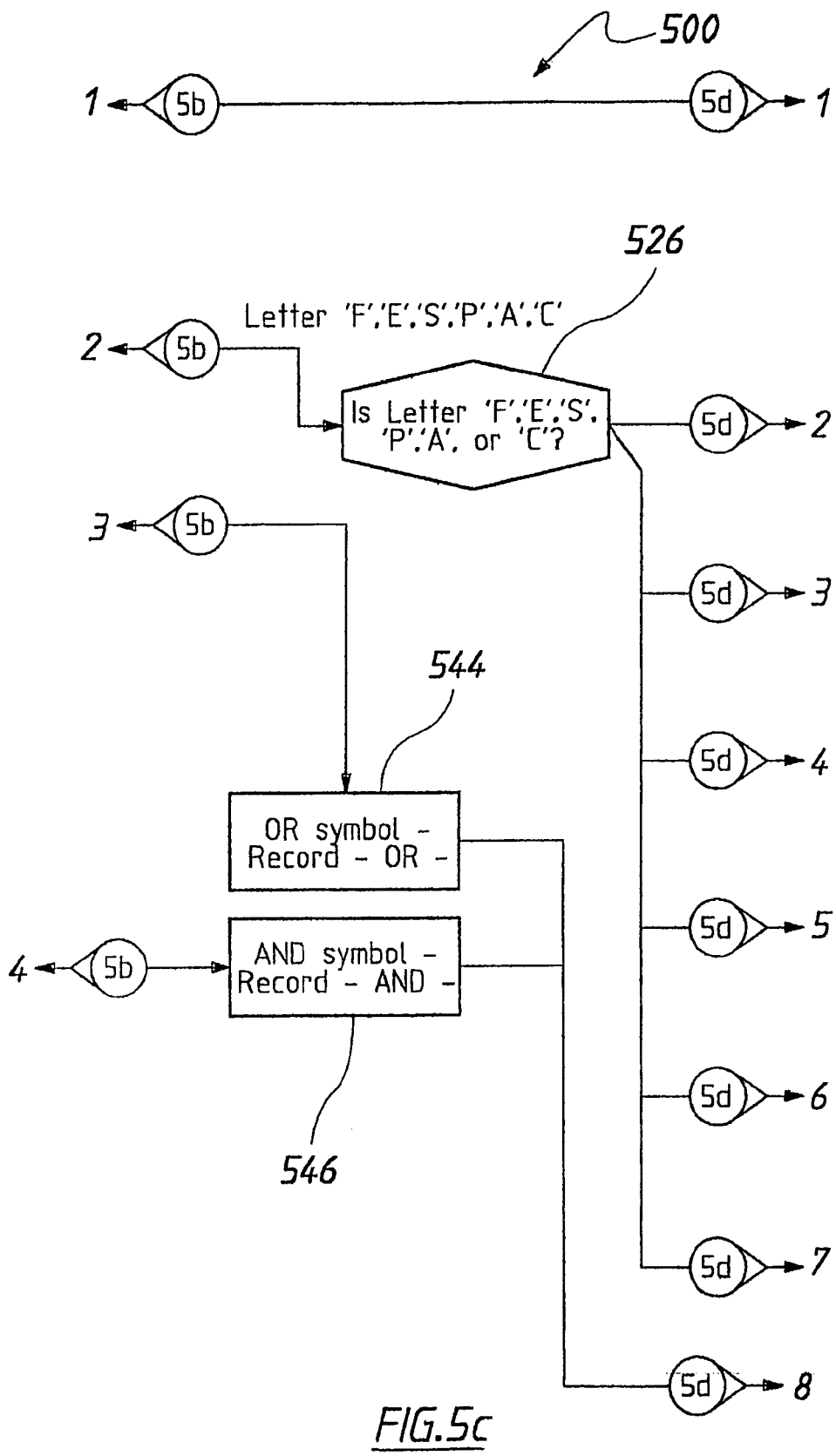
Figure 5D:
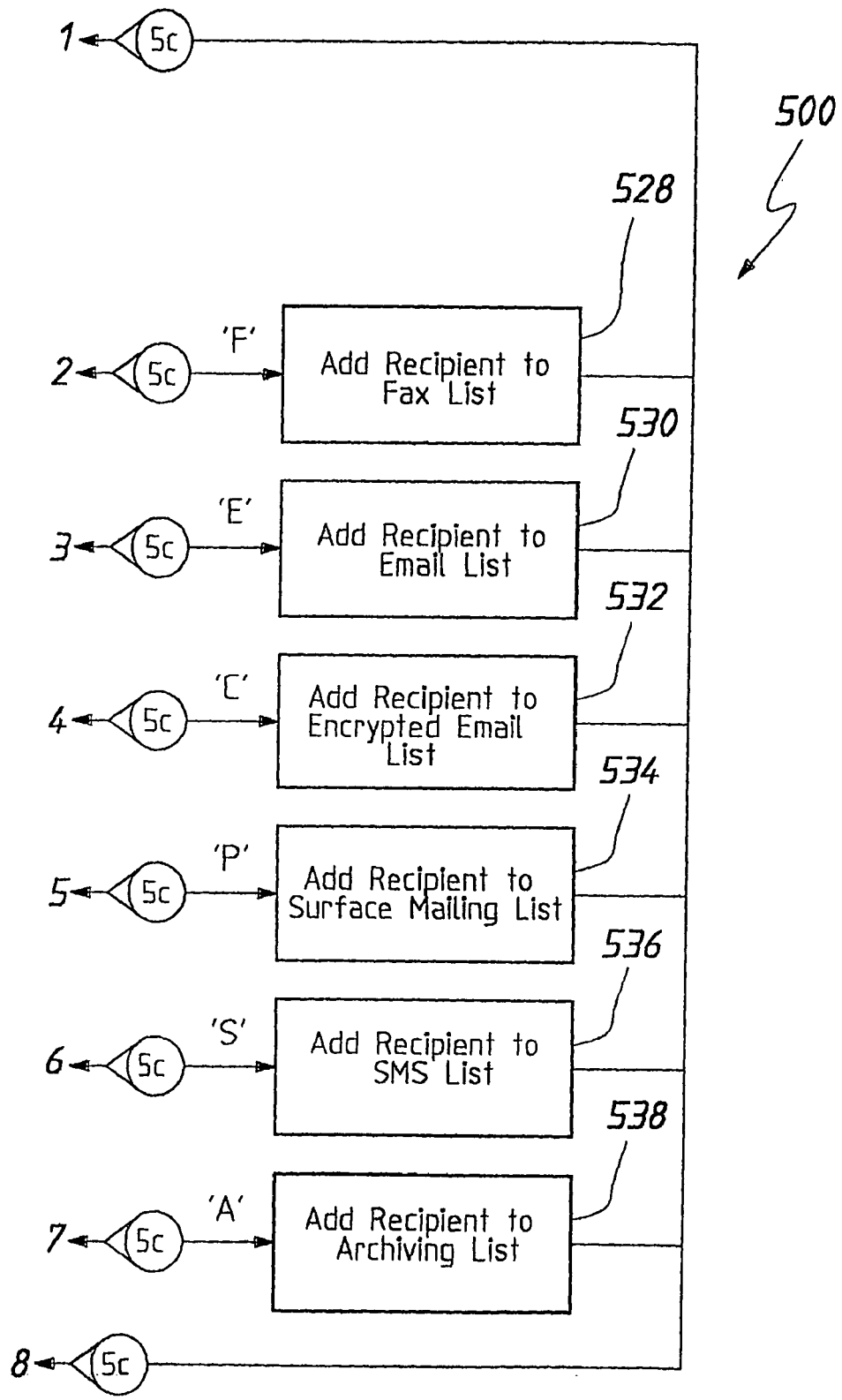

FIG. 4 illustrates how document merging 400 is accordingly handled. The XML recipient list 410 (corresponding to the list 314 of FIG. 3) and an XSL or XSL-FO template 412 are provided to a document merger module or component 414 to produce the document 416 in a desired format, preferably PDF or HTML. To carry out this presentation formatting, the XSL and XSL-FO standards are used for defining the rules for formatting and presentation of XML data. The document merger module or component 414 applies the chosen XSL or XSL-FO template 412 to the underlying XML recipient list 410 to produce the PDF or HTML document 416 for transmission to the client.

To enable a single recipient list to be used for merging (personalization) and delivery of data to a variety of different media, based on the recipients' delivery preferences, a special XML recipient list schema 1000 has been defined and is illustrated in FIGS. 10a, 10b, and 10c. While a specific schema is set forth in FIG. 10, it will be appreciated by those skilled in the art, in the light of this disclosure, that modifications and/or substitutions may be made to the schema without departing from the scope and spirit of the invention. The schema 1000 is broken into two major sub-sections:

1. A transmission-rule-set that describes the addressing and preference criteria for a recipient for the different media.

2. A recipient-data section that contains data to be merged into the document being transmitted. The recipient-data section can be structured according to our XML schema. Alternatively, there is provision for an XML-data sub element type that allows originators to structure this part of the recipient-data according to an XML schema of their own.

VI. Preference Rules Process

The embodiment of the invention allows preference rules, including complex ones, to be specified for individual recipients using a specified notation for defining the preference rules. For example, the embodiment of the invention utilises the following notation (F:S-P) to mean send a Fax and an SMS, and if both of these fail, send by Surface Mail (Paper) instead. Preferably, a user interface is used for selecting delivery preferences, and a shorthand notation is used for specifying delivery preferences. The rules notation for delivery media types are set forth in detail in Table 2.

TABLE 2

| Media | Notation |
|---|---|
| Fax | F or f |
| Email | E or e |
| SMS | S or s |
| Paper | P or p |
| Voice | V or v |
| Archiving | A or a |
| Encrypted Email (cipher) | C or c |

New Media Types to be determined

To cater for precedence rules and also the ability to combine more than one media type into a rule, several operators are used. A list preference is specified as a series of rules, separated by a dash (-). The dash (-) indicates that if the previous rule fails, use the next rule. A rule can be as simple as specifying a single media type (e.g., F for Fax) or a string of media types separated by the plus (+) or colon (:) operators, described hereinafter. Parentheses '( )' are used to encapsulate rules that involve more than one media type.

An example of a simple precedence rule demonstrating the use of the dash (-) operator is:

E-F-P.     (1)

This rule denotes send an Email (rule 1). If rule 1 fails (e.g. if no email address is specified), then send a Fax (rule 2). If rule 2 fails, then send the item via paper-based media (rule 3).

If two media types are separated by a plus (+) operator, this denotes send the information to both of those particular media types (no precedence order). The rule fails if neither can be sent to. For example, the rule (F+E) indicates to try to send both an email and a fax. The rule fails if neither a fax number nor an email address is provided.

An example of the combination of the plus (+) operator and the precedence operator (−) is:

(E+F)-P. (2)

This rule denotes send both a fax and an email. If neither of these media succeed (e.g., because a fax number and a email address are not specified), the dash (-) operator comes into play and processing moves to the next rule, which denotes to send the document by Paper.

If two media types are separated by a colon (:) operator, this denotes to send to both of the particular media types (no precedence order; i.e., same as the plus (+) operator). However, the rule fails if one of the media is not able to be sent to. For example, (F:E) denotes to try to send both an email and a fax. The rule fails if either the fax number or an email address is not provided. An example of a combination of the colon (:) operator and the precedence operator (−) is:

(E:F)-P. (3)

This rule denotes to send both a fax and an email. If either media fails (e.g, because neither a fax number nor an email address is specified, the dash (-) operator comes into play and processing moves to the next rule, which denotes to send the document by Paper.

The precedence order for the various operators is as follows: ( ), +, :, −. The parenthesis is evaluated first, the plus (+) operator is evaluated before the colon (:), which are all evaluated before the dash (-). An example illustrating a complex rule, utilizing all of the different operators and showing how the precedence rules work, is:

(F:F+S)-(P:V). (4)

In this scenario, the parentheses take precedence, so the rule (E:F+S) is evaluated first. The plus (+) follows in preference to the parentheses, so the rule F+S is evaluated next. This denotes to send the information to both Fax and SMS. The ':' is evaluated next, so the rule E:"F+S" is the next thing to be evaluated. This denotes to send the information to both email and "F+S" (which denotes to send to Fax and SMS). The information is sent to all three of email, fax and SMS. If there is a failure of the rule (F+S), this is because both the fax and SMS failed. A failure of the rule E:"F+S" occurs because either the email or the "F+S" failed. If the whole first rule E:"F+S" fails, the dash (-) comes into play and the next rule comes into effect (P:V). This rule (P:V) denotes to send the information to both Paper and Voice. In summary, the rule of Example (4) denotes to send the information to Email, Fax and SMS media. If either the email fails (e.g., no email address specified), or both the SMS and Fax fail (e.g., no SMS and fax numbers), then the information is sent to both Paper and Voice.

Figure 8:
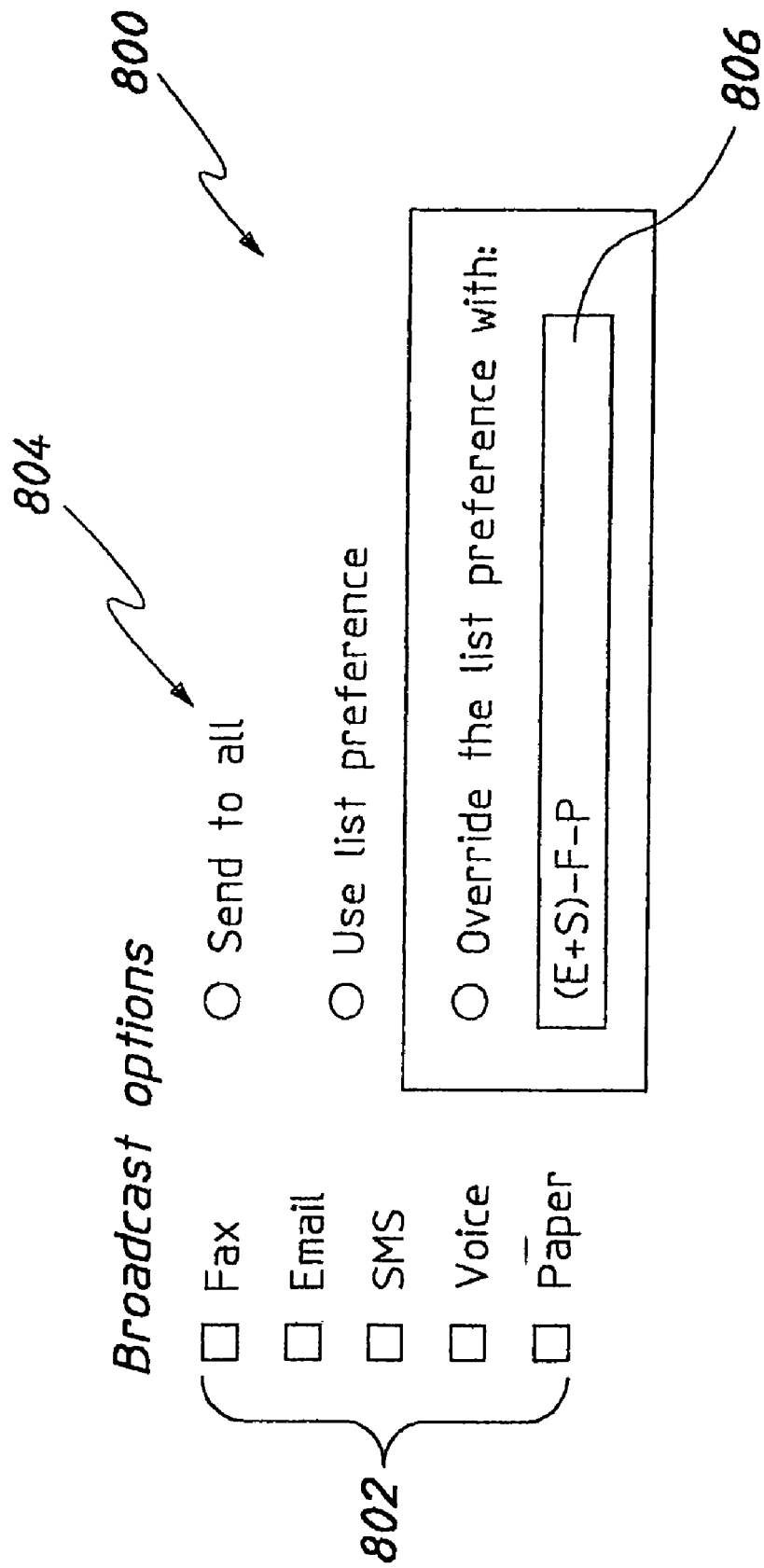
FIG. 8 is a screenshot of a user interface for recipients to specify delivery preferences in accordance with the embodiment of the invention.

In the embodiment of the invention, a user interface component or module allows quick entry of simple delivery combinations while at the same time providing the option of entering complex rules. The user interface component 800 shown in FIG. 8 is entitled broadcast options and contains several tick boxes 802 for each media type, including fax, email, SMS, voice, and paper. Radio buttons 804 are also provided to send to all and use list preference. A user can specify a rule to override the list preference in box text entry 806 (e.g., (E+S)-F-P).

The preference rules processor interprets the recipient preferences and determines for each recipient what delivery media to send to. FIG. 5 shows a method 500 for handling the preference rules. Recipient data 510 in the XML format is provided to step 512, which loads preference rule data for the first, or next, recipient as the case may be. In step 514, processing starts from the position that any previous processing finished. In step 516, a check is made to determine if any more characters remain for processing. If step 516 returns false (NO), the current round of rule processing terminates in step 548. Otherwise, if step 516 returns true (YES), processing continues at step 518.

In step 518, an execution branch is performed dependent on the character representing a precedence operator or media notation. If step 518 determines "("or")", processing continues at step 520. In step 520, a check is made to determine what parenthesis type is involved. If a "(" is determined in step 520, processing continues at step 522 and an open parenthesis is recorded. Otherwise if a ")" is determined in step 520, processing continues at step 524. In step 524, a close parenthesis is recorded and a group for the previous rule set is created. From each of steps 522 and 524, processing continues at step 516.

If step 518 determines the current character is a letter (F, E, S, P, A, C), processing continues at step 526. In step 526, a check is made to determine if the letter is F, E, S, P, A, or C. If step 526 returns F, processing continues at step 528 and the recipient is added to the fax list. If step 526 returns E, processing continues at step 530 and the recipient is added to the email list. If step 526 returns C, processing continues at step 532 and the recipient is added to the encrypted email list. If step 526 returns P, processing continues at step 534 and the recipient is added to the surface mailing (paper) list. If step 526 returns S, processing continues at step 536 and the recipient is added to the SMS list. If step 526 returns A, processing continues at step 538 and the recipient is added to the archiving list. From each of steps 528, 530, 532, 534, 536, and 538, processing continues at step 516.

If step 518 determines the current character is an operator ":", "+", or "−", processing continues at step 540. In step 540, a check is made to determine which operator is the current character. If step 540 returns "-", processing continues at step 542 and the position after the "-" symbol is record. Processing then proceeds to step 548. If step 540 returns "-", processing continues at step 544 and "-" (OR) operator is recorded. Processing continues at step 516. If step 540 returns "+", processing continues at step 546 and "+" (AND) operator is recorded. Processing then continues at step 516.

VII. Transmitters

The transmitters carry out final conversion of data for presentation to the carrier interface. For example, for faxing, a PDF document output from the document merger process is converted into a Tiff file for presentation to a fax carrier. The system allows different transmitters to be plugged in where appropriate for different carriers.

VIII. Carrier Interfaces

The carrier interfaces carry out final data conversion and batching into a carrier-specific file format for transmission to the chosen carrier for that particular media type. Alternative carriers may be plugged in for the different carrier interfaces, and the choice of carrier may be dynamically configured as part of an originator's user profile.

IX. Escalation Processor

Figure 6A:
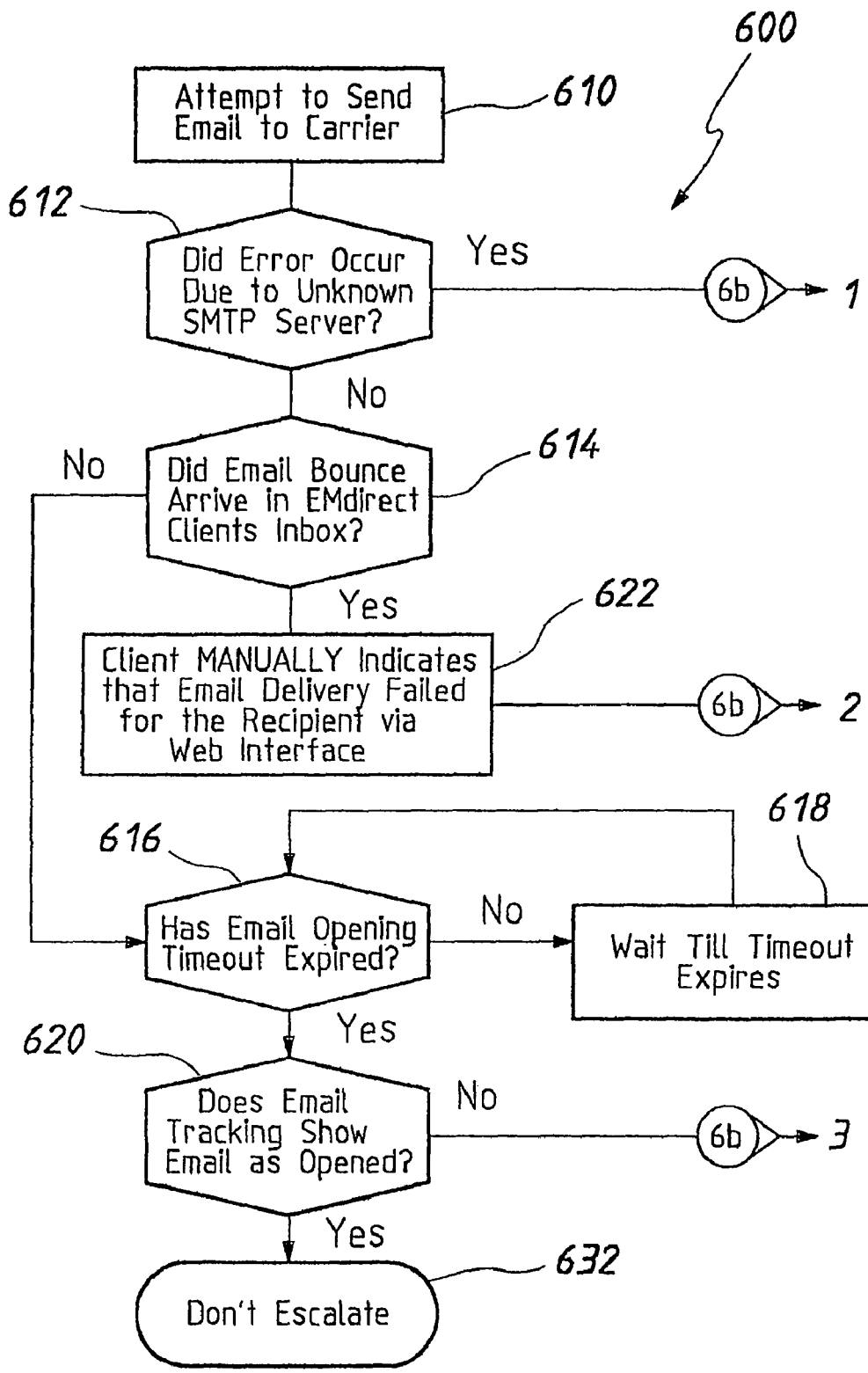
FIG. 6 is a detailed flow diagram illustrating a process for escalation processing based on recipient preferences in accordance with the embodiment of the invention.
Figure 6B:
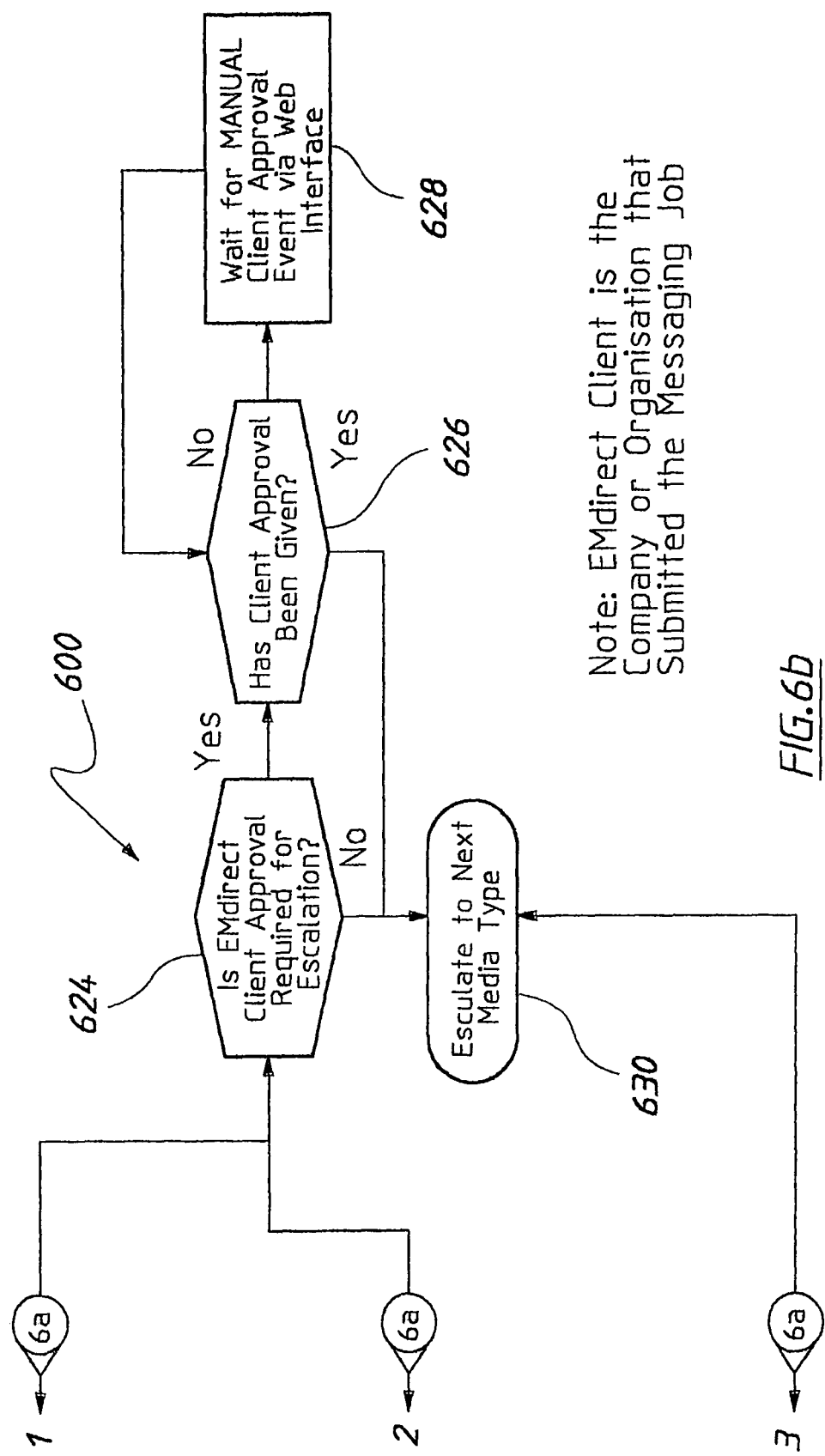

The escalation process checks for a response from the carrier interfaces and parses the results of the transmission for each recipient. If a transmission fails, the escalation process uses the recipients' preference rules (via the preference rules processor) to determine whether to retry the communication via a different media, and manages the activity of re-scheduling the transmission of data via the different media. The flow diagram in FIG. 6 illustrates escalation processing 600 and in particular how the escalation rules for Email work (Email being the most complicated). For the other media types, the escalation is simply based upon success/failure reports received back from the carrier.

In FIG. 6, processing commences in step 610 in which an attempt is made to send email to the carrier. In step 612, a check is made to determine if an error occurred due to an unknown SMTP server. If step 612 returns true (YES), processing continues at step 624. If step 612 returns false (NO), processing continues at step 614. In step 614, a check is made to determine if the bounced email arrived in the originator's (client's) inbox at the hosted service (Emdirect). If step 614 returns true (YES), processing continues at step 622. In step 622, the originator manually indicates that the email delivery failed for the recipient. This is preferably done via a web interface. Processing then continues at step 624. If step 614 returns false (N)), processing continues at step 616.

In step 616, a check is made to determine if the email opening timeout has expired. If step 616 returns false (NO), processing continues at step 618. In step 618, processing waits until the timeout expires and then processing proceeds to step 616. If step 616 returns true (YES), processing continues at step 620. In step 620, a check is made to determine if email tracking shows that the email has been opened. If step 620 returns true (YES), processing terminates in step 632 and escalation is not performed. If step 620 returns false (NO), processing continues at step 630.

In step 624, a check is made to determine if the originator's approval is required for escalation. If step 624 returns false (NO), processing continues at step 630 and escalation to the next media type occurs. Otherwise, if step 624 returns true (YES), processing continues at step 626. In step 626, a check is made to determine if originator approval has been given. If step 626 returns false (NO), processing continues at step 628. In step 628, manual originator approval event is awaited via web interface. Processing then continues at step 626. If step 626 returns true (YES), processing continues at step 630. Further details of this process are set forth hereinafter.

The escalation processing provides the following functionality:

The ability to provide escalation functionality as an optional extra (configured at a user level) and charge accordingly.

The ability at a Job level to specify whether or not escalation is required for a particular job.

When "List Preference" is chosen on Job Submission, the ability for escalation to work according to a recipient's delivery preferences.

If a broadcast choice other than "List Preference" is used, the ability for escalation to follow the choice specified (e.g. email+Fax+Paper first tries to email the recipient, then if that fails goes to fax, and then if that fails goes to paper).

The ability for an originator to manually intervene in the escalation process and manually indicate which escalations are to proceed or not.

The ability for a user to manually flag emails as requiring escalation (so originators can see the bounces that arrive and then go to the web site and mark those as requiring escalation).

For the different media types, the escalation criteria are as follows. For some of the media types, alternative mechanisms have been described. Where alternatives are available, the originator has the choice of which escalation criteria the originator would like to apply. This is configured as part of the originator's user preferences.

If fax was not able to be sent after the prescribed number of retries, escalation may occur. This can be due to a variety of reasons, from an invalid fax number, through to a network difficulty (NCN) connecting to the specified fax machine.

If email is not tracked as opened by the recipient within the prescribed number of days, escalation may occur. No automated processing of email bounces may be carried out, however, a facility may be provided whereby the submitter of the job can manually indicate that particular emails were not successfully sent (via the web interface). If the SMS number could not be contacted (is invalid), escalation may occur. This is dependent on whether or not this level of reporting can be provided by the mobile service provider.

If the surface mail address cannot be successfully barcoded, escalation may occur. The inability to barcode a mail address can be for a variety of reasons—for example there may be no postcode or an invalid postcode, or an invalid street number for a particular street.

The following fields are available on the user configuration screen to store the following user preferences in relation to escalation:

Escalate Email if no record of opening?
If yes to above, what is number of days email needs to be unopened before escalating?
Want ability to manually mark an email as requiring escalation via the Web Interface?
Want to Manually Intervene before any escalations actually occur?

For originators that have 'Escalation' configured, all jobs submitted via the web interface automatically have escalation switched on. Escalation proceeds according to either the broadcast preference chosen, or if List preference is chosen as the broadcast preference, then escalation proceeds according to the list preference of the individual recipients.

For originators that have escalation configured, an additional option is available via the FTP interface in the JobDescriptor.XML file. This is the 'Escalation' flag. If the 'Escalation' flag is set to "Y", then escalation applies for this Job. Escalation proceeds according to either the broadcast preference chosen, or if List preference is chosen as the broadcast preference, escalation proceeds according to the list preference of the individual recipients.

The Job Processing engine tracks the delivery status of each recipient and moves recipients along the escalation path when an escalation event occurs for that recipient (e.g. receipt of a bad fax report, or non-opening of an email within X days, or manual flagging by user that a particular job requires escalation).

Manual flagging of escalation for emails may be set via the web interface. After submitting a Job, an originator is able to search for the Job, and then select an 'Add Email Escalations' button. This provides the originator with a list of all email recipients, and the originator is able to check an 'escalate' box next to any recipients that the originator would like escalated. The purpose of this screen is primarily to cater for the situation where the originator has received an email bounce and so would like to manually indicate that escalation is required. This facility also caters for other situations where the originator/sender has some other prior knowledge that the recipient will not receive the email (for example—emailing to the accounts dept, but know that the regular email contact is on holidays and so want to send a fax/letter so that their stand-in receives the fax/letter).

Escalation Status After submitting a Job, a user can at any time search for a Job and then view the current status of all of the recipients and whether the recipients have escalated or are awaiting originator approval to proceed with escalation. The reason for the escalation is also be shown (e.g. "fax failed after 3 retries", "Email unopened within 5 days", "Street number invalid for street address", "manually flagged for escalation", etc.).

Escalation Processing From the Escalation Status screen, if the originator has 'manual intervention' configured in their profile, the originator is able to select a 'Process Escalations' function. This displays the list of recipients awaiting escalation. For any recipient that has had an escalation event occur, there is a 'proceed' checkbox next to the line for that recipient's status. The originator is able to tick some or all (via a 'tick all' button) of the recipients that originator would like the escalation to proceed for and then press a 'Proceed with Selected Escalations' button.

Message Retry From the Escalation Status screen, the originator is also able to select a 'Retry Messages' function, which displays a list of recipients awaiting escalation. Instead of escalating, the originator is able to select either 'Retry' or 'Retry with Modified Address' against a particular recipient. If 'Retry with Modified Address' was selected, the user is first shown a screen to prompt them for the modified fax number, email address or surface mail address. For both options the application then proceeds to attempt a re-send to that recipient using the old or updated details. The user can carry out this procedure (one at a time) for each recipient they want to resend to. If the resend attempt succeeds, the is will no longer in the escalation state. If the resend attempt fails, the recipient reverts back to the awaiting escalation state. Whenever a 'Retry with Modified Address' is selected, the originator is also emailed a copy of the original and modified details to remind the originator to update their own database.

When an Escalation event occurs for a set of recipients (either due to the receipt of a Fax status report that shows failures, or alternately the timing out of the 'opened by' period that is used to indicate an email requires escalating), an email is sent to the originator that submitted the job. The originator can then go to the Escalation Status screen on the web to proceed manually with the escalations if the originator has the 'Manual Intervention' option configured.

X. Reporting Component

The reporting component is responsible for receiving the delivery reports from the carrier interfaces, and combining the delivery reports together into one common status format for storage into a relational database. The reporting component also comprises of graphical interfaces and tools for use by originators to generate and view integrated delivery reports (either viewing them via a Web Based HTML interface, or receiving them via Email).

Figure 7A:
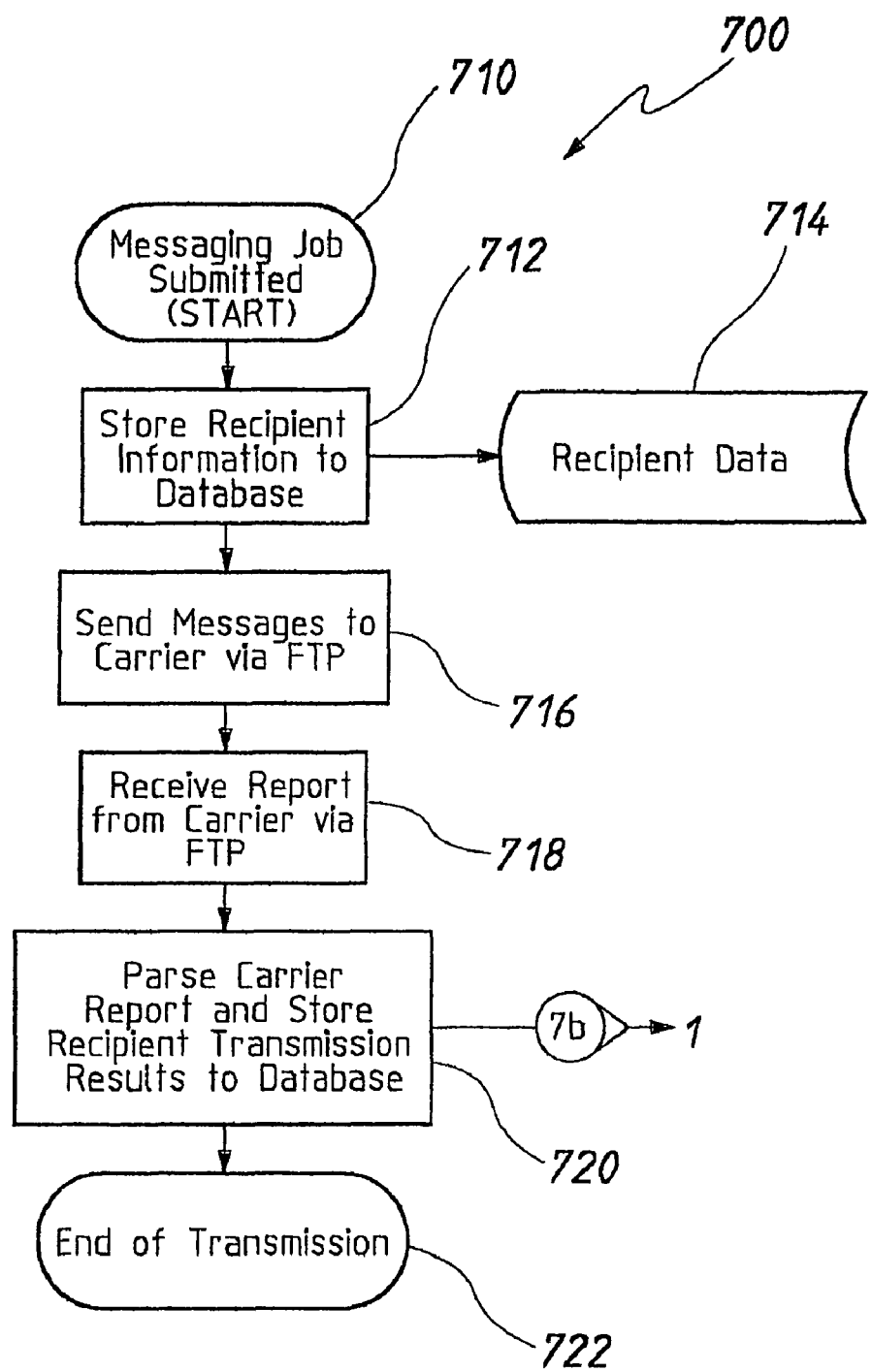
FIG. 7 is a flow diagram illustrating a process for generating integrated reports in accordance with the embodiment of the invention.
Figure 7B:
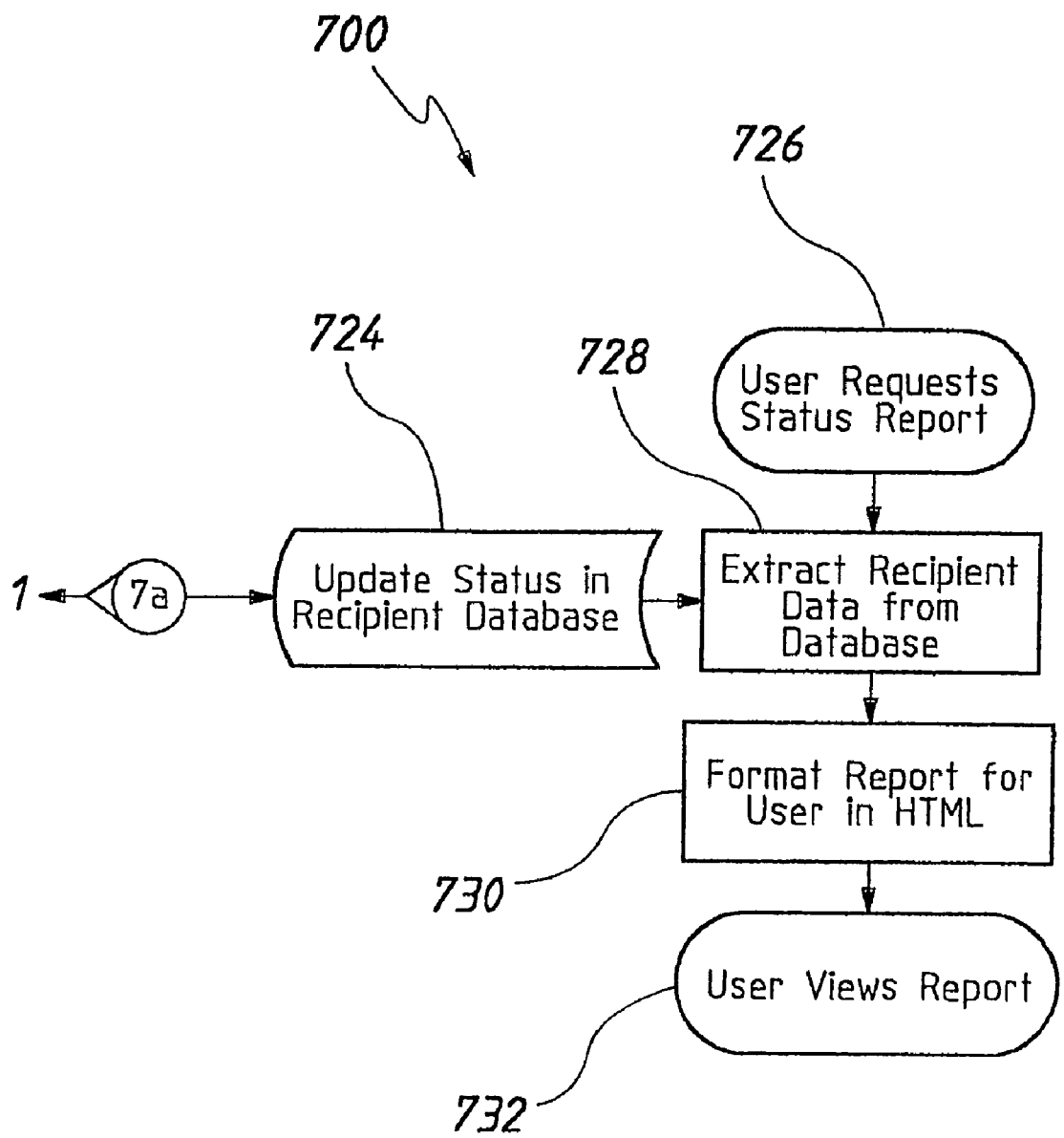

FIG. 7 is a flow diagram illustrating the process 700 of how the different carrier reports are parsed and stored in a database to enable a web site to present integrated reports to an originator. In step 710, processing commences by submitting a messaging job. In step 712, recipient information is stored in the database of recipient data 714. In step 716, messages are sent to the carrier via FTP. In step 718, the report is received from the carrier via FTP. In step 720, the carrier report is parsed and the recipient transmission results are stored in the database. Transmission ends in step 722. From step 720, the status is updated in the recipient database.

In a separate but related process, the user originator may request the status report in step 726. The updated status information in the recipient database is provided to step 728, which follows from step 726.

XI. Concurrency/Pipelining of Merge/Transmission

Figure 9:
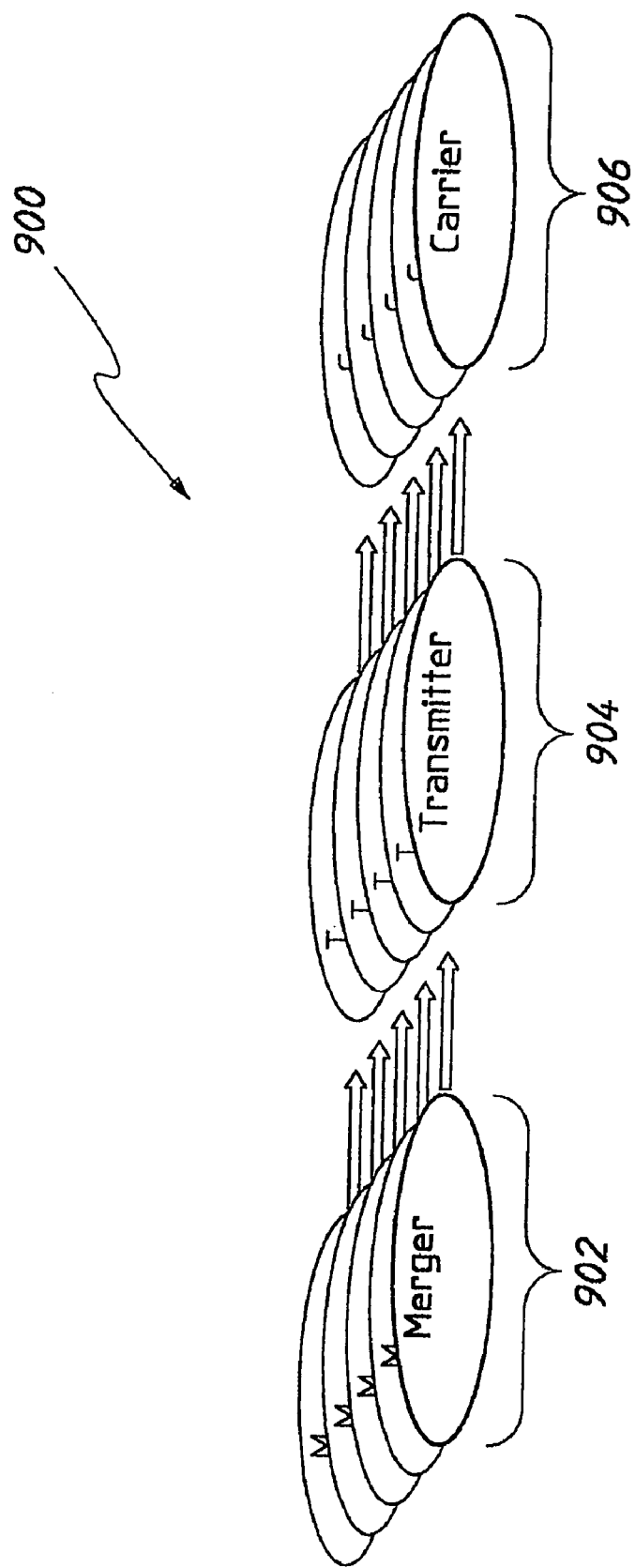
FIG. 9 is a block diagram illustrating concurrency and pipelining of merge and transmission processing in accordance with the embodiment of the invention.

The hosted service is designed in such a way that sub-tasks that make up the merge and delivery process are run concurrently, where possible. This design enables a high level of throughput within the hosted service and also enables the hosted service to provide the complex escalation procedures that the hosted service supports. FIG. 9 shows how multiple instances 900 of the different components 902, 904, 906 operate concurrently to streamline the throughput of the data. In particular, multiple instances of the merger module 902 operate concurrently and provide output to respective ones of multiple concurrent transmitter modules 904. The transmitter modules 904 are in turn coupled to respective ones of the multiple carriers 906.

B. Second Embodiment

I. Overview

Embodiments of the invention provide a method, a system, and a computer program product (Web Service) for bulk communication of information to a single set of recipients via multiple delivery media (Fax, Email, SMS, Surface Mail and Archive) based on the recipients' delivery preferences and incorporating escalation to different media according to the recipients' preferences in the event of delivery failure. Computer software has been developed in an object oriented manner such that it is made up of multiple sub-components. The user interface to the software is preferably delivered as a web service.

The message broad service utilizes the following techniques:

(A) The system recognizes the common elements required in communication with customers and encapsulates those elements in an XML Document. These elements include a customer's delivery preferences and a set of redirection criteria. The delivery preferences and redirection criteria are specified using a unique shorthand notation. A proprietary XML schema has also been defined to describe the XML document format.

(B) The system provides a remotely accessible and secure electronic interface. The one single data stream supports all forms of messaging in a consistent manner. The data stream can be supplied via an interactive Web user interface or by non-interactive bulk submission through the Internet (by means of the FTP or other protocols).

(C) The system supports a mechanism for specifying a Data Converter. The system has special code built in that enables customized Data Converters to be written and plugged in dynamically. The Data Converters take the recipient data in any format (i.e. as extracted from an organisation's accounting or ERP systems) and converts the data into a common XML format for feeding into the messaging engine.

(D) The system provides data merging (personalization) capabilities enabling the system to merge recipient data into a variety of document formats, including PDF, HTML, TIFF, Microsoft Word and Text. The system uses an XSL-FO formatting engine to carry out the data merging. The personalization capability includes the ability to personalize the subject line and body text of email messages as well as messages being sent via SMS.

(E) The System manages all of the following carrier interfaces: SMS, Email, Fax, Conventional (Surface) Mail and Archiving. This is done by having a separate code layer in the system that presents a common carrier interface to the rest of the messaging engine. This also enables future media types to be easily incorporated into the System (e.g. WAP).

(F) The System provides a single, integrated reporting interface to the user by taking the different types of reports that are received back from the carriers and converting the reports into a common format for storage in a relational database. The system then reconciles these delivery reports against the individual messaging recipients in order to track delivery and drive the escalation procedures. This enables the system to provide reports to the user on the success and failure of individual messages and show the redirection path that has been taken for individual recipients.

(G) The System has been implemented in a manner that enables a high volume of messaging throughput. It does this by breaking out the steps in the messaging process into different components. These components are then executed concurrently, so that many different steps are being executed simultaneously.

- (A) Delivery Preferences can be specified for individual recipients, as well as redirection Rules. For example, a recipient can specify that the recipient prefers to receive communications via Fax, but to send by Surface Mail if the Fax fails.
- (B) There is one data stream by means of which recipient information is supplied to the system. Via this one stream delivery can be carried out via any of Fax, Email, SMS, Surface Mail and Archiving.
- (C) The recipient list can be in any format and the system converts the list to
- (D) Merging (personalization) can be carried out using fields within the recipient list for all of the different delivery media (including personalization of SMS text messages, email body and subject text as well as Document merge for Word, PDF, HTML and MHTML).
- (E) The system manages all interfaces to carriers (including surface mail mailing houses and to a hosted Archiving service). There is no need to install or manage any software at the originator.
- (F) The one single recipient list can be used for delivery to all of the different target media.
- (G) Integrated Reporting of delivery results, including reporting on escalations that have occurred and success/failure for all recipients across different media types.
- (H) The system has been deliberately designed for the 'bulk mailing' scenario where a large number of recipients are being targeted, in an analogous manner to the way in which large numbers of recipients are targeted by conventional surface mail mailing houses today.
- Allows Companies and Organisations to carry out bulk communication with their clients using the one system, via one interface and using a single recipient list but delivering via all currently available media including Conventional (Surface) Mail, Email (encrypted and non-encrypted), Fax and SMS, as well as delivery of documents to a hosted Document Archiving and Retrieval system.
- It also supports the specification of delivery preferences and redirection rules at an individual recipient level as well as at an overall level.
- The system manages the interfaces to Fax, Email and SMS carriers and Conventional (Surface) Mail mailing houses.
- The system also supports a variety of input recipient file formats and carries out data conversion to XML format.
- The system supports document merging using state of the art XML document formats and XSL and XSL-FO style sheets for data formatting and presentation.
- The system has been implemented in a manner that enables a high volume of message throughput.
- The system provides an integrated reporting interface that enables a user to view the messaging and escalation status of individual recipients.

Figure 29:
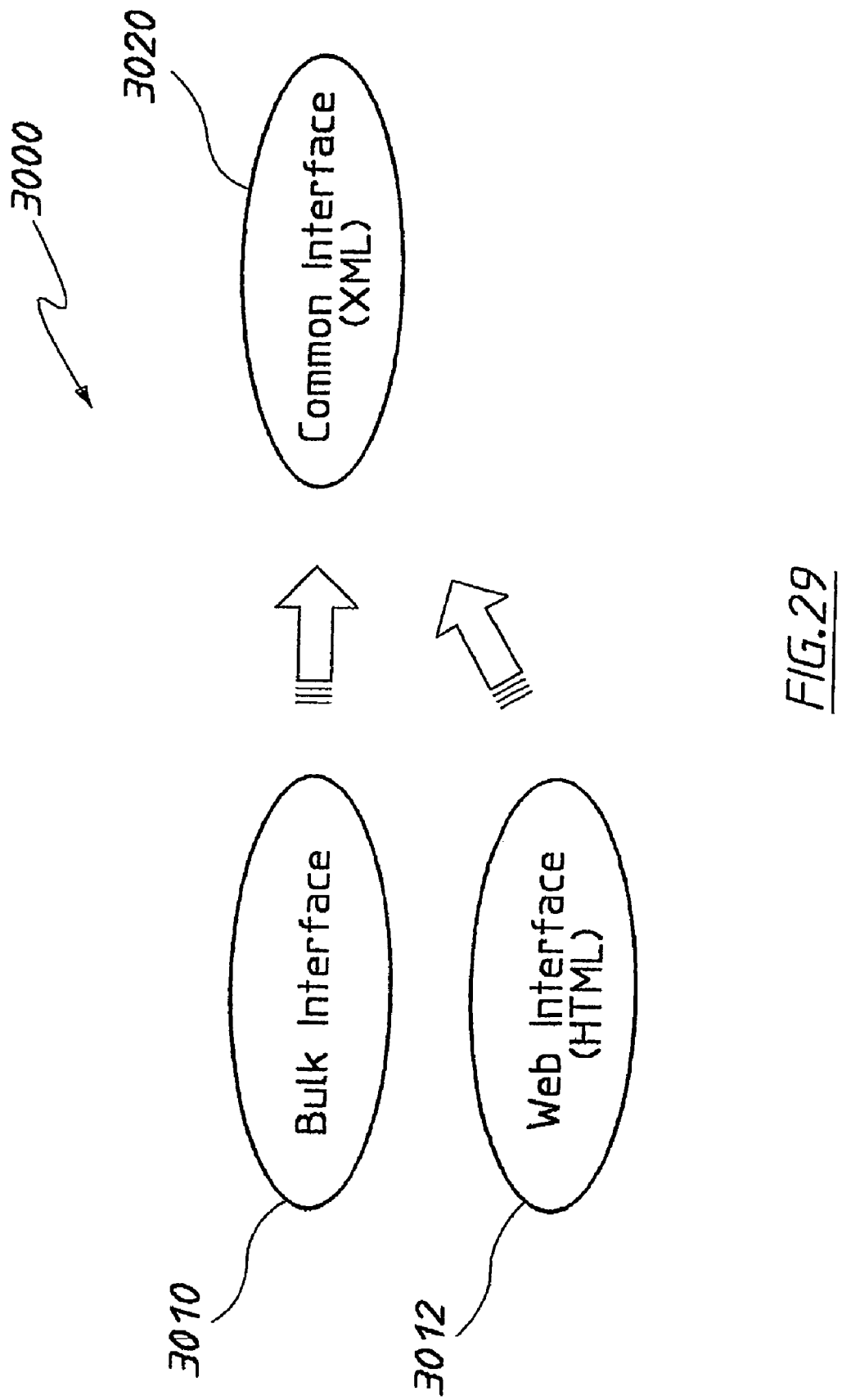
FIG. 29 is a block diagram of a system comprising a bulk interface, a web interface, and a common interface.

The technology can be provided as either a hosted service, commonly known as the Application Service Provider model, or in the form of a fully licensed model. There are three different ways to access the system and these three different access methods are supported by two different interface components. The two external interface components all utilise the same underlying common interface component. FIG. 29 is a block diagram depicting a system 3000 comprising a bulk interface 3010, a web interface 3012, and a common interface 3020.

A. Web Graphical User Interface (Browser/HTML Based) 3012

For entities that wish to submit jobs manually via a graphical user interface, a web browser based HTML interface 3012 is provided to the system.

B. Bulk Interface 3010

Bulk submission of jobs across the Internet is supported. This allows customers' ERP systems to send jobs directly to the system. FTP (File Transfer Protocol) is a common protocol for transferring files over the Internet. The service provides an FTP interface as the bulk interface 3010 because this interface is a commonly understood interface that is easy for entities to access. Other submission interfaces such as the formal interface described by the Universal Description, Discovery and Integration (UDDI) and Web Services Definition Language (WSDL) standards may also be used.

C. Common Interface 3020

All of the various interfaces 3010, 3012 are lightweight, and marshal data into a common format for submission to an underlying common interface 3020 as shown in FIG. 29. The interface parameters are passed as XML.

The reporting component is responsible for receiving the delivery reports from the carrier interfaces, and combining the reports together into one common status format for storage into a relational database. This component also comprises of screens and tools for use by users to generate and view integrated delivery reports (either viewing them via a Web Based HTML interface, or receiving them via Email). The diagram in FIG. 7 shows how the different carrier reports are parsed and stored in the database to enable the web site to present integrated reports to the user.

Figure 30B:
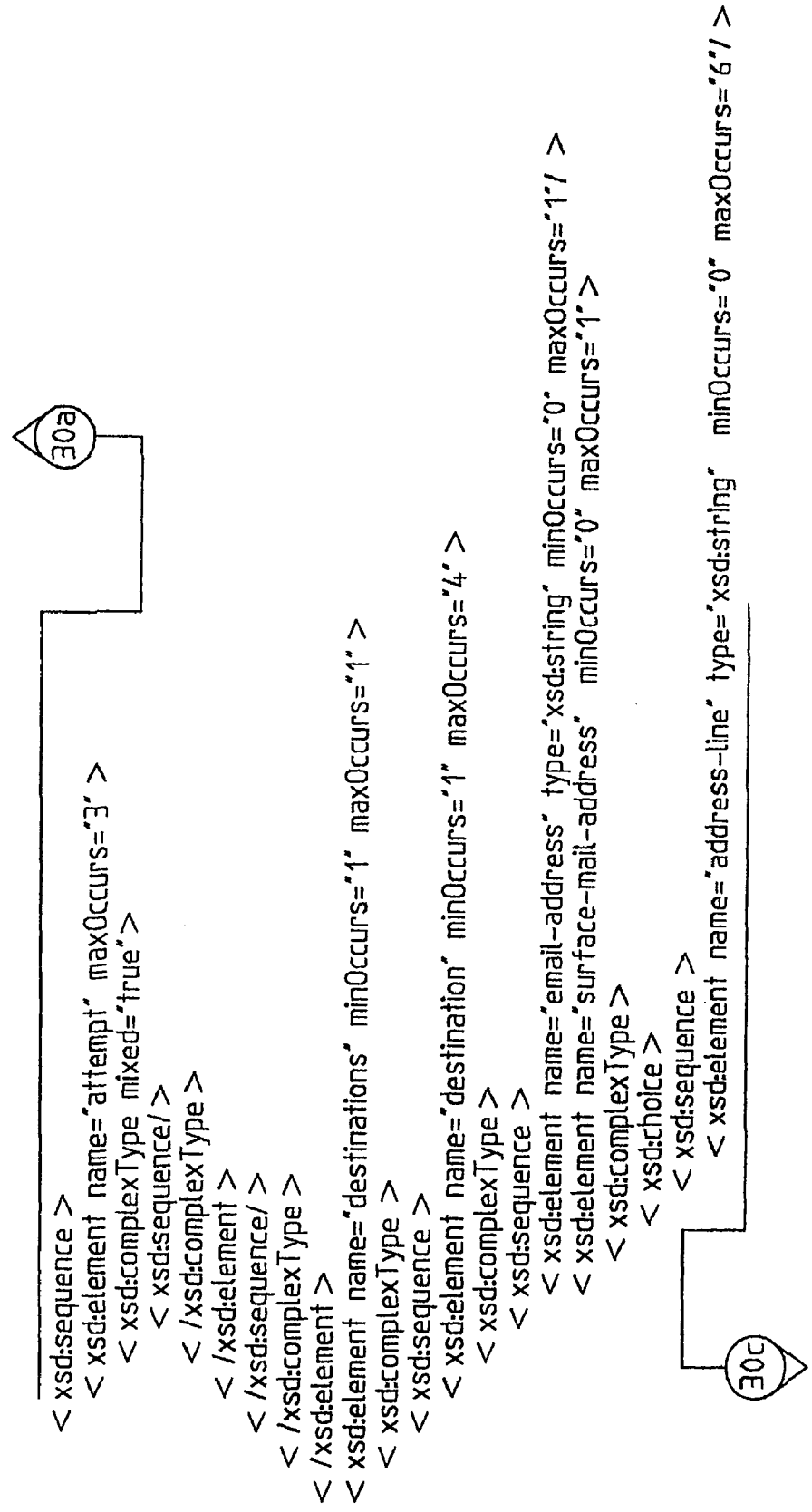
FIG. 30 shows a recipient list XML schema.
Figure 30C:
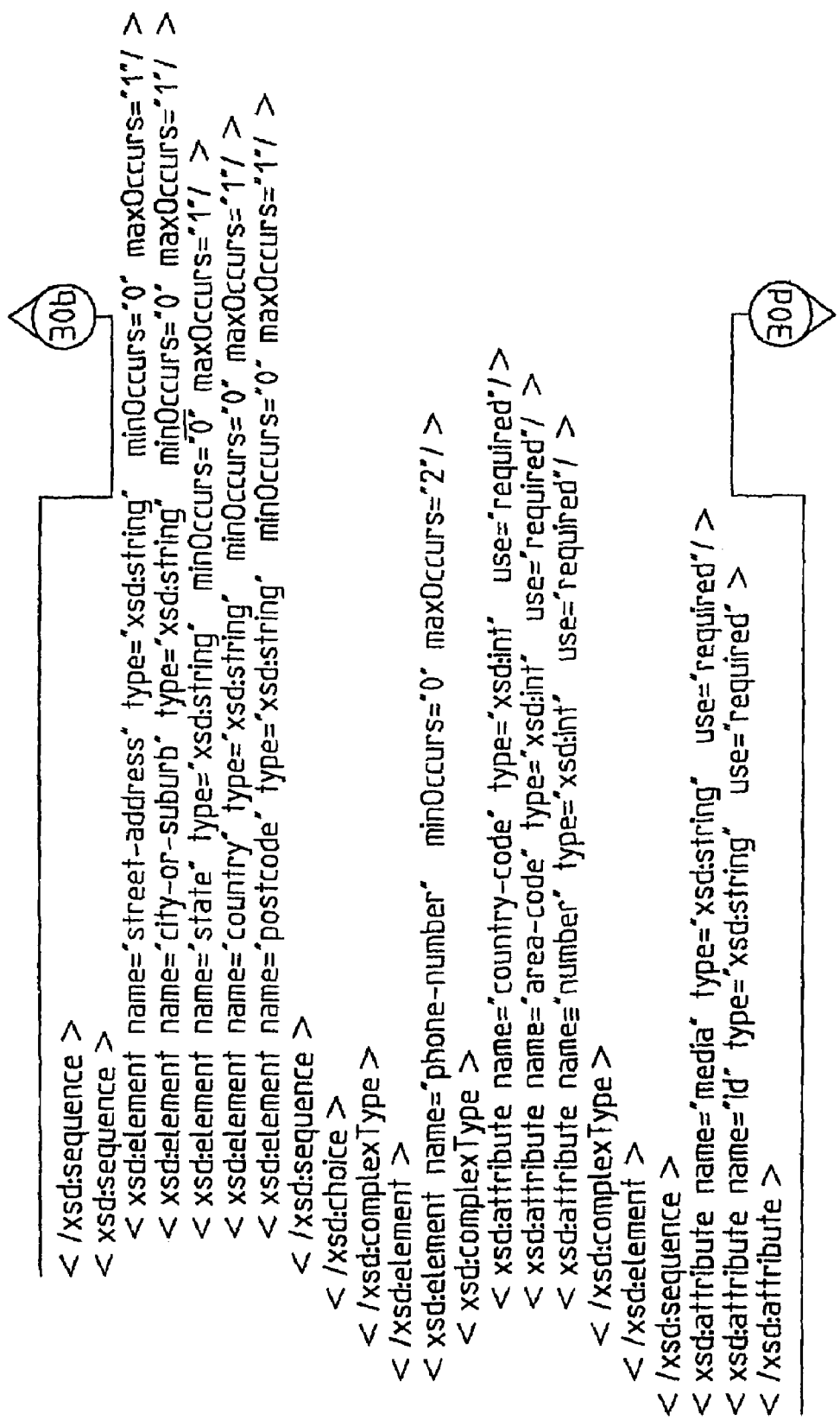

In order to provide a mechanism to enable a single recipient list to be used for merging (personalization) and delivery of data to a variety of different media, based on the recipients delivery preferences, a special XML schema has been defined. The Recipient List XML Schema is shown in FIG. 30.

The key differentiating points are as follows:
- The message distribution system is a general-purpose product for broadcasting messages to hundreds or thousands of recipients.
- Data can be submitted in any electronic format to the message distribution system, including but not limited to printstream via numerous interfaces.
- The messages can be personalised extensively for each recipient.

XML technology is used to define sophisticated message templates which support powerful merge facilities.

The message distribution system incorporates a powerful feature known as data converters or Java Mapping Classes. This allows the message distribution system to accept recipient information in any format.

Messages can be sent to fax, e-mail, paper or SMS currently. New media types (e.g., PDAs) can be added easily. Design of an output media type of 'archive' (which allows outgoing messages to be copied to an archive) is underway.

Each recipient can specify a different media type. Thus a single message distribution can be sent to some recipients by paper, others by e-mail, others by fax, etc.

A 'redirection' feature is provided. If a message cannot be delivered to a recipient's first choice media, the message distribution system retries to a specified second choice and even third choice. Thus, for example, if transmission to fax fails for a particular recipient, the message distribution system automatically tries to send by e-mail, paper or whatever. Redirection rules are specified individually for each recipient or globally for a whole job as necessary.

In the second embodiment of the invention, an electronic message broadcasting system 1100 is disclosed as shown in FIG. 11. The message distribution system 1100 is designed specifically to handle a 'one to many' situation, where a single message 1110 is received by the message distribution system 1100 (and in particular by a system engine 1120) and broadcast to dozens, hundreds or thousands of destinations 1130. The message distribution system provides facilities for the message to be 'tailored' individually for each recipient. Messages are received and transmitted via the Internet or by dedicated communications links.

Messages can comprise text, graphics, embedded audio/video, in fact, virtually anything that can be represented electronically.

The message distribution system can be used to broadcast a wide range of information ranging from memos and marketing materials to invoices and statements.

Figure 12:
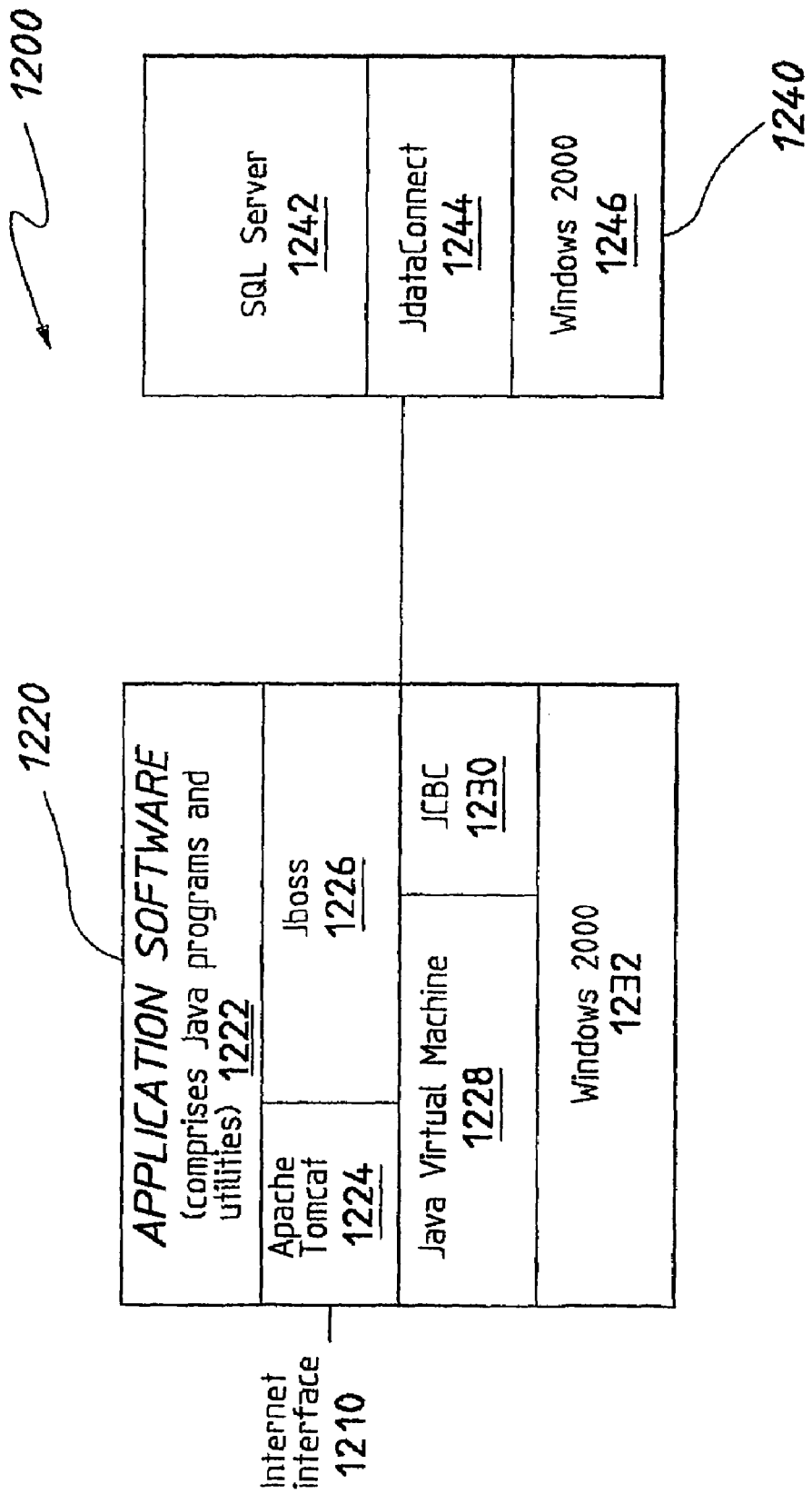
FIG. 12 is a block diagram of the system engine of FIG. 11.

FIG. 12 is a block diagram showing the overall architecture of the system engine 1120 of FIG. 11 in greater detail. An Internet interface 1210 is coupled to an applications server 1220, which in turn is coupled to a database server 1240. The application 1220 may be implemented using PC hardware 1232, for example, using the Microsoft Windows 2000 operating system.

The application server 1220 comprises a Java Virtual Machine 1228, JDBC 1230, the Apache Tomcat web server 1224, and JBoss application server 1226. The application server 1220 also comprises the application software 1222 including Java programs and utilities.

The database server 1240 comprises an operating system level (e.g. Microsoft Windows 2000) on PC hardware 1246, JDataConnect 1244, and SQL Server 1242.

The system preferably runs on computers located in a secure data centre. It is intended that other message distribution systems are installed in data centres in other places. The system software 1220 is preferably written in the Java programming language and may include a number of third party utility packages (most of which are also designed for the Java platform). The message distribution system uses XML standards for representing data.

The message distribution system can be run on a wide range of platforms, e.g. the system can be run on PC 'application servers' 1232, 1246 utilising Microsoft's Windows 2000 operating system. The Java program environment is provided by the Apache Tomcat web server 1224 and the JBoss application server 1224.

All persistent data is kept in a message distribution system database in another PC 'database server' 1240, which is accessed via the Java JDBC interface 1230. The database software may be Microsoft's SQL Server 1242 which utilises JDataConnect software 1244 to handle the link to the message distribution system server.

I. Concepts

The message distribution system is preferably implemented as a software suite developed specifically for the mass messaging market. The system controls the messaging computers known as message distribution System Engines.

The message distribution system accepts a message (i.e., an electronic representation of text, graphics, sound/video files, etc.) from a sender and distributes a copy of that message to a number (a few dozen, a few hundreds or many thousands) of recipients. Typically the sender is an organisation of some sort and the recipients are individuals or other organisations. The sender may be a customer and be identified by a customer id. The terms 'sender' and 'customer' are used interchangeably in this document depending upon the context. The content of the message may be tailored specifically for each recipient, but the overall format of the message is typically similar for all recipients. As an example, suppose the sender is a bank and the message represents a monthly bank statement. The overall format of the message (i.e., the name of the bank, the bank's logo, the column headings, etc.) is the same for all recipients but the details (i.e., the recipient's name and address, the account balance and the individual credit/debit transactions) are different for each recipient.

The whole process of accepting a message from a sender and distributing multiple copies of the message to recipients is referred to as a job. When a job is complete, the message distribution system automatically prepares a job status report for the sender. This report summarises the outcome of the job (i.e., how many recipient messages were delivered successfully and how many failed) and provides details of success/failure on an individual recipient basis (e.g., how many times delivery to a particular recipient was tried and why it failed).

The message distribution system also prepares a set of billing records containing more detailed information about the outcome of each recipient message transmission. The billing records are sent to a Billing System, where the billing records may be used at the end of the month for invoicing the customer.

Each customer is allocated one or more message distribution system accounts (each identified by an account id). Every job must be associated with an account. The account defines certain operational characteristics of the job (such as the maximum size of a fax page, the quality of printing required, the message distribution system features which can be used, etc.) and is used in the billing process to determine how much to charge the customer for the job. A customer might typically assign groups of appropriately configured accounts to his organisational units (cost centres, departments or whatever) within his enterprise.

A sender normally interacts with the message distribution system (i.e., submits jobs, retrieves job status reports, etc.) by means of an online web interface. The customer nominates certain individuals within his organisation to do this; these individuals are known as users (and are identified by a user id which is unique within customer). Users access the web interface by means of a web browser such as Internet Explorer or Netscape.

In some cases, as an alternative to the web interface, it is possible for a user to submit a job using FTP file transfer across the Internet to the message distribution system. This option is discussed later in this document.

A recipient can receive his message via a number of different media delivered by various carriers. The media include the following:

E-mail—The message distribution system sends the message electronically to a carrier who delivers the message as an e-mail to the recipient's e-mail address, either embedded within the e-mail body and/or as an attachment.

Paper—The message distribution system sends the message electronically to a carrier who prints the message, places the printed message in an envelope and mails the message to the recipient through the postal system.

SMS—The message distribution system sends the message electronically to a carrier who delivers the message as text to the recipient's mobile telephone.

Fax—The message distribution system sends the message electronically to a carrier who forwards it to the recipient's facsimile machine.

It is anticipated that other media will be introduced in the future. The system architecture is designed to support introduction of new media with minimal development effort. An 'archive' medium to allow outgoing messages to be sent to an archive file may be implemented.

All the media listed above are uniquely addressable. This address is referred to as a destination id.

The format of the destination id is different for each medium type. For fax machines and mobile telephones, the destination id is a telephone number, for paper the destination id is a postal address, and for e-mails the destination id is an e-mail address. Thus a particular recipient might have the following destination ids, for example:

| | |
|---|---|
| Fax destination id | +61 2 1234 5678 |
| SMS destination id | +61 438 987654 |
| Paper destination id | Mr P Jones, 24 Waratah St, St Leonards, NSW, 2065 |
| E-mail destination id | pjones@bigpond.com.au |

One destination id per medium type is used. Destinations are specified on a 'per recipient' basis; in any particular job each recipient can specify different media and different destinations.

To initiate a job, a user submits template files and recipient files to the message distribution system. A job may require one or more template files. A template file contains just a single template. A job requires one or more templates for each delivery medium. For example, a job that handles SMS and e-mail might require one template for the SMS messages and five templates for the e-mail messages (one for the e-mail subject, one for the textual version of the e-mail body, one for the HTML version of the e-mail body and one for each of the two e-mail attachments).

Templates are supplied in a number of different formats including Adobe Acrobat PDF (PDF) format, TIFF image (TIF) format, Postscript URN format, XML stylesheet (XSL) format, Microsoft Word (DOC) format and simple text (TXT) format.

Each template describes the invariant portions of the message (i.e., those portions which are identical for all recipients).

Certain types of templates (i.e., DOC, XSL and TXT only) are 'personalisable' (i.e., they may optionally contain one or more 'merge fields'). Also XSL templates may be accompanied by 'template artifact files'.

Merge fields are named 'place holders' within the template. Each merge field indicates a place where recipient-specific data are to be inserted at the time that the message distribution system creates a message for a particular recipient. Thus, for example, a template might contain merge fields called 'cust_name' 'account_balance' and 'date', which might appear within the template 1300 as shown in FIG. 13.

For illustration purposes, the example in FIG. 13 shows the merge fields delimited by 'chevron' characters. This is how they actually appear within DOC and TXT templates (but not within XSL templates).

Template artifact files may accompany XSL template files. These comprise graphics, sound, video clips or other multimedia files. For example, if a bank statement message contains a logo, the template file may be accompanied by an image file (called 'BankLogo.jpg' perhaps) which contains the appropriate graphic.

A job requires one or more recipient files. When the recipient files are received, the message distribution system concatentates or otherwise combines the recipient files all together into a single file. The contents of this file are known as the recipient list.

The recipient list comprises many recipient records (typically hundreds or thousands). Each recipient record may contain text that describes one intended recipient of the message. A recipient record may comprise the following information:

Recipient information—The record contains some basic information about the recipient, such as his name and a reference code.

Destination ids—There is one destination id for each medium by which messages can be delivered to this recipient. Thus, for example, if a recipient may receive messages by e-mail or fax only, the recipient record contains an e-mail address and a fax telephone number only; the destination ids for 'paper' and 'SMS' are null (indicating that the recipient cannot be contacted by mail or SMS). The fact that a destination id is specified does not necessarily mean that the id is used. The destination ids to be used to deliver a particular message are specified in the 'destination preference information'.

Merge values—A recipient record contains 'merge values' corresponding to the 'merge fields' in the template files. The merge values are placed in the merge fields by message distribution system when the system generates messages for this recipient. For example, a template might contain a merge field called '<<account_balance ' and a particular recipient record might contain a merge value of '$451.34'. When the message is delivered to the recipient, the text '$451.34' appears in the message instead of the merge field name.

Destination preference information—The destination preference information tells the message distribution system which destinations to send the message to.

For each recipient up to a specified number (e.g., 3) of delivery attempts can be specified as part of the destination preference information. Each attempt can specify up to the specified number, (e.g., 3) of transmissions to different destination ids; the first of these is the master transmission and the others are copy transmissions.

The message distribution system commences with the first attempt. The system sends the master and copy transmissions simultaneously. If the master transmission fails to reach the recipient, the message distribution system tries the next attempt. Processing continues in this way until either the master transmission has been successfully completed or until all attempts are exhausted.

Making multiple attempts to deliver master transmissions in this way is known as redirection. Any failure of a 'copy' transmission is not regarded as critical by the message distribution system and does not result in redirection.

The foregoing is illustrated by an example in FIG. 14. A recipient record 1400 specifies the attempts and transmissions shown in FIG. 14. The message distribution system initially sends the master transmission to fax and simultaneously sends a copy to e-mail. If the master transmission (i.e., fax) is successful, processing of this recipient is completed.

If the master transmission is unsuccessful (e.g., if the fax number is engaged or unobtainable), the message distribution system initiates attempt number 2 (i.e., the system tries to send the master transmission to paper and a copy to SMS). This marks the end of the message distribution system's processing because a third attempt is not specified.

II. The Web Interface

Interaction between users and the message distribution system may occur by means of a web browser interface. To commence interacting with the message distribution system, a user simply starts a web browser (e.g., Microsoft's Internet Explorer or Netscape's Navigator) and enters the appropriate URL.

Entering the URL establishes a logical link between the user and the message distribution System Engine and causes the 'logon screen' 1600 shown in FIG. 16 to be displayed.

The following description sets forth the screens to be displayed by the message distribution system and how they are used.

Customers, Users and Accounts

The web interface allows 'users' (representing 'customers' and operating under the message distribution system 'accounts') to submit jobs to the message distribution system and perform other operations.

Within the organisation of a system operator, there may be a group of staff who are responsible for operational control of the message distribution system and for supporting the message distribution system's customers. They are referred to here as the message distribution system Support Team. The Support Team has overall administrative responsibility for the system and, in particular, has the job of setting up new customers to use the system.

When a member of the message distribution system Support Team introduces a new customer to the system, the Team member creates the following items in the message distribution system database:

a single 'CUSTOMER' record containing information about the customer, several 'ACCOUNT' records each containing information about an account that this customer can use, and one or more 'USER' records describing a administrator users (i.e., users with special privileges).

A customer's administrator users may be allowed to create one or more standard users for this customer (i.e., users without administrator privileges) so the administration of the standard users is under the customer's direct control. However, administrator users may only be created by the message distribution system Support Team.

The message distribution system maintains information relating to a particular customer. This information may comprise the customer's account information, user information, and information about the various jobs submitted by that customer's users. This information may comprise and normally forms a 'closed group' from an access control point of view. A customer's users can only access information about accounts, users and jobs related to that customer. The users cannot access information about other customers. This is a security requirement of the message distribution system.

There may be one exception to this. The message distribution system Support Team may be registered within the message distribution system as a 'special customer' with a customer id of 'control'. Users belonging to this special customer ('control users') may have special powers as befits the supervisory role performed by the message distribution system Support Team. In particular, for control users only:

administrator users may have authority to access and change customer, user and account information for any customer, and to submit jobs for any customer, and standard users may have the ability to view (but not change) customer, user and account information for any customer, and to submit jobs and report e-mail errors for any customer.

Control users may 'impersonate' a user of any nominated customer and thereby access the system as if the control users were representing that customer. When a customer is 'impersonated' by a control user in this way, it is known as a proxy customer.

Figure 15:
FIG. 15 is a table showing rules covering the functions of a Web interface.

The rules governing the web interface functions which various types of users are allowed to perform are summarised in the table 1500 in FIG. 15. Descriptions of the functions shown in FIG. 15 are provided hereinafter.

The functions denoted with footnote "1" of FIG. 15 are customer-specific. They are performed for the nominated proxy customer (i.e., the control user first nominates a particular proxy customer and then performs the function). Other control customer functions do not require nomination of a proxy customer first. In relation to footnote "2" in FIG. 15, users may also be allowed to alter certain fields on their own USER record, but not on other users' USER records.

Logging On

A logon screen 1600 that may be used is displayed in FIG. 16. The user may be required to enter a customer id, a user id and a password on the logon screen 1600.

The Screen Layout

Figure 17:
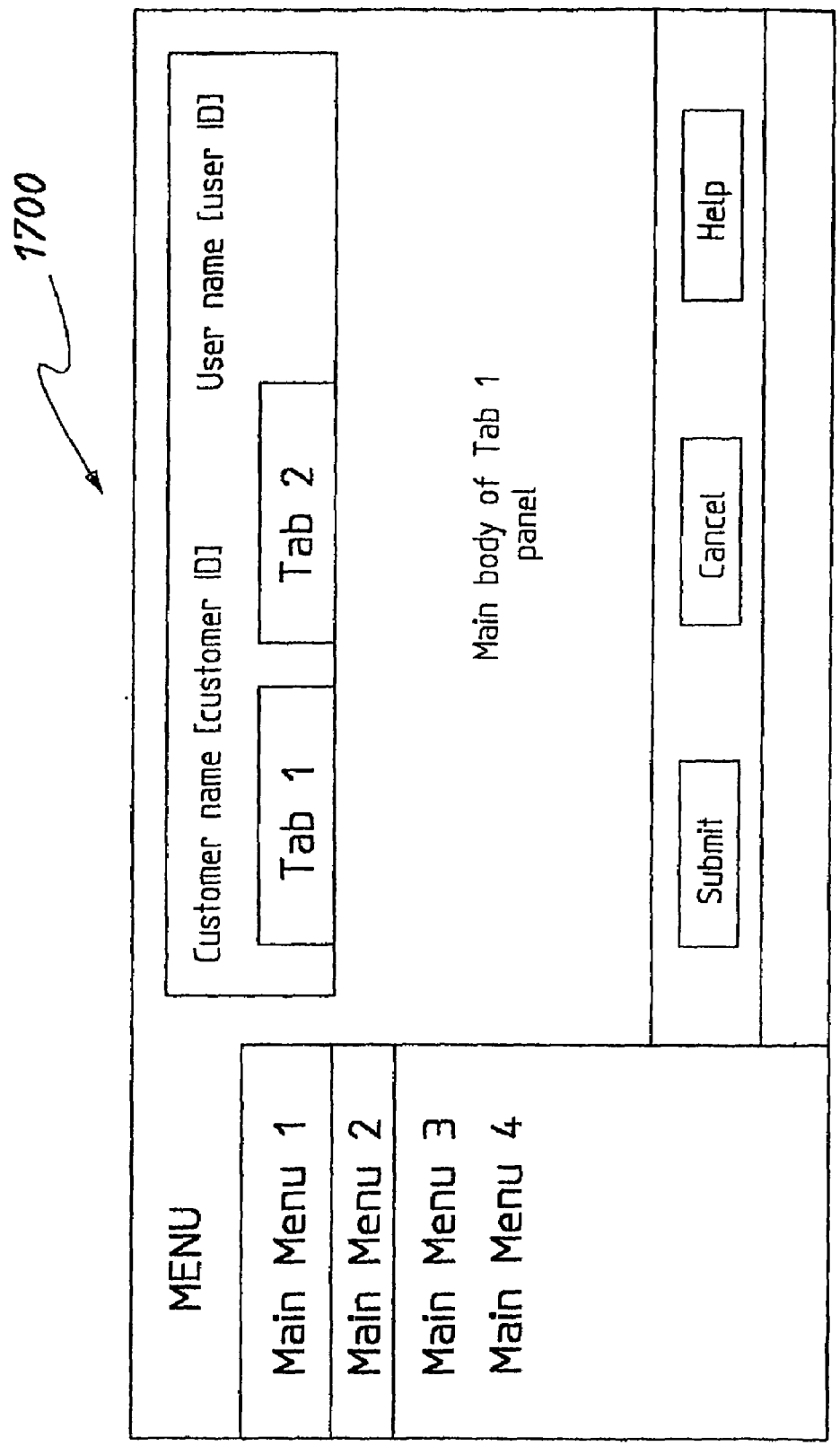
FIG. 17 illustrates an example of a main screen layout.

Once a user has successfully logged on, a main screen 1700 in FIG. 17 is displayed and remains displayed until the user 'cancels' out of the screen. The main screen takes the form of a main menu on the left and, in some cases, a series of tabs across the top. FIG. 17 shows the scheme.

The left hand side is occupied by the main menu ('Main menu 1', 'Main menu 2', etc.). The currently selected main menu option may be highlighted by enclosing the option in a black border ('Main menu 2' in FIG. 17).

The top of the screen may contain the customer name (followed by a customer id in brackets) and the user name (followed by the user id in brackets). The user name and id identify the user who is currently logged on. The customer name and id may denote the customer who 'owns' the user or, if the customer is 'control', the proxy customer. Proxy customers and administrator users may be displayed in italics.

The remainder of the screen comprises a panel or a panel group (i.e., one or more panels conceptually stacked on top of each other) corresponding to the currently selected main menu item. In the case of a panel group, tabs at the top of the screen may be used to display (i.e., bring to the top of the stack) the individual panels within the group. Each panel contains information comprising descriptive text, data entry fields, drop-down lists, radio buttons, checkboxes and other artifacts. Buttons to submit or cancel the panel or to invoke help information may be situated at the bottom.

Administration

An administration panel group allows a customer's USER and ACCOUNT records to be viewed and, in some cases, altered.

Figure 18:
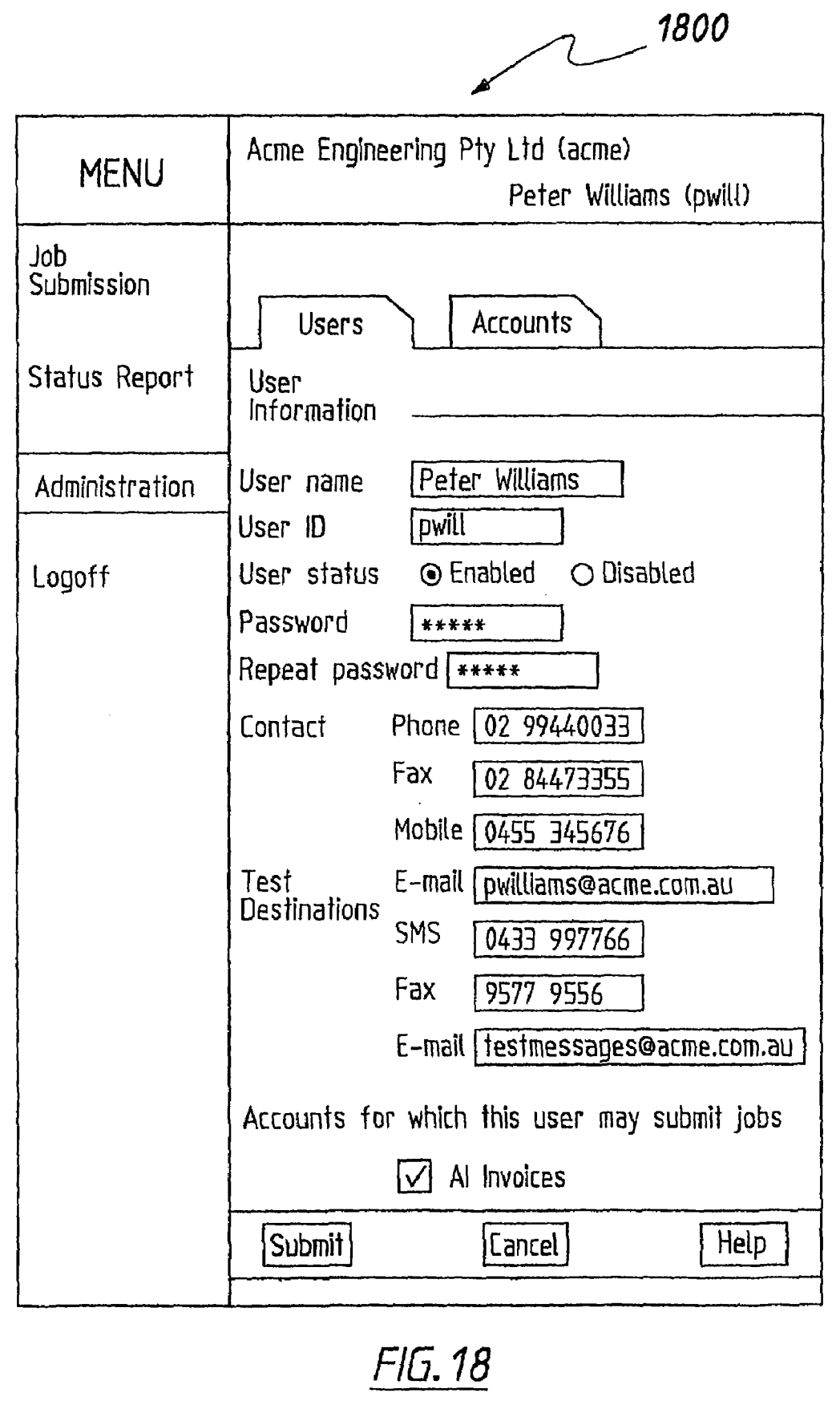

An example of a panel for viewing a user is shown in FIG. 18. There may be several variants of this panel, one for normal users, one for the customer's (or control) administrator user and one for the specific user represented by this USER record. FIG. 18 shows the panel 1800, which would be seen by an administrator user.

The control administrator users and the customer's administrator users can enter information into any of the fields on this panel. For most standard users, all fields are 'read only'. For the standard user to which this record applies, all fields except the 'password', 'contact' and 'test destination' fields are 'read only'.

Most of the fields have a 'one to one' correspondence to the fields in the USER record on the database. The ticked items in the list of 'accounts for which this user may submit jobs' reflect the 'USER_ACCOUNT_XREF' records for this user.

Submitting a Message Distribution System Job

A user may submit a job to the message distribution system using one of two interfaces.

Enterprise Interface

The enterprise interface is typically used by large enterprises that possess sophisticated computer systems to track and manage their customers and suppliers. The enterprise interface is oriented towards 'essential mail', such as invoices and statements.

In such cases the message formats tend to be complex (incorporating logos and other graphics) and do not change frequently. This means that development of appropriate templates is a time consuming task but, once completed, does not need to be repeated often.

The templates for an enterprise interface customer may be developed by the message distribution system Support Team to the customer's specifications. The completed templates may then be stored within the message distribution system's database under a company's control. Whenever the customer runs a job, the system references the templates (by quoting the appropriate job type), but the templates themselves do not change and, indeed, cannot be modified by the customer.

Customers using the enterprise interface may have a database (on their own computer system) containing contact details and other information about their suppliers, customers, staff, associates, etc. So, when the customers wish to send messages to various recipients via the message distribution system, the customers may run a 'database extract' program against their own database to generate the recipient file.

Enterprise interface templates may be stored in XML Stylesheet (XSL) format. An exception to this may be the case of e-mail attachments that do not contain merge fields. They may be specified in Adobe Acrobat PDF format.

Recipient file formats vary widely but the message distribution system converts the file formats all to XML format on receipt.

As an example of an application using the enterprise interface, consider a monthly bank statement job. The overall format of the statement (i.e., headings, logos, boilerplate text, etc.) is not regularly changed by the bank, if ever. This format may be described by a set of XSL template files developed by the message distribution system Support Team to the bank's specifications. However, the statement details (customer name, address, transaction details, account balance, etc.) are different for each customer each month. Typically, the statement details are extracted by a program from the bank's mainframe database and then forwarded as a recipient file to the message distribution system each month.

Standard Interface

The standard interface may be used for smaller, less complex jobs.

A user of the standard interface may be responsible for preparing the user's own template files and supplying the template files whenever the user initiates a job. This may be practical in situations where the template is relatively simple (e.g., memos, press releases and marketing campaigns that can be prepared using a simple word processor). In such situations, it is common for new template files to be prepared for each the message distribution system job.

In some cases (i.e., where simple textual information is involved), the user can enter the user's template file online via the standard interface. In other cases, the user may prepare a template file offline (e.g., in Microsoft Word 'DOC' format).

Recipient files may be in 'comma separated values' (CSV) format, but may be converted to XML format by the message distribution system upon receipt.

The standard interface is well suited to a customer who wishes to quickly generate simple memos or marketing materials and broadcast those messages to its customers. The enterprise interface is suited for stable applications, such as statements and invoices, where the format endures over a period of time, but is used repeatedly during that time.

Tables 3 and 4 summarise the differences between the two interfaces in technical terms.

TABLE 3

| Features | |
| --- | --- |
| Enterprise Interface | Standard Interface |
| Templates and associated images are predefined and stored in the message distribution system database | Templates are submitted with each job |
| Mergeable templates are in XML Stylesheet (XSL) format | Mergeable templates are in Microsoft Word (DOC) or simple text (TXT) format |
| Recipient files can be in any format (but are converted to XML by the message distribution system) | Recipient files may be in CSV format (but are converted to XML by the message distribution system) |
| May output to e-mail, fax, SMS or paper | May output to e-mail, fax or SMS but not paper |

TABLE 4

| | | Template Formats | | | |
| --- | --- | --- | --- | --- | --- |
| | | Enterprise Interface | | Standard Interface | |
| Type of Template | | | Non- | | Non- |
| Medium | Usage | Mergeable | mergeable | Mergeable | mergeable |
| Paper | One or several pages | XSL | — | — | — |

TABLE 4-continued

| Type of Template | | Template Formats | | | |
|---|---|---|---|---|---|
| | | Enterprise Interface | | Standard Interface | |
| Medium | Usage | Mergeable | Non-mergeable | Mergeable | Non-mergeable |
| Fax | Subject page | XSL | — | TXT | — |
| | One or several pages | XSL | — | DOC | PDF, Postscript, TIFF |
| E-mail | Subject line | XSL | — | TXT | — |
| | HTML body | XSL | — | — | HTML |
| | Text body | XSL | — | — | TXT |
| | Attachment | XSL | PDF | DOC | Any format |
| SMS | Message text | XSL | — | TXT | — |

The corresponding format of messages sent to carriers may vary:
Each paper message may be sent to the carrier as a postscript file
Each fax message may be sent to the carrier as one or more TIFF files (with the 'subject' information included in a special header in plain text format)
Each e-mail message may be sent to the carrier in a composite format in which:
the subject line may be encoded in plain text form in a special control file,
the HTML and text body may be encoded as an HTML file and a plain text file respectively,
enterprise interface attachments may be sent as PDF files, and
standard interface attachments may be sent in the same format as originally received.
One exception to the foregoing rule may be that any standard interface attachment in DOC format is sent to the carrier in PDF format.
HTML files handled by the standard interface are preferably completely self-contained (the files do not include references to external artifacts such as image files).
Each SMS message is sent in text form to a mobile phone.
The user first selects the account under which this job is run. The 'drop-down' list may list the names of all of the customer's (or proxy customer's) accounts that the user is authorised to use. When the user clicks 'Submit', a new panel is displayed to reflect either the enterprise or the standard interface (as specified in the selected account).

The Enterprise Interface

FIG. 19 shows the layout of the enterprise interface job submission screen 1900.

Job Reference

The job reference field may be optional. The user may enter a name for the job which is meaningful to him. This name is displayed on all reports concerning this job.

Job Type

This field offers the user a list of job types, each of which is identified by a name that is meaningful to the user. The user must select one item from the list.

Job types are represented in the message distribution system database as job configurations. Each job configuration comprises job-level information and a collection of template files and template artifact files that have been pre-prepared by the message distribution system Support Team, tested and stored within the database.

Recipient Files

Initially, the user may be offered one text entry field (with associated 'Browse' and 'Upload' buttons).

To specify a recipient file, the user clicks the 'Browse' button which causes a browse window to be displayed. After the user selects the required file, its filepath appears in the text entry field. When the user clicks the 'Upload' button, the file is uploaded to the message distribution system and appears in the 'uploaded files' list. The user may upload as many files as the user wishes in this way.

The 'Remove' button alongside the 'uploaded files' list can be used to remove a selected uploaded file.

The enterprise interface of the message distribution system accepts recipient files in a wide variety of formats. The recipient is converted to XML format and held in converted form database in this form.

Job Start Time

The user may be offered the option of processing the job immediately or scheduling the job to start at a later date and time. The 'date' field offers a choice of up to 30 days in the future. The 'time' fields allow the user to specify the start time in hours and minutes.

The user selects 'Submit' to submit the job. After the job is submitted, the message distribution system locates the templates, template artifacts, and other job information corresponding to the specified job type in its database. The system then validates the recipient files as necessary. If errors are encountered during this validation process, the message distribution system displays details of the recipients in error. The user then corrects the errors and resubmits the job.

Viewing Job Status Reports

A user may request a job status report at any time after a job has been submitted. The message distribution system obtains the current status of the job from information on its database and displays an appropriate job status report on the screen (which the user may then print if the user wishes).

The example in FIG. 20 shows a full job status report 2000 (i.e., including all four options) for an invoice distribution job submitted using the enterprise interface. The report 2000 may be displayed in a 'printer friendly' format (black on white) and may be displayed in a new browser window. In the example, the message distribution system job id is '34656' and the job reference assigned by the user is 'Invoice3'.

The job was submitted at 22:21 under account 'Essential Mail' and the job status report was generated 4 hours and 31 minutes later (at 2:52 am next morning), while the job was still in the 'second attempt' phase (as indicated by the 'job status'). The possible job statuses are 'Processing not started', 'Attempt 1 in progress', 'Attempt 2 in progress', 'Attempt 3 in progress' and 'Complete' plus various error statuses. The job specified 763 recipients and was submitted via the enterprise interface.

The remainder of the report indicates the status of the message transmission at the time the report was generated. Information is divided into three categories:

'Master message' information relates to the transmission that was specified first in the recipient record for each attempt. A failure in transmission of a master message potentially causes redirection to take place (i.e., initiates the next attempt).

'Copy message' information relates to all other transmissions, which do not trigger redirection.

'E-Mail attachments opened' only refers to the opening of e-mail attachments.

In the example report 2000, 763 master messages were sent, one per recipient. Altogether, 12 of them failed and caused a second attempt. Of the 763 master messages, two failed (even after attempting any specified redirections). Another four are still outstanding (i.e., the four messages were sent but the delivery status has not been determined yet). Another 94 'copy' messages were sent. Of these, 89 were successfully delivered, two failed and three more are still outstanding.

The second and third sections of the report specify details of each individual transmission. Each transmission status is presented in the following format:

nn-mmm-hh:mmd where:
'nn' represents the status of the transmission as follows:
'OK' indicates success.
'IP' indicates 'in progress'.
'NC' indicates 'not confirmed' (i.e., assumed OK but not definitely confirmed as such). 'NC' status is a peculiarity of e-mail, explained hereinafter.
'two digits' indicate that an error occurred (and the digits indicate the reason for failure).
'mmm' is the destination medium (EML, FAX, SMS or PAP),
'hh:mm' is the time of delivery or non-delivery (or, for SMS and paper, the time of transmission to the carrier),
'd' is a superscript digit that is only included if the message was delivered (or failed to be delivered) on a subsequent day. The digit is '1' for the next day, '2' for the second next day and so on.

In the 'master message' section, all recipients whose master message transmission failed (even after several attempts) or is still 'in progress' are grouped at the front of the report. The others are sorted by recipient reference. In the 'copy message' section, recipients are sorted in the same sequence. The last section of the report indicates times when e-mail attachments were opened. Each attachment is identified by 'Xn' where 'n' is a number which identifies the attachment in the legend at the beginning of the section. The foregoing report 2000 is merely an example, and numerous variations may be practiced without departing from the scope and spirit of the invention.

Job Configuration (Control Users Only)

The job configuration panel 2100 of FIGS. 21A and 21B is available to control users and is used to add, change and delete a cluster of records in the message distribution system database corresponding to a job configuration. Only the job configurations for enterprise interface jobs may be accessed.

After selecting the 'Job Configuration' main menu option, a selection panel is displayed offering the user a choice of selecting an existing job configuration or creating a new one. After completing this panel the main job configuration panel 2100 is displayed.

The panel 2100 of FIGS. 21A and 21B shows full details of the specified job configuration. The information may be formatted as a number of sections divided by horizontal lines. Each section may represent one record in the job configuration record cluster. In the example shown, the job configuration comprise a JAVA_MAPPING_CLASS record, a JAVA_MAPPING_CLASS_RESOURCE record, a CONFIG_DATA record, a TEMPLATE record, and two TEMPLATE_ARTIFACT records.

Each section shows the filename of the file that is imported into the record and the values of other fields in the record. The user may alter fields as necessary. The user may also import new files (replacing the existing ones) by using the 'Browse' button (which may invoke a 'browse' window from which the user can select the file to import) followed by the 'Import' button. Alternatively, the user may use the 'Delete' button to delete the whole section (i.e., to delete the associated record).

For sections which can repeat, an 'Add a new . . . record' button is provided to add another empty section.

The section at the bottom of the panel allows the files within the cluster to be exported as a ZIP archive to a nominated file. The file may be stored on the message distribution system server in a specified directory (e.g., 'C:\JobConfigurations') and may have an automatically generated name that is a concatenation of the customer name, job configuration display name (i.e., job type) and date. Changes are not made to the database until the user clicks the 'Submit' button. The delete button allows the whole cluster to be deleted if necessary.

IV. The FTP Interface

In certain cases, customers may need to generate recipient files from their enterprise systems and send the files to the message distribution system for distribution automatically (i.e., without human intervention). In such situations, the web interface may not be appropriate to their needs. The message distribution system therefore allows 'enterprise interface' style jobs to be submitted through the Internet by an FTP transmission. The FTP transmission replaces the job submission (and associated) screens. The customer, user and account records should be set up correctly before the FTP transmission.

After an FTP job submission, a user may use the normal message distribution system facilities (i.e., inspection of the Job Status Report) to monitor the progress of the job.

To submit a job via the FTP interface, the user employs an FTP client program to send a single ZIP file to the message distribution system via the Internet. The transmission process may be performed using SSL security and require the user to enter an FTP 'user id' (which may take the form 'ccccc-uuuuu', where 'ccccc' is the user's message distribution system customer id and 'uuuuu' is the user's message distribution system user id) and an FTP 'password' (which may be the same as the user's message distribution system user password).

The ZIP file contains the following files:
a job control file called 'jobcontrol.xml'; and
one or more recipient files whose names are specified in the job control file (see Recipient Files)

The format of the job control file (jobcontrol.xml) 2200 is shown in FIG. 22. Most fields in the file are counterparts of their web interface equivalents. The test attribute specifies whether this is a test job or not. Customers may specify a unique 'job-reference' so that the customers can identify the job on the 'status report' screen later.

V. System Architecture

The internal architecture of the message distribution system is described hereinafter, including a selection of the major processing flows through the message distribution system. An overall knowledge of J2EE and Java web container concepts is desirable, but not essential for understanding the following description. Occasionally this section makes reference to tables (or 'record types') in the database. The names of these are printed in upper case. Details of the function and structure of the records are contained in Section VII.

Figure 23A:
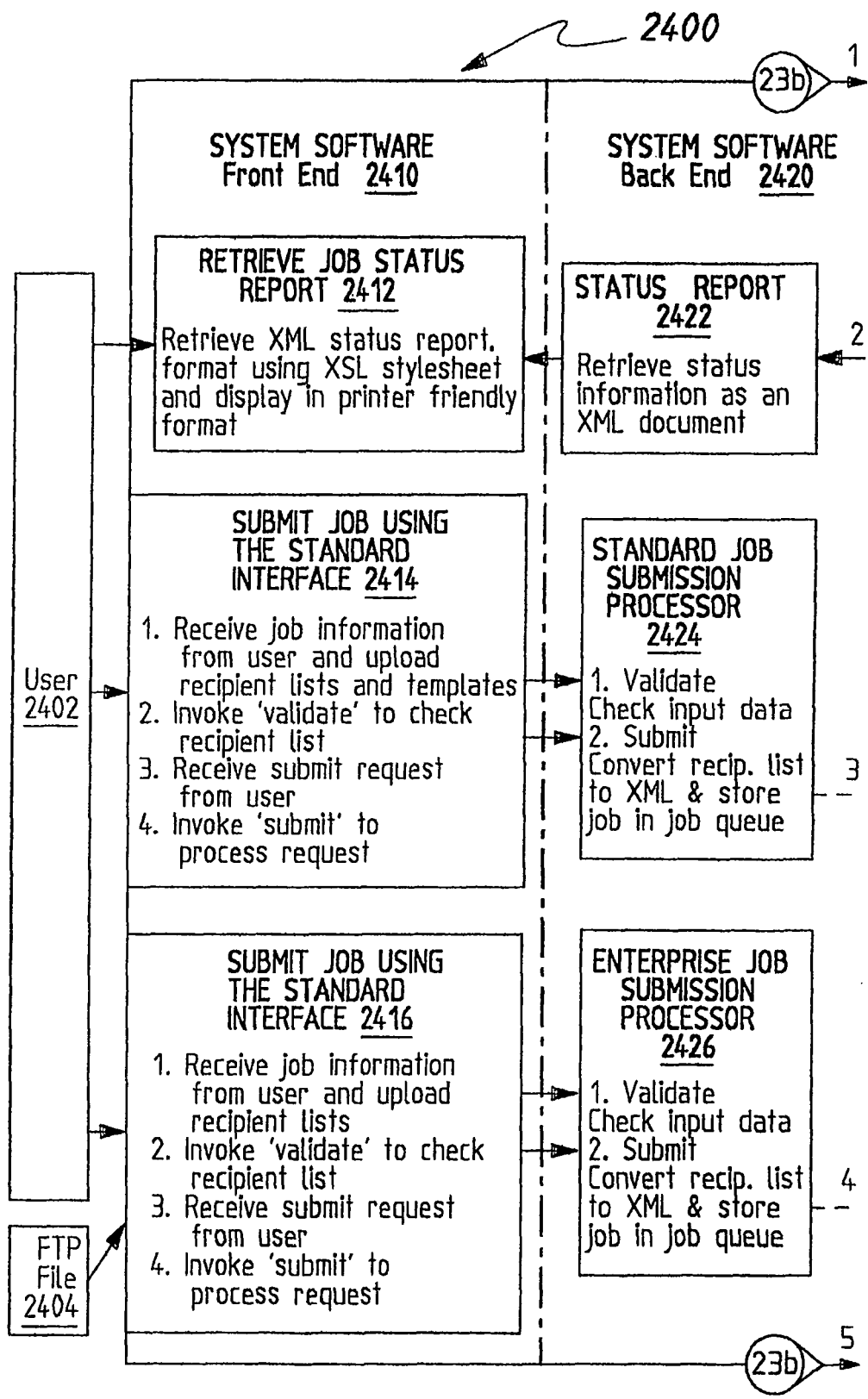
FIG. 23 is a block diagram of the architecture of the message distribution system.
Figure 23B:
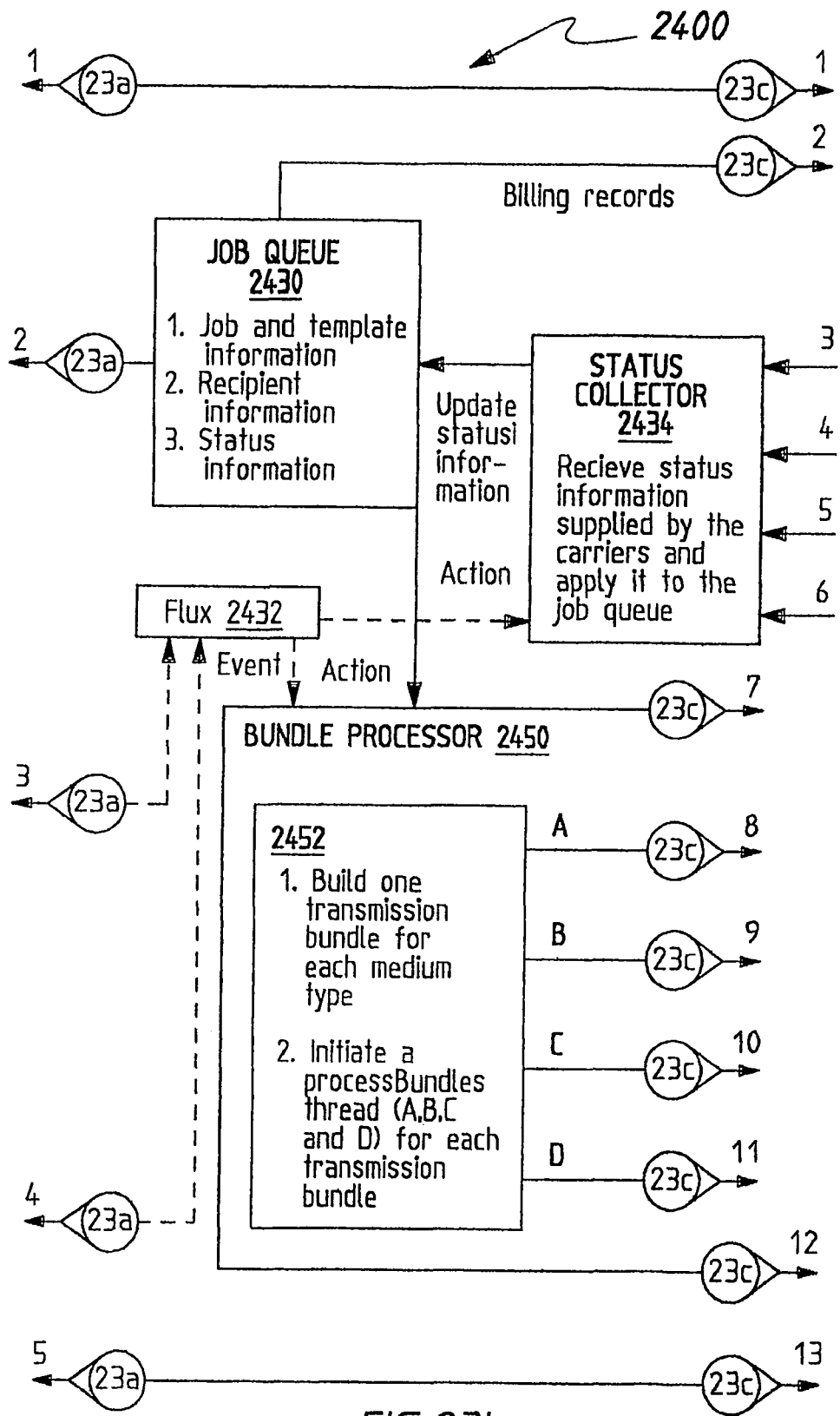
Figure 23C:
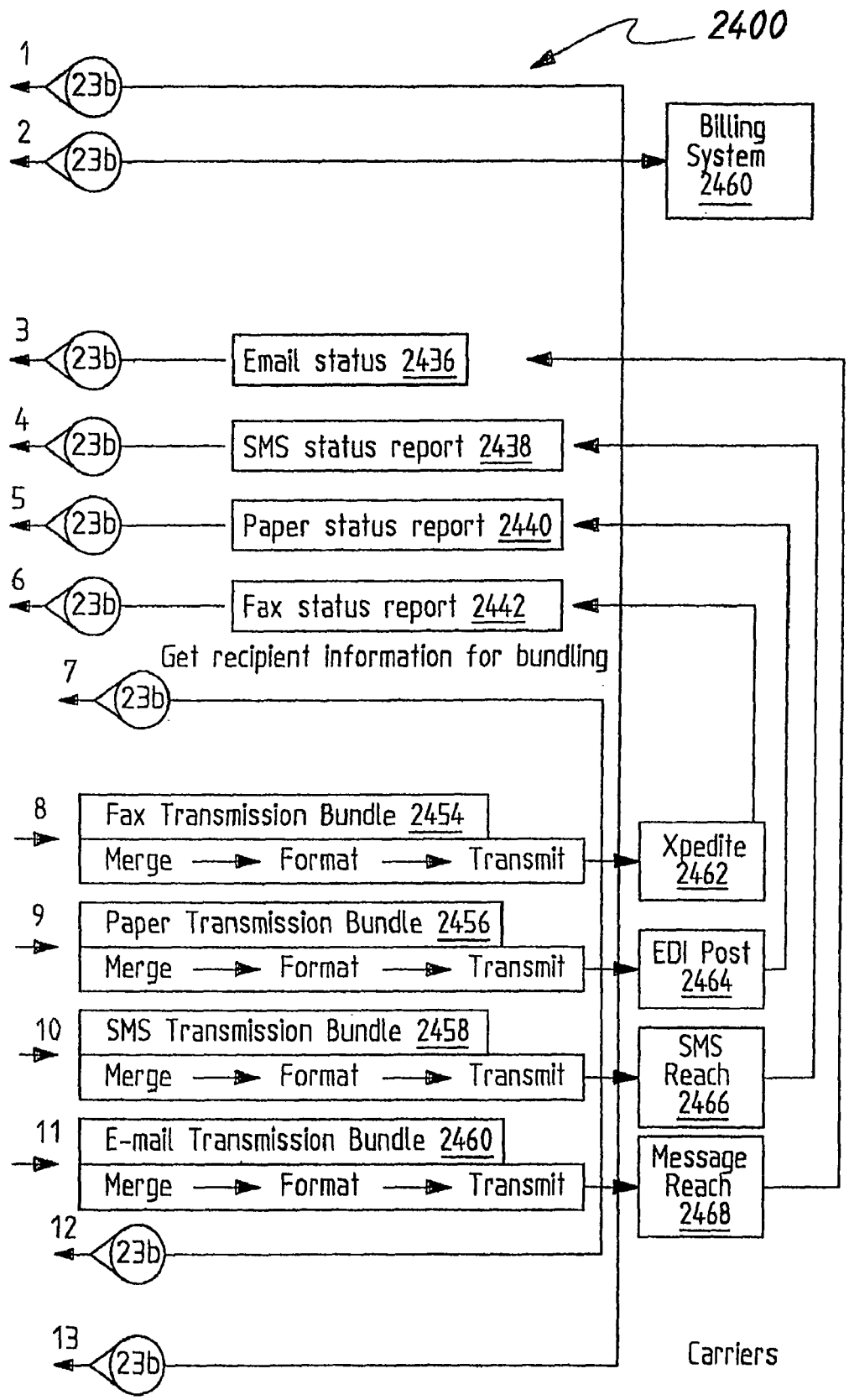

FIG. 23 is a block diagram illustrating the architecture of the message broadcasting system 2400. The system 2400 comprises a front end 2410 and a back end 2420. A user 2402 can retrieve a job status report using module 2412, submit a job using the standard interface 2414, and submit a job using the enterprise interface 2416, all in the front end 2410. An FTP file 2404 may be provided to the enterprise interface 2412.

In the standard interface 2414, job information is received from the user 2402, and recipient lists and templates are uploaded. "Validate" is invoked to check recipient list. The submit request is received from the user, and the "submit" process is invoked.

From interface 2414, the standard job submission processor 2424 of the back end 2420 validates or checks the input data and submits the job. This involves converting the recipient list to XML and storing the job in the job queue. Processing then continues at flux module 2432.

The enterprise interface receives job information from the user 2402 and also uploads the recipient list. The recipient list is checked by invoking the validate process. The submit request is received from the user and submit is invoked to process the request. From the interface 2416, processing continues at the enterprise job submission processor 2426. This validates the recipient list by checking the input data, and operates the submit process, which converts the recipient list into XML and stores the job in a job queue. Processing then continues at flux 2432. The output of processors 2424 and 2426 is an event. Actions then occur from flux 2432.

The action proceeds to the bundle processor 2450. The module 2452 builds one transmission bundle for each medium type, and then initiates a process bundles thread (a, b, c and d) for each transmission bundle. These threads are depicted A, B, C and D and are coupled respectively to modules 2454, 2456, 2458, and 2460. Each of these modules 2454, 2456, 2458, and 2460 has a similar format. For example, the fax transmission bundle 2454 involves merge, format and then transmit operations. The paper transmission bundle 2456, the SMS transmission bundle 2458, and the e-mail transmission bundle 2460 have similar arrangements. The output of each bundle module is provided to a respective carrier, for example, expedite 2462, EDI post 2464, SMS reach 2466, and message reach 2468, which are all carriers. Each carrier provides a status report back to the back end 2420. Expedite 2462 provides a fax status report 2442, EDI post 2464 provides a paper status report 2440, SMS reach 2466 provides an SMS status report 2438, and message reach 2468 provides an e-mail status report 2436.

The e-mail status report 2436, the SMS status report 2438, the paper status report 2440, and the fax status report 2442 are provided to the status collector module 2434. This module 2434 is invoked periodically by Flux. 2432. It retrieves status information supplied by the carriers and applies it to the job queue. The job queue 2430 has job and template information, recipient information and status information. The job queue 2430 can provide billing records to the billing system 2460 and update status information to the bundle processor 2450. The job queue 2430 provides output to the status report module 2422, which retrieves status information, as an XML document preferably. The status report module 2422 provides the job status report that is retrieved by the module 2412 in the front end 2410. The user 2402 can retrieve the XML status report, formatted using XSL stylesheet and display it in a printer friendly format. These and other details are set forth in greater detail hereinafter.

The Job Queue

The job queue 2430 is a main component of the message distribution system 2400. The queue 2430 contains details of every message distribution system job which is currently running, waiting to run or has recently completed. Each job is represented in the database by a cluster of records of various types. Each cluster is headed by a JOB record. The record contains details of the job itself, the templates that are used, the recipients to which messages are to be sent, the merge fields, and the destinations.

During normal operation, the message distribution system 2400 scans the job queue 2430 at predefined times (e.g. every minute) and extracts details of all jobs that are running or which have recently completed. Any message distribution system Support Team browsers that are displaying the 'console' panel access this data extract and use the data obtained to display the current status of jobs in the system. In this way, the message distribution system Support Team has an up-to-date overview of the job queue 2430.

The team makes use of the functions offered by the 'Job control' panels to influence the processing of a job (e.g., recover a faulty job, retransmit transmission bundle files, etc). Thus, the job queue provides a central point of control which can be used to smooth processing loads on the system 2400, react rapidly to customers' requests and fix unexpected problems without the need to resubmit users' jobs from scratch.

A job is placed in the job queue 2430 as soon as the job has been validated and then submitted by the user via processor 2424, or 2426. The job remains in the queue 2430 until the job has completed and for some time thereafter (to give the user time to inspect the job status report 2422 produced by the job). It may be removed by a 'garbage collection' process later.

Processing a Job

Again, FIG. 23 shows the high level architecture 2400 of the message distribution system. The large box 2400 denotes the message distribution system itself. Data structures are modules 2434, 2436, 2438, 2440, 2442, 2454, 2456, 2458, and 2460 and external entities are modules 2402, 2404, 2460, 2462, 2464, 2466, and 2468. Processes are depicted by modules 2412, 2414, and 2416 (servlets and JSPs) and modules 2422, 2424, 2426, 2434, and 2450 (session beans).

The system 2400 is essentially split into two halves, the front end 2410 and the back end 2420, and the job queue 2430 represents the 'bridge' between them:

The front end logic 2410 may be supplied by Java 'JSPs' and 'servlets' running in the Tomcat container.

The back end 2420 may comprise Java EJB 'session beans' (which, in turn, make use of EJB 'entity beans' and other Java objects) running in the JBoss container.

The front end does not access the database directly, but instead invokes session beans in the back end 2420 to do so.

The Front End

The message distribution system front end 2410 contains the logic concerned with handling the user interface. The front end 2410 is designed to provide fast response to users 2402, so lengthy processing tasks may be excluded from the front end 2410.

The front end's main function is to receive jobs submitted by users 2414, 2416 and to place them on the job queue 2430 to await processing. The diagram shows three of the more important front end processes 2412, 2414, 2416:

submitting a job via the enterprise interface 2416, submitting a job via the standard interface 2414, and requesting a job status report 2412.

There may be other front end processes but, for the sake of brevity, such processes are not included in FIG. 23.

Each 'front end' process (comprising a mixture of servlets and JSPs) has a corresponding 'back end' session bean, which performs all its database retrievals and updates. This allows the front end 2410 to provide good interactive response by freeing the servlets and JSPs from database access/locking considerations.

Flux

Whenever the front end 2410 places a job on the job queue 2430, the 'front end' (or, to be more precise, the front end's session bean) triggers a Flux event 2432. Flux is an event scheduling tool supplied by SIMS Software. The scheduling tool runs continually, as an independent process within the Java virtual machine, whenever the message distribution system 2400 is active. The tool keeps its own tables of information within the message distribution system database. These are managed entirely by Flux 2432. Flux module 2432 responds to events triggered by timers or by other processes and takes predefined actions for each one. For example, when a new job is placed on the job queue 2430, the front end's session bean defines an event to Flux 2432 to be triggered immediately (or at some future time if the user has scheduled a job to be run later). When the event is triggered, Flux 2432 invokes a session bean in the 'back end' 2430 to deal with the event.

The Back End

The 'back end' 2420 contains a set of session beans which act as 'helpers' to front end processes. The back end session beans perform the database access operations, which the front end components require. For example, EnterpriseJobSubmissionProcessorBean.java performs database operations for the servlets and JSPs that implement the enterprise job submission interface.

StatusReportBean.java collects status report information from the database for use by the servlets and JSPs which implement the 'Job status report' function AccountBean.java performs database I/O on ACCOUNT records on behalf of the servlets and JSPs which implement the account maintenance panels.

The back end 2420 also contains the session beans which perform the 'real work' of the message distribution system 2400, namely the processing of jobs obtained from the job queue 2430. The processing of a job proceeds broadly as follows:

1. The message distribution system 2400 scans all the RECIPIENT records in the job and, for each one, identifies the TRANSMISSION records linked to the first ATTEMPT record. Each one of these represents a destination to which a message must be sent as part of the first attempt. The message distribution system 2400 then generates several transmission bundles 2454, 2456, 2458, 2460 (sometimes known as 'transmission packet bundles') in memory. There is one transmission bundle 2454, 2456, 2458, 2460 per destination medium (i.e., one for fax, one for e-mail, etc,), each containing several transmission packets. Each transmission packet contains information about a recipient with a 'first attempt' destination directed to that medium.

Thus, for example, if a particular RECIPIENT record specifies 'transmissions' to both fax and e-mail in its first 'attempt', a copy of that recipient's details appears in both the fax transmission bundle and the e-mail transmission bundle.

2. The transmission bundles are then processed in parallel on different processing threads. Each transmission bundle is processed in three phases:

Merge phase—The merge values from the recipient records are substituted into the appropriate merge fields in the template(s) for that medium, thus creating a fully merged message for each recipient.

Format phase—Each message in the bundle is reformatted, if necessary, into the appropriate output format (e.g., TIFF for fax).

Transmit phase—Each transmission bundle is written to a disk file and then transmitted to a carrier (e.g., Xpedite for fax, MessageReach for e-mail, EDI Post for paper, etc.) for onward transmission to its destination.

3. The message distribution system 2400 then waits for carrier status reports to be supplied by the carrier. Each carrier 2462, 2464, 2466, 2468 produces a carrier status report for each transmission bundle received. This report 2436, 2438, 2440, 2442 indicates the result of each individual delivery of a message to a recipient. Retrieval of carrier status reports is known as status collection 2434.

4. The message distribution system 2400 uses the information in the various carrier status reports 2436, 2438, 2440, 2442 to update the recipient status information in the job queue 2430 (held in the TRANSMISSION records). This information includes success/failure codes, time transmission completed, number of pages/bytes sent, etc, etc.

Once all the various carrier status reports for the first 'attempt' have been received and placed in the job queue 2430, the message distribution system 2400 scans the recipient data in the job queue 2430 again. If there are any recipients for which the master (i.e., first) transmission of the first attempt failed, those jobs are reprocessed by the message distribution system 2400 (by repeating steps 1 to 4 above) using their 'second attempt' transmissions. If the master transmissions of any of these second attempts fail, the process is repeated once more for the third attempt transmissions.

At any time during or after the processing of a job, the customer may request a consolidated 'job status report'. This gives a complete summary of the job details, the number of recipients, and the fate of each message sent as at that instant in time. Optionally, the user can have this report automatically e-mailed to the user when the job completes. This option is indicated in the account record. The message distribution system may create a set of billing records (one for each attempted transmission to a recipient) containing full details of each transmission attempt (i.e., number of pages, number of bytes sent, success/failure status, etc.) and sends them to the Billing System 2460 where the records may be used to invoice customers.

VI. Data File Structures

The formats of several data files used by the message distribution system are described hereinafter.

Template Files

Template files can be supplied in a wide range of formats, which may be divided into two groups, namely those that can contain merge fields and those that cannot.

The first group may comprise XML Stylesheet (XSL) files, Microsoft Word (DOC) files and simple text (TXT) files.

XML Stylesheet (XSL) Files

An XML Stylesheet is a file, expressed in XML notation, which describes precisely the format of a document (including text, images, margins, headers, footers and other artifacts). The file also contains provision for defining 'merge fields'. The process of scanning a recipient file (in XML format), extracting each recipient's 'merge values', combining them with the XSL stylesheet, and producing the output document (in a format known as XSL:FO) for each recipient may be performed by a software product called Xalan (supplied by Apache). Details of XSL and XSL:FO can be found in the document: Extensible Stylesheet Language (XSL), Version 1.0, W3C Recommendation, 15 Oct. 2001, published by the World Wide Web Consortium and available at http://www.w3.org/TR/xsl.

Microsoft Word (DOC) Files

DOC files may be produced by the Microsoft Word word-processor. 'Merge fields' can be defined in a document and replaced with 'merge values' using Word's standard 'merge' facilities. In the message distribution system, merging of DOC templates may be performed by Microsoft Word itself. Word runs as a stand-alone program executing directly under the control of Windows 2000 (i.e., outside the Java Virtual Machine). The message distribution system may use Microsoft's DCOM facilities to interact with Word (i.e., to pass templates and recipient files to it and to receive the merged results).

Text Files (TXT)

Text files are simple strings of ASCII text which may, optionally, contain merge fields. Where appropriate, 'end of line' characters (ie, <CR> and <LF>) are permitted but no other formatting characters are allowed.

Other types of template, which cannot contain merge fields, include the following:

TIFF (TIF) Files

TIFF files contain images in bitmapped graphics form.

Adobe Acrobat Document (PDF) Files

The format of these files is published by Adobe.

Postscript (PRN) Files

Postscript files are specifically designed to drive a wide range of printers (and may be used by the message distribution system to produce output destined for paper). A user normally produces a Postscript file by entering text and other information into a word processor and then outputting the file to a print file (which, by default, has a file type of PRN) rather than a physical printer.

HTML (HT) Files

HTML files comprise information formatted in the HTML markup language.

Recipient Files

Users of the enterprise interface 2416 submit files to the message distribution system 2400 in a wide variety of formats, whereas users of the standard interface 2414 preferably submit them in 'comma separated values' (CSV) format. A special Java class (part of the Data Converter) is used to convert the submitted files to XML format in module 2424 or 2426 before placing them in the job queue 2430 (in the message distribution system database). This class is held within the JAVA_MAPPING_CLASS record within the job configuration held in the database. The java mapping class may make use of other artifacts to assist in the mapping process. This might include other Java classes, XFlat mapping files, and XSL stylesheets. These artifacts are kept in JAVA_MAPPING_CLASS_RESOURCE records within the job configuration held in the database.

An XFlat mapping file is a set of statements (expressed in a format conversion definition language known as XFlat), which can be submitted to the 'XML Convert utility', a program which handles a wide variety of simple format conversions.

XML Format

Figure 24B:
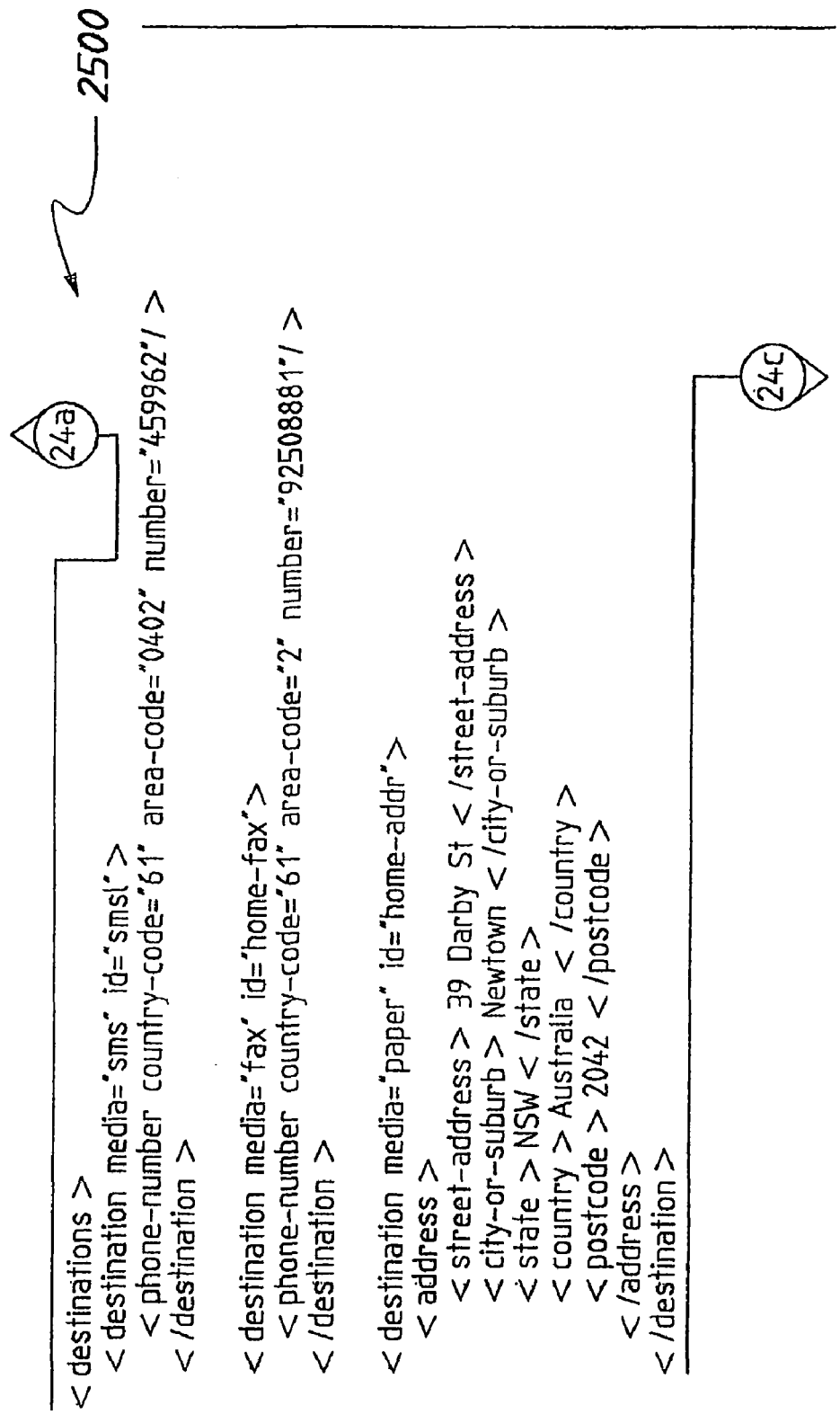
FIG. 24 illustrates an example of a recipient file in XML format.

A recipient file in XML format comprises a number of <recipient> elements, one per recipient. An example of such a file 2500 (containing just one recipient) is shown in FIG. 24. The data in this example are described briefly below:

Personal Details

The '<personal-details>' element includes sub-elements denoting the recipient's title, first name, and last name. These are used within the fax 'strip address' (whenever faxes are sent to the recipient) and as the first line of the postal address (when paper mail is sent to the recipient). An optional '<reference>' element is available, which may contain up to 10 characters of user-specified text that appears on job status reports generated by the message distribution system. The sender typically uses this element to identify the recipient by some name that is meaningful to him (e.g., employee number, bank account number, Medicare number, etc.).

Destination Preference

The '<destination-preference>' element specifies the destinations to be used for the recipient, and the redirection options to be invoked in case of failure. This element comprises one, two, or three '<attempt>' sub-elements. Each '<attempt>' sub-element specifies one, two, or three transmissions separated by spaces or commas. Each 'transmission' corresponds to an 'id' attribute in a '<destination>' field and thereby denotes a particular destination. The first transmission specified is the 'master'. In the case of fax, each 'transmission' includes up to three retries.

Destinations

One '<destination>' element may be allowed for each medium type (as denoted by the 'media' attribute). If no element is provided for a particular medium, this means that the recipient cannot be reached by that medium. The 'id' attribute is used as a link to the '<attempt>' element described earlier and may comprise any convenient identifier. The sub-elements of the '<destination>' element specify the actual destination itself.

Two styles of paper address are permitted. FIG. 24 shows the parsed form. An unparsed address can also be entered using the elements:

---

<address-line-1> </address-line-1>,
<address-line-2> </adddress-line-2>
... ...
<address-line-6> <address-line-6>.

---

Recipient Data

The '<recipient-data>' element comprises the merge fields. In the above example, there is one merge field representing a single line on an invoice, and this contains several sub-merge-fields representing the items of information within that line. However, this is simply an example. The '<recipient-data>' field allows complete freedom of format (provided it contains well-formed XML).

VII. The Database Structure

Figure 25A:
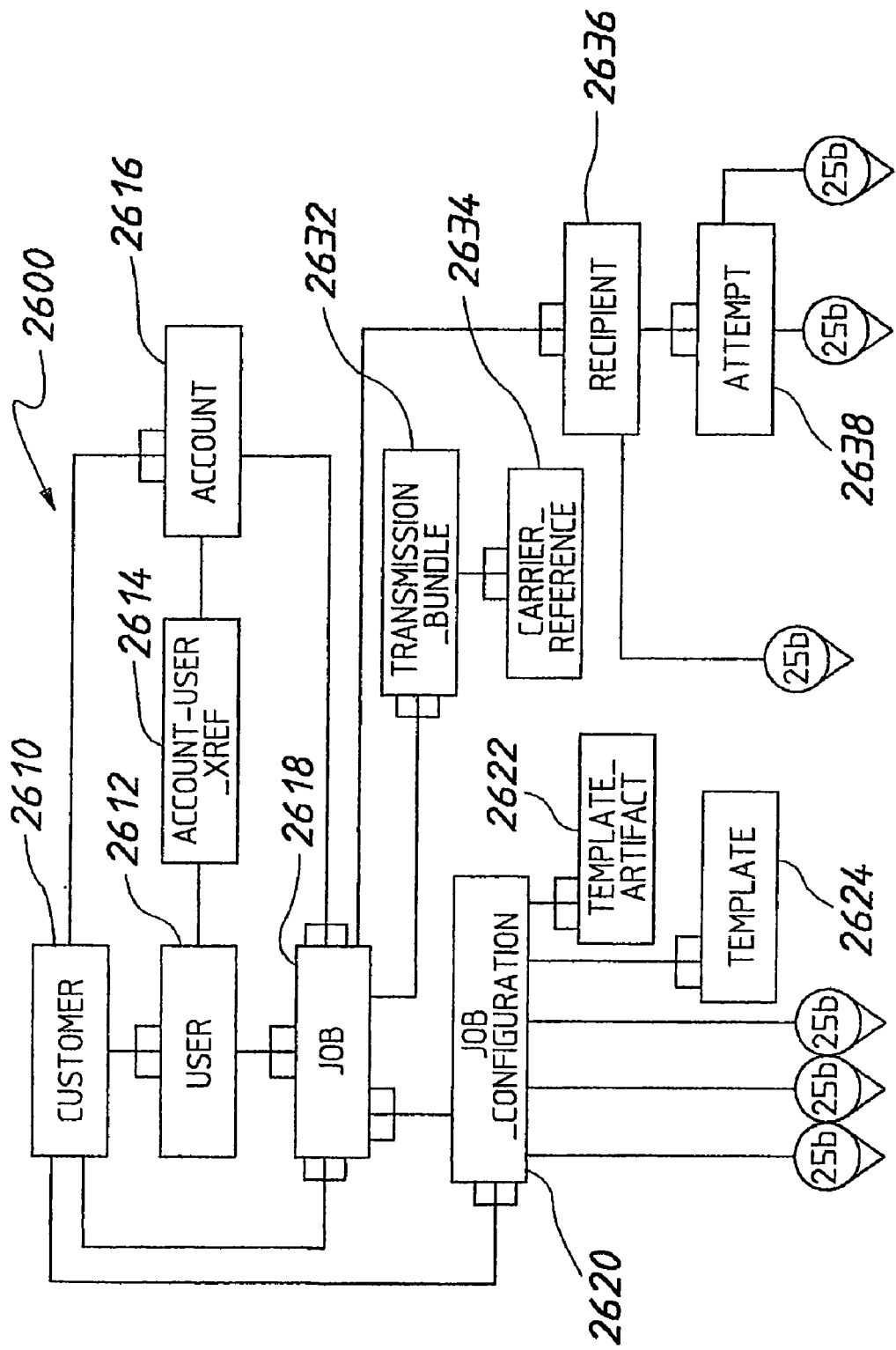
FIG. 25 is an entity relationship diagram of the database structure.
Figure 25B:
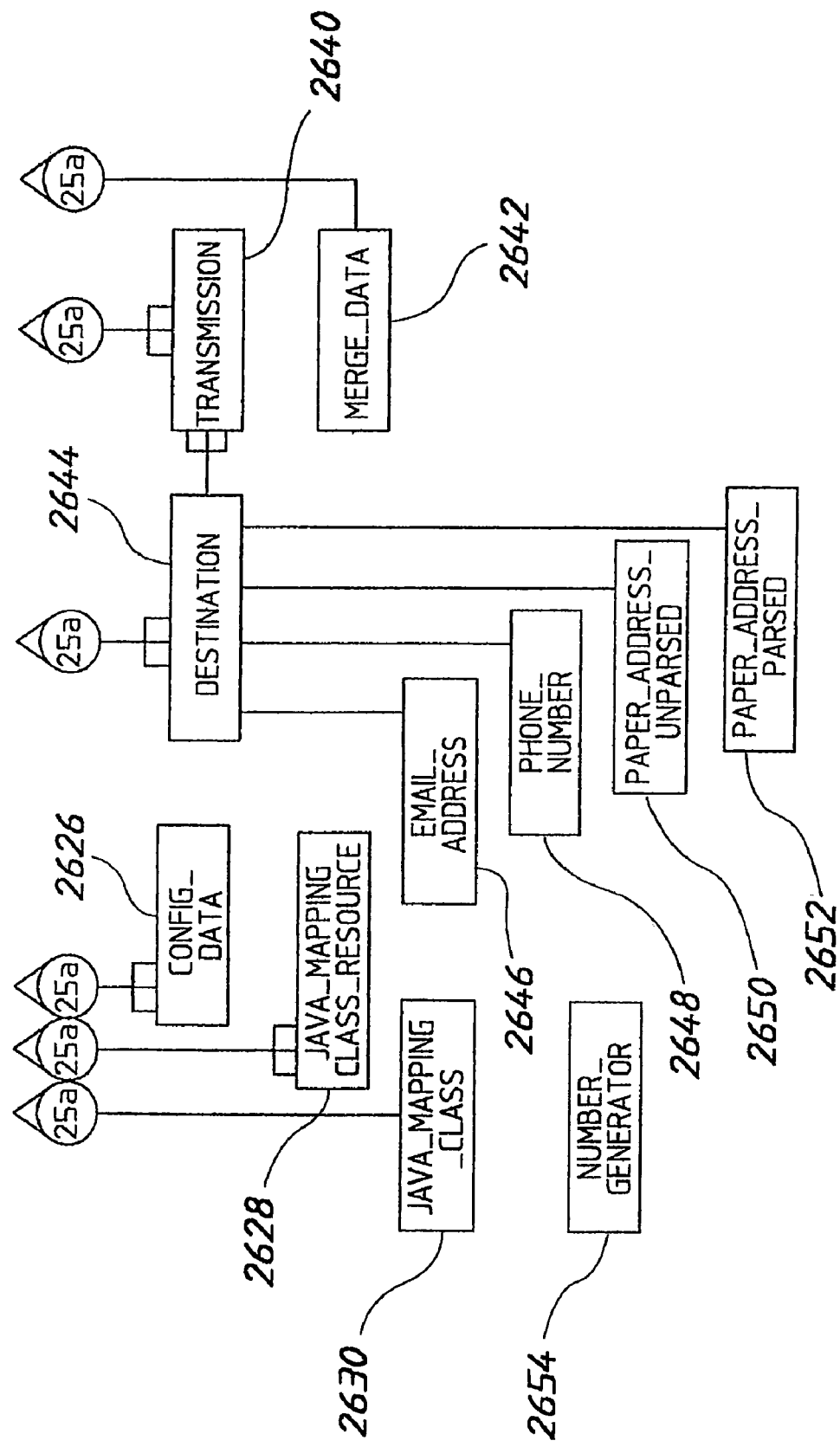

The message distribution system database contains a variety of tables. FIG. 25 is an entity relationship diagram, 2600 showing the tables and relationships. In FIG. 25, a 'many to one' correspondence between database tables is denoted by 'crows feet' on the 'many' side of the relationship.

Each table (variously referred to as 'record' or 'entity') and the columns (sometimes referred to as 'fields') within the table are described hereinafter. Every table contains a unique primary key preferably named 'xxxx_PK' (where 'xxxx' is the name of the table). This key is required for database replication reasons and is usually automatically generated.

Customers, Accounts and Users

The message distribution system has information relating to customers, accounts and billing preferences. The message distribution system only requires a subset of this information. For this reason, customers may be provided with direct online access to the billing system so that the customers have direct control over their accounts and billing preferences (and the message distribution system subset is downloaded to the message distribution system when necessary).

Data may be duplicated manually between the message distribution system and the billing system. If so, the amount of such data kept within the message distribution system may be kept to a minimum. The message distribution system stores customer-related information as three primary entities, namely customers 2610, users 2612, and accounts 2614. Each customer 'owns' and administers his own group of users and accounts. The database tables and each field are described hereinafter.

Customer

This table 2610 represents the customer and is an 'anchor point' in the database, to which all other entities are linked.

- customer_PK: Automatically generated unique primary key.
- id: The customer identifier. This n-character (n may be 8) identifier uniquely identifies the customer. Each of a customer's users enter this customer id when the user logs on to the message distribution system.
- name: The customer's name (e.g., ABC Banking Corporation). This field appears on various screens and reports concerning the customer.
- timezone_code: Identifies the timezone within which the customer resides.
- enabled: A boolean flag that indicates whether the customer is enabled or disabled. A disabled customer is not allowed to access the message distribution system (i.e., none of the customer's users may log on).
- enabled_change_time: Indicates the date/time when the 'enabled' flag was last changed. A customer who has been disabled for a long period is deleted from the database.
- ftpjobSubmission: Set to 'true' if this customer can submit jobs via FTP.

User

A user record 2612 contains information about a user (i.e., a human being who accesses the message distribution system). The actual name of this table in the database is 'USER_'. The trailing underscore character has been added to avoid conflicts with the SQL reserved word 'user'.

- user_PK: Automatically generated unique primary key.
- id: The user identifier. This n-character (n may be 8) identifier uniquely identifies the user. The user must enter this user id when the user logs on to the message distribution system.
- name: The user name (e.g., Mary Smith). This field appears on various screens and reports concerning the user.
- password: The user's password, which may be entered for log on.
- customer_FK: Link to the customer who 'owns' this user.
- email, phone_number, fax_number, mobile_number: These fields may comprise contact information for the user (so that the message distribution system Support Team can contact the user if necessary).
- test_email, test_fax_number, test_sms_number: These fields contain the user's e-mail address, fax number and SMS phone number to be used as destinations for test jobs.
- enabled: A boolean flag that indicates whether the user is enabled or disabled. A disabled user is not allowed to access the message distribution system.
- enabled_change_time: Indicates the date/time when the 'enabled' flag was last changed. A user who has been disabled a prescribed period of time may be deleted from the database.
- administrator: A boolean flag that indicates whether the user is an administrator user or not. Administrator users have certain privileges not available to standard users.

Account

The account record 2616 contains information about an account. Each account 2616 defines characteristics and constraints placed upon jobs run under that account.

- account_PK: Automatically generated unique primary key.
- name: The account name. This is a 'meaningful' name that is useful to the customer as a reminder of the purpose of the account.
- customer_FK: Link to the CUSTOMER record for the customer who 'owns' this account.
- enabled: A boolean flag that indicates whether this account is enabled or disabled. A disabled user is not allowed to access the message distribution system.
- enabled_change_time: Indicates the date/time when the 'enabled' flag was last changed. An account that has been disabled for a prescribed period of time may be deleted from the database.
- enterprise: Indicates whether this account requires the standard or enterprise interface for job submission.
- product: A code that indicates the message distribution system features available under this account.
- fax_carrier, fax_carrier_user, fax_carrier_password,
- email_carrier, email_carrier_user, email_carrier_password,
- sms_carrier, sms_carrier_user, sms_carrier_password,
- paper_carrier, paper_carrier_user, paper_carrier_password:

The 'xxx_carrier' field contains a three-character identifier for the carrier to be used for medium 'xxx'. Current values are:
  XPD for Xpedite, EDI for EDI Post, MSR for MessageReach, SMR for SMSReach.

The 'xxx_carrier_user' and 'xxx_carrier_password' fields are used internally by the message distribution system when transferring files to the carrier by FTP. Other identifiers may be used, including for different carriers.
- fax_quality: Output quality for faxes (standard or enhanced).
- fax_max_page_size: The maximum size of a fax page in bytes.
- fax_cover_page: A boolean value indicating whether or not to generate fax cover pages for jobs submitted under this account.

fax_company, fax_address_1, fax_address_2, fax_address_3: The company name and address in these fields is printed on the cover page of each fax.

email_from_address: The e-mail address which the message distribution system-generated e-mails reaching recipients appear to have come from.

email-timeout: The maximum time (preferably in hours from start of job attempt) for which an e-mail may be outstanding. When this time is reached, all outstanding e-mails are assumed successful and the next attempt begins.

email_job_status_address: The e-mail address to which job status reports are sent.

User_Account_Xref

This 'cross-reference' entity 2614 specifies a single valid combination of users 2612 and accounts 2616. For each user, this entity defines the accounts the user may specify when the user submits the message distribution system job. For each account, this entity 2614 defines the users which may use the entity.

user_account_xref_PK: Automatically generated unique primary key.
user_FK: Link to a USER record.
account_FK: Link to an ACCOUNT record.

The Job Queue

The job queue exists as a set of tables within the message distribution system's relational database 2600. In the entity relationship diagram of FIG. 25, job queue entities are:
2618, 2632, 2634, 2640; 2620, 2622, 2624, 2626, 2628, 2630; and 2636, 2638, 2642, 2644, 2646, 2648, 2650, and 2652.

Records 2636, 2638, 2642, 2644, 2646, 2648, 2650, 2652, 2620, 2622, 2624, 2626, 2628, and 2630 do not change once the job queue entry has been created whereas the records 2618, 2632, 2634, and 2640 are updated from time to time to indicate the state of job processing.

The records 2636, 2638, 2642, 2644, 2646, 2648, 2650 and 2652 are set up at job submission time. The records 2620, 2622, 2624, 2626, 2628, 2630 are also set up at job submission time for the standard interface but, in the case of the enterprise interface, may be set up by the message distribution system Support Team when the job is first implemented and retained across several jobs.

Job

At the top of the job queue hierarchy is the JOB record 2618. There is one of these for each job in the queue and the JOB record 2618 constitutes the 'anchor' record for all information related to a job.

job_PK: The jobid is a numeric identifier generated by the message distribution system, which uniquely identifies this job. The identifier appears on output related to the job (such as the job status report) and is displayed on the 'confirmation screen' when the user submits a job.
user-reference: A user-generated name for the job, which is included on the various message distribution system/ billing reports and may contain any text the user wishes.
job_configuration_FK: Link to the JOB_CONFIGURATION record for this job.
account_FK: Link to the ACCOUNT record for the account under which this job runs.
user_FK: Link to the USER record for the user who initiated this job.
submit_time: The date and time the job was submitted.
fax_only: Means 'send faxes to all recipients with a fax address defined'.
sms_only: Means 'send SMS messages to all recipients with an SMS address defined'.
email_only: Means 'send e-mails to all recipients with an email address defined'.
fax_preferred: Means 'send to all recipients by fax (if fax address defined); otherwise e-mail'.
email_preferred: Means 'send to all recipients by e-mail (if e-mail address defined); otherwise fax'.
job_submission_folder: The name of the folder where the various job artifacts (templates, recipient files, transmission bundle files, etc.) are stored.
master_status: Overall job status.
master_change_time: The date and time the master_status was last changed.

Job Configuration Information

The cluster of records comprising record types JOB_CONFIGURATION 2620, TEMPLATE 2624, TEMPLATE_ARTIFACT 2622, CONFIG_DATA 2626, JAVA_MAPPING_CLASS_RESOURCE 2628 and JAVA_MAPPING_CLASS 2630 defines various artifacts and configuration used by a job.

For a job submitted using the enterprise interface, this cluster of records is defined when the job is first set up by the message distribution system Support Team. The cluster of records is used by many jobs and remains unchanged from job to job. The cluster includes the contents of various data files (templates, images, etc.), each of which may be 'imported' into the database record as a binary object (BLOB) by the message distribution system Support Team when the cluster is set up.

For a job submitted using the standard interface, this cluster of records is created at the time the job is submitted and is relevant for that particular job. The templates are referred to from within the cluster but are not actually stored within the database itself; rather the templates are held separately as a flat file.

Job_Configuration

This record 2620 is the 'anchor' for the job configuration record cluster.

job_configuration_PK: Automatically generated unique primary key.
display_name: This is a name for the job configuration that is meaningful to the customer and is used on the job submission screen (the 'job type') to select the job configuration. This field is only defined for enterprise interface jobs.
enterprise: A boolean flag that indicates whether this job configuration applies to the enterprise or standard interface.
customer_FK: Link to the CUSTOMER record which 'owns' all jobs using this job configuration.

Template

This record 2624 defines a template (i.e., a mergeable Microsoft Word, XSL or text document, or a non-mergeable document in PDF, TIFF, HTML or postscript format). For enterprise interface jobs, the template 2624 itself is held within this record as a binary image. For standard interface jobs, the template 2624 is held outside the database as a flat file (within the job submission folder).

template_PK: Automatically generated unique primary key.
filename: The filename of the file that constitutes this template.
filetype: The filetype of the file that constitutes this template.

attach_name: This name is only defined for e-mail attachment templates, and is the name given to the attachment file (excluding the file type) when sent to the recipient.

media_type: Indicates the medium that this template applies to.

fo_rendering_engine: This is only defined for paper templates and contains the name of the FO rendering engine used by the message distribution system to produce postscript output (currently XEP or FOP).

job_configuration_FK: Link to the JOB_CONFIGURATION record.

component_type: Indicates which component of the final recipient message this template defines. For fax, this may be 'subject' or 'other'. For e-mail, it may be 'subject', 'body' or 'attachment'. For paper and SMS it is undefined.

component_sequence: This is the sequence number of the component, which is defined if component_type is not 'attachment'. This field represents the sequence number of this attachment within the message. For example, e-mail attachments for a four-attachment e-mail message would be numbered 1, 2, 3 and 4.

template: This field is only valid for enterprise interface templates and contains the template itself. (For standard interface jobs, the template is kept in a flat file in the job submission folder.)

Template_Artifact

This record 2622 denotes images and other multimedia files used by the TEMPLATE records 2624 in this JOB_CONFIGURATION 2620. This record is defined for enterprise interface jobs (which use XSL templates).

template_artifact_PK: Automatically generated unique primary key.

filename: The filename of the file from which this artifact was imported.

filetype: The filetype of the file from which this artifact was imported (typically GIF or JPG).

job_configuration_FK: Link to the JOB_CONFIGURATION record.

artifact: Contains the artifact itself

Config_Data

This record 2626 contains configuration data that is specific to a media type. The record is used for paper and contains information such as which paper feeder bins to use, whether to print double sided, etc. This record is defined for enterprise interface jobs.

config_data_PK: Automatically generated unique primary key.

filename: The filename of the file from which this config data was imported.

filetype: The filetype of the file from which this config data was imported (typically TXT).

media_type: Indicates the medium which this configuration data applies to.

job_configuration_FK: Link to the JOB_CONFIGURATION record.

configuration: The configuration data itself. FIG. 26 is an example of a typical configuration 2700 for a paper job submitted to EDI Post.

Java_Mapping_Class

This record 2630 is mandatory and contains a Java class that is used to convert the recipient file to XML (possibly also making use of one or more JAVA_MAPPING_CLASS_RESOURCE records). Standard interface jobs use CSV-formatted recipient files, so those jobs utilise a standard java mapping class called 'CSVMapping.class'.

java_mapping_class_PK: Automatically generated unique primary key.

filename: The filename of the file from which this java class was imported.

filetype: The filetype of the file from which this java class was imported (typically CLASS).

job_configuration_FK: Link to the JOB_CONFIGURATION record.

class: Contains the Java class.

Java_Mapping_Class_Resource

This record 2628 is optional and contains resource objects used by the Java mapping class for reformatting the recipient list information. The record 2628 may contain any type of resource, for example, other java classes, XML stylesheets, or statements in the XFlat language (for input to the 'XML Convert' product).

java_mapping_class_resource_PK: Automatically generated unique primary key.

filename: The filename of the file from which this XFlat mapping data was imported.

filetype: The filetype of the file from which this XFlat mapping data was imported.

job_configuration_FK: Link to the JOB_CONFIGURATION record.

resource_data: Contains the resource itself.

FIG. 27 shows an example 2800 of one type of resource that might be stored in this record. The XFlat statements converts a CSV file to XML. The CSV file comprises three fields per record representing 'refno', 'name' and 'salary'.

Recipient Information

The RECIPIENT, ATTEMPT, TRANSMISSION, MERGE_DATA, DESTINATION, PAPER_ADDRESS_PARSED, PAPER_ADDRESS_UNPARSED, PHONE_NUMBER, and EMAIL_ADDRESS records 2636, 2638, 2640, 2642, 2644, 2652, 2650, 2648, 2646, respectively, define the recipient information for a job.

Recipient

Each of these records 2636 represents one recipient.

recipient_PK: Automatically generated unique primary key.

job_FK: Link to the JOB record for this job.

title: The recipient's title (Mr, Mrs, Dr, etc).

first_name: The recipient's first name.

last_name: The recipient's last name.

user_data: A user-defined data field typically used to identify this recipient from a user's perspective.

Attempt

Up to three ATTEMPT records 2638 may exist per recipient. Each one represents one '<attempt>' as specified in the recipient list record. The ATTEMPT records 2638 are sequence numbered so that the records can be accessed in the correct order. The ATTEMPT record's purpose is to group the TRANSMISSION records under it.

attempt_PK: Automatically generated unique primary key.

recipient_FK: Link to the RECIPIENT record.

seq_number: Sequence number of this attempt (1, 2 or 3).

Transmission

Up to three TRANSMISSION records 2640 may exist per attempt. Each one represents a transmission specified in the '<attempt>' element in the recipient list record. The TRANSMISSION records 2640 are sequence numbered so that the records can be accessed in the correct order. The first one (always sequence number '1') represents the master transmission (which causes redirection if it fails).

The following fields are set up when the job is placed in the job queue:
- transmission_PK: Automatically generated unique primary key.
- destination_FK: Link to the DESTINATION record.
- attempt_FK: Link to the ATTEMPT record.
- account_FK: Link to the ACCOUNT record for this job.
- recipient_FK: Link to the RECIPIENT record.
- transmission_bundle_FK: Link to the TRANSMISSION_BUNDLE record.
- job_FK: Link to the JOB record for this job.
- destination_country: Country or area to which the message was delivered.
- delivery_success_failure_code: Carrier's code indicating the success or reason for failure of the transmission.

Merge_Data

The merge data 2642 from the recipient record is stored here in XML text form here.
- merge_data_PK: Automatically generated unique primary key.
- recipient_FK: Link to the RECIPIENT record.
- merge_data: Contains the merge data itself as a string of XML-formatted text Destination For each recipient, there is a DESTINATION record 2644 for each medium (i.e., a maximum of four). The record contains the 'media id' (indicating fax, paper, SMS or e-mail) and 'points to' a single 'sub-record' which is one of the following record types.)
- destination_PK: Automatically generated unique primary key.
- recipient_FK: Link to the RECIPIENT record.
- media-type: Indicates the medium which this destination denotes and thereby indicates the type of destination address (see below) to look for.

Paper_Address_Parsed

This record 2652 contains an unparsed paper destination address.
- paper_address_parsed_PK: Automatically generated unique primary key.
- destination_FK: Link to the DESTINATION record.
- street_address: Street number and name.
- suburb: Suburb.
- state: State.
- postcode: Post code,
- country: Country.

Paper_Address_Unparsed

This record 2650 contains a parsed paper destination address.
- paper_address_unparsed_PK: Automatically generated unique primary key.
- destination_FK: Link to the DESTINATION record.)
- address_line__1: Line 1 of address.
- address_line__2: Line 2 of address.
- address_line__3: Line 3 of address.
- address_line__4: Line 4 of address.
- address_line__5: Line 5 of address.
- address_line__6: Line 1 of address.

Phone_Number

This record 2648 contains a phone number (i.e., a destination address for SMS or fax).
- phone_number_PK: Automatically generated unique primary key.
- destination_FK: Link to the DESTINATION record.
- country_code: Country code.
- area_code: Area code.
- local_number: The remainder of the phone number.

Email_Address

This record 2646 contains an e-mail destination address.
- email_address_PK: Automatically generated unique primary key.
- destination_FK: Link to the DESTINATION record.
- email_address: E-mail address.
- is_valid: A boolean value indicating whether the address syntax is valid or not.

Transmission Bundle Information

When the message distribution system processes a particular job transmission attempt, the system sorts the recipients into 'transmission bundles' each targeted at a particular medium. Each transmission bundle is transmitted to a carrier and the fate of the transmission is eventually passed from the carrier back to the message distribution system. A TRANSMISSION_BUNDLE record 2632 is created for each transmission bundle and is used to track its status.

Transmission_Bundle

There is one TRANSMISSION_BUNDLE record 2632 for each transmission bundle. The record 2632 is created when the bundle itself is created and deleted when the job is finally deleted from the database.
- transmission_bundle_PK: Automatically generated unique primary key.
- job_FK: Link to the JOB record for this job.
- attempt: Sequence number of this attempt (1, 2 or 3).
- media_type: Indicates the medium for which this transmission bundle is destined.
- creation_time: Date and time this record was created.
- bundle_status: Processing status of this transmission bundle. See Section 5.3.1.
- status_change_time: Date and time that bundle_status was last changed.

Carrier_Reference

There is one CARRIER_REFERENCE record 2634 for each transmission bundle file sent to a carrier for a particular medium type and job id. The record 2634 is created when the transmission bundle file itself is created and deleted when the job is finally deleted from the database.

In most cases, an attempt only produces one transmission bundle file per media type but in some cases (e.g., fax transmission bundle files destined for Xpedite and exceeding 10 Mbytes), the file may be split into several separate files. For this reason, there may occasionally be several CARRIER_REFERENCE records 2634 per TRANSMISSION_BUNDLE record 2632.
- carrier_reference_PK: Automatically generated unique primary key.
- transmission_bundle_FK: Link to TRANSMISSION_BUNDLE record.
- carrier_id: An identifier supplied by the carrier to uniquely denote this transmission bundle file. This identifier may be used by the message distribution system to poll for feedback information from the carrier. The format of the field varies from one carrier to another.
- transmission_bundle_filename: Name of the transmission bundle file.
- status_collected: A boolean value which indicates whether the carrier status report has been received from the carrier for this transmission bundle file. If set to 'true' the information has been received and applied to the TRANSMISSION records.

Miscellaneous

Number-Generator

This is a singleton record 2654 that is used to allocate unique job ids to new jobs and unique record keys to other records.

number_generator_PK: Automatically generated unique primary key.
    job_number: The next job id to be assigned.
    general_number: The next general number to be assigned (used as record keys for all records other than JOB records).

VIII. Java Mapping Classes and XSL Templates

The message distribution system is designed as a generalised message processing engine. The 'core' of the message distribution system itself is designed to broadcast messages of any type to any destination. However, the job types' (aka 'job configurations') of each the message distribution system customer have special processing characteristics. These fall into two categories:

validating and reformatting the recipient files received from the customer, and
    substituting merge values into merge fields in the template to generate each individually tailored recipient message.

These processing categories are referred to as Java Mapping Class processing and template merge processing, respectively. These processing categories both involve processing that is specific to each customer and job type, and the programs/stylesheets for each are developed as part of the procedure for setting up a new job type on the system. Furthermore, the development of the programs/stylesheets may be performed by a development team that is separate from the team which develops the message distribution system itself.

Figure 28:
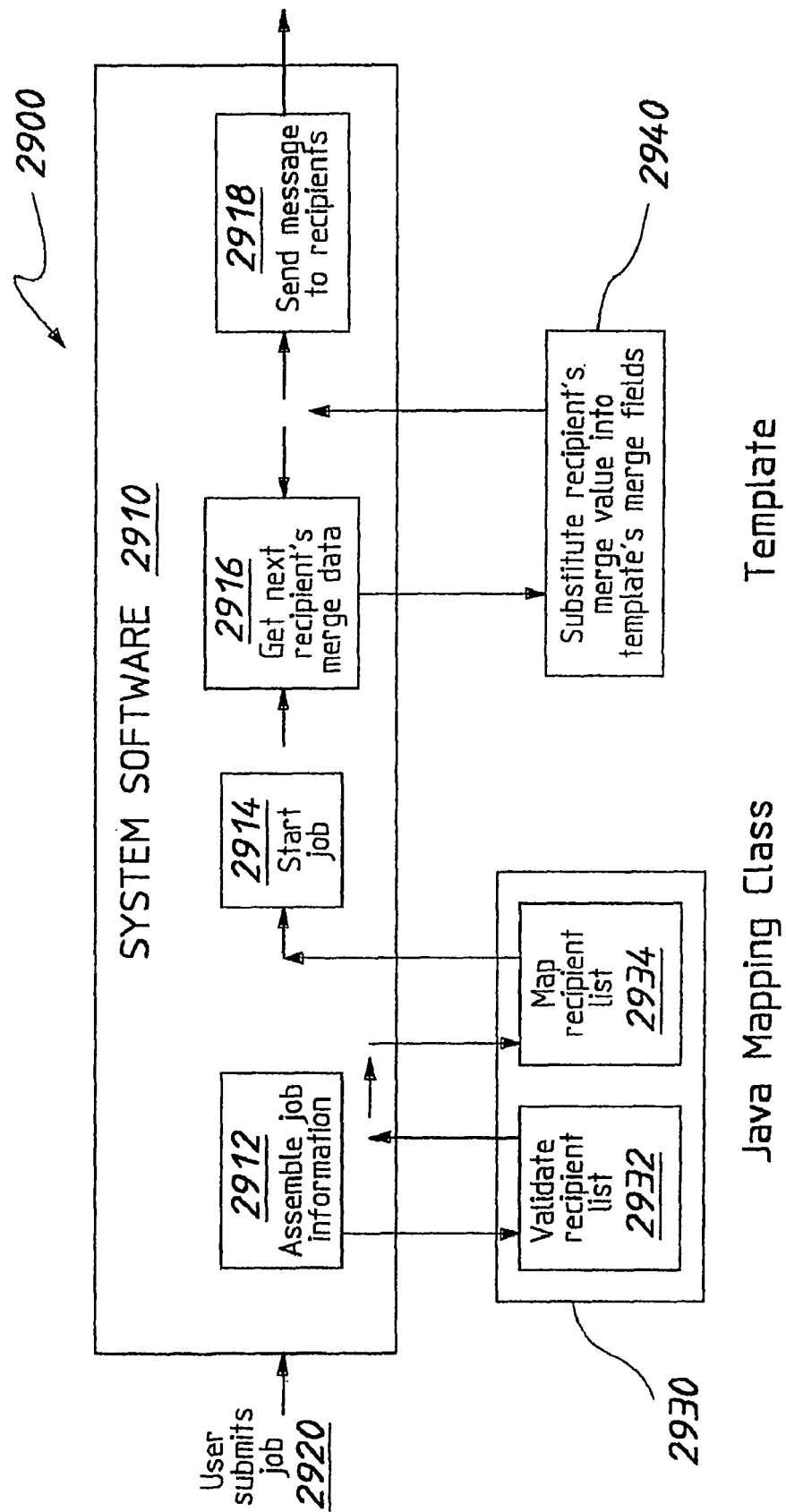
FIG. 28 is a block diagram showing the flow of job execution.

FIG. 28 is a block diagram of the flow of job execution illustrates how the processing path 2900 of a job passes from the message distribution system 'core' 2910 to the Java Mapping Class 2930 and template 2940 and back again.

The 'core' of the message distribution system 2910 is invariant. The system software 2910 represents a generalised platform upon which any type of the message distribution system job can be run. The customer-specific components 2930 and 2940 are different for each job type.

In step 2920, the user submits a job to the system software 2910. The job information is assembled in step 2912. In the Java Mapping Class 2930, the recipient list is validated in step 2932. Then the recipient list is mapped in step 2934. Processing then continues in the system software 2910, when the job is started in step 2914. In step 2916, the next recipient's merge data is obtained ("get"). The template 2940 substitutes the recipient's merge values into the template's merge fields. The messages are sent in step 2918 to recipients; also the next recipient's merge data is obtained in step 2916.

Java Mapping Classes

A Java Mapping Class 2930 (otherwise known as a Data Converter) is a powerful feature of the message distribution system 2900. This class 2930 allows a customer's recipient data to be supplied to the message distribution system in any format. The Java Mapping Class 2930 is a separate adjunct to the message distribution system 2910 itself which is tailored for specific customers' jobs. The class 2930 converts all customers' recipient lists into the message distribution system's standard format as described in Section VI. The class 2930 also offers the capability to make universal changes to a customer's recipient lists automatically. For example, a Java Mapping Class 2930 may implement a universal requirement such as "send by fax to all recipients in NSW but by e-mail to other recipients". There is one java mapping class 2930 for each job type (aka 'job configuration'), whose function is to validate 2932 recipient files received from a customer and to convert 2930 them into the message distribution system's standard recipient list format.

The class 2930 provides two major methods, 'validate' and 'map' which are called by the message distribution system when necessary. The Java Mapping Class 2930 itself is kept in the database (in a JAVA_MAPPING_CLASS record) and the various resources which the class needs (i.e., XFlat schemas and XSLT stylesheets) are also kept in the database (in JAVA_MAPPING_CLASS_RESOURCE records).

The Special Java Mapping Class Environment

The class file of a Java Mapping Class is not stored within a JAR file like other the message distribution system classes; instead this file is kept within the database, in a JAVA_MAPPING_CLASS record, as part of the Job Configuration. The message distribution system automatically reads the class file into memory from the database whenever the class file is needed and then loads the file using a special message distribution system subclass of the Java ClassLoader (referred to here as the 'special ClassLoader').

The Java virtual machine distinguishes all classes by the ClassLoader used to load the classes. Classes loaded by a particular ClassLoader can only access other classes which are specifically designated on the 'classpath' for that ClassLoader. The Java virtual machine is split into separate 'worlds'. All classes that are loaded with the same ClassLoader can access each other directly but a class in one 'world' cannot easily access a class in another 'world'. The term 'world' has been coined here to describe this concept.

This Java feature has been deliberately used to restrict Java Mapping Classes from accessing the message distribution system 'core' classes. Java Mapping Classes operate in a different 'world' from the rest of the message distribution system:

Core of the message distribution system classes can access all the standard Java SDK packages (java.io, java.util, etc.) and all the custom-developed the message distribution system packages.
    Java Mapping classes can access all the standard Java SDK packages (java.io, java.util, etc.) and the special Java Mapping Class package (com.system.mapper) only.

Thus Java Mapping Classes are 'divorced' from the message distribution system and cannot access the message distribution system classes at all, so Java Mapping Classes can be enhanced or amended without requiring corresponding changes to the message distribution system itself. This significantly simplifies system administration and protects the system against 'rogue' Java Mapping Classes.

The message distribution system itself and its Java Mapping Classes can be visualised as separate 'islands' within the same Java virtual machine. The message distribution system passes arguments to the Java mapping classes using the 'reflection API' (ordinary method invocations do not work).

Regarding the argument-passing mechanism, as a practical example, consider how the job information (job id, job reference, job submission folder and recipient files) for an enterprise job is passed from the message distribution system to a Java Mapping Class.

The message distribution system includes a class called 'EnterpriseJobSubmission' that contains all this information and more (stored in a variety of formats including simple strings and other the message distribution system-defined classes). An obvious strategy is to simply pass the EnterpriseJobSubmission object to a 'setJobSubmission' method in the Java Mapping Class. This fails, because the Java Mapping Class has no knowledge of the 'EnterpriseJobSubmission' class since the definition of this class is not included in the classpath supplied to the ClassLoader that was used to load the Java Mapping Class. In short, the Java Mapping Class is only aware of classes in its own 'world'; the class knows nothing of classes in the message distribution system's 'world'. However, each Java Mapping Class is aware of a class called 'EnterpriseJobSubmissionData'. This class definition is part of the Java Mapping Class's own 'world' (and therefore is not part of the message distribution system's world). So, before invoking the Java Mapping Class, the message distribution system creates an instance of EnterpriseJobSubmissionData (using the special ClassLoader) and places the necessary data (ie, job id, job reference, job submission folder and recipient files) into the instance using its 'setter' methods. The message distribution system has to invoke these setter methods by reflection because the object exists in the other 'world'. The message distribution system then creates an instance of the Java Mapping Class itself (again using the special ClassLoader). Finally, the system passes the EnterpriseJobSubmissionData object to the Java Mapping Class 2930 using one of its 'setter' methods.

The Java Mapping Class 2930 can access this object and store the object in one of its member variables in the usual way, because the object is within its own 'world' and all the objects which it contains are simple objects (Strings, Arrays, Files, etc.) that are part of the standard Java environment. Passing of information between the message distribution system and Java Mapping Classes 2930 uses the technique just described.

Java Mapping Class Methods

A Java Mapping Class for an enterprise interface job must extend the EnterpriseMapper class (which, in turn, extends the Mapper class) and must also implement the CustomMapper interface. This requires the methods shown in Table 5:

Methods, systems, and computer program products have been disclosed for bulk communication of information to a single set of recipients via multiple delivery media based on the recipients' delivery preferences and incorporating escalation. While only a small number of embodiments have been described, it will be apparent to those skilled in the art that, in the light of this disclosure, modifications and/or substitutions may be made without departing from the scope and spirit of the invention.

We claim:

1. A computer implemented method for bulk communication of information to recipients via multiple delivery media including facsimile, email, and SMS messaging, said method including the steps of:

receiving and processing information for distribution including information regarding recipients and including information on the recipients' delivery preferences;

forming a plurality of documents from the information for distribution by merging the information for distribution with a template document specific to a delivery media, wherein a different template document is used for each delivery media, bundling the plurality of documents together into a plurality of bundles, each bundle containing a plurality of documents and each bundle formed of documents to be delivered over a specified delivery media of the multiple delivery media, wherein the specified delivery media is determined based on the recipients' delivery preferences;

transmitting the plurality of bundles;

receiving and processing a report for each bundle of the plurality of bundles indicating whether transmission of documents in the bundle over said specified delivery media has failed; and escalating transmission of the plurality of documents using a different delivery media of the multiple delivery media for each of said recipients for whom transmission by said specified delivery media has failed, wherein the different delivery media is determined based on the

TABLE 5

| Method Type | Method Signature | Where Defined | Description |
| --- | --- | --- | --- |
| public void | setJobSubmissionData(Object jobSubmissionData); | Mapper | Set information about the job |
| public void | SetMappingResources(ArrayList mappingResources); | Mapper | Set information about mapping resources (XFlat files, XSL templates, etc.) |
| public boolean | validate( ); | Java Mapping Class | Validate the recipient files |
| public boolean | map( ); | Java Mapping Class | Create the mapped recipient file |
| public String | GetErrorMessage( ); | Mapper | Get error message text |
| public String | getEventId( ); | Mapper | Get event id |
| public boolean | isUserError( ); | Mapper | True if user error occurred. |
| public int | getErrorCode( ); | Mapper | Get error code |
| public File | getMappedRecipientFile( ); | EnterpriseMapper | Get mapped recipient file | recipients' delivery preferences and the plurality of documents are formed again by merging the information for distribution with a template document specific to said different delivery media.

2. The method according to claim 1, wherein said received information includes two or more said template documents.

3. The method according to claim 1, further including the steps of:
converting said plurality of documents into a format suitable for said specified one or different one of delivery media for each recipient; and
sending said formatted documents to a carrier for transmission using said specified one or said different one of said delivery media,
wherein said report indicating whether said plurality of documents transmitted by said specified delivery media has failed is received from the carrier.

4. The method according to claim 1, wherein said delivery media includes archiving.

5. The method according to claim 1, wherein said delivery media includes one or more new delivery media types.

6. The computer-implemented method of claim 1, wherein one of said multiple delivery media is surface mail.

7. The method according to claim 1, wherein the information specific to each recipient is in an XML file and each said template document is an XSL template.

8. The method of claim 1, wherein the documents are bundled together prior to the step of merging the information specific to the recipient with the template document specific to the delivery media.

9. A system for bulk communication of information to recipients via multiple delivery media including facsimile, email, and SMS messaging, said system including:
means for receiving information and processing information regarding recipients and including information on recipients' delivery preferences;
means for forming a plurality of documents from information for distribution by merging the information for distribution with a template document specific to each delivery media, wherein a different template document is used for each delivery media of said multiple delivery media;
means for bundling the plurality of documents together into a plurality of bundles, each bundle formed of plurality of documents to be delivered over a specified delivery media, wherein the specified delivery media is determined based on the recipients' delivery preferences;
means for transmitting said plurality of documents;
wherein the means for bundling forms a bundle of plurality of documents together to be sent over the same delivery media and provides the bundled plurality of documents to the means for transmitting, and wherein the means for transmitting includes means for transmitting the bundled plurality of documents;
means for receiving and processing a report for each said bundle indicating whether transmission of documents in the bundle over said specified delivery media has failed; and
means for escalating transmission of said plurality of documents using a different delivery media of the multiple delivery media for each of the recipients for whom transmission by said specified delivery media has failed, wherein the different delivery media is determined based on said recipients' delivery preferences and the plurality of documents are formed again by merging the information for distribution with a template document specific to said different delivery media.

10. The system according to claim 9, wherein said received information includes two or more template documents and data specific to each recipient one that is specific to the specified one of said delivery media and another that is specific to the different one of said delivery media.

11. The system according to claim 9, wherein said one of said multiple delivery media is an archive.

12. The system according to claim 9, wherein said delivery media includes one or more new delivery media types.

13. The system of claim 9, wherein one of said multiple delivery media is surface mail.

14. The system according to claim 9, wherein the information specific to each recipient is in an XML file and each template document is an XSL template.

15. The system according to claim 9, wherein the means for bundling the plurality of documents together bundles the documents before the information specific to each recipient is merged with the template document.

16. A computer program product including a computer readable medium having a computer program recorded therein for bulk communication of information to recipients via multiple delivery media including facsimile, email, and SMS messaging, said computer program product including:
computer program code means for receiving and processing information for distribution including information regarding recipients and including information on the recipients' delivery preferences;
computer program code means forming a plurality of documents from the information for distribution by merging the information for distribution with a template document specific to the delivery media, wherein a different template document is used for each delivery media;
computer program code means for bundling the plurality of documents together into a plurality of bundles, each bundle formed of documents to be delivered over a specified delivery media of said multiple delivery media, wherein the specified delivery media is determined based on the recipients' delivery preferences;
computer program code means for transmitting the plurality of bundles; and
computer program code means for escalating transmission of said plurality of documents using a different delivery media of said multiple delivery media for each of said recipients for whom transmission by the specified delivery media has failed, wherein the different delivery media is determined based on said recipients' delivery preferences and the plurality of documents are formed again by merging the information for distribution with a template document specific to said different delivery media.

17. The computer program product according to claim 16, wherein said received information includes two or more template documents and data specific to each recipient, one that is specific to the specified delivery media and another that is specific to the different delivery media.

18. The computer program product according to claim 16, further including:
computer program code means for converting each document of at least one of the bundles into a first format suitable for said specified delivery media; and
computer program code means for sending said the formatted documents to a carrier for transmission using said specified delivery media;
wherein the computer program code means for escalating transmission of said plurality of documents using the different delivery media escalates transmission of a document dependent on a delivery report received from said carrier;

and wherein the computer program product further includes computer program code means for converting each escalated document into a second format suitable for said different delivery media, wherein the second format is different to the first format.

19. The computer program product according to claim 16, wherein one of said delivery media is an archive.

20. The computer program product according to claim 16, wherein said delivery media includes one or more new delivery media types.

21. The system of claim 16, wherein one of said multiple delivery media is surface mail.

22. The computer program product according to claim 16, wherein the information specific to each recipient is in an XML file and each template document is an XSL template.

23. The computer program product according to claim 16, wherein the computer program code means for bundling the plurality of documents together operates before the computer program code means for forming the plurality of documents by merging the information specific to each recipient with the template document.

* * * * *

UNITED STATES PATENT AND TRADEMARK OFFICE
CERTIFICATE OF CORRECTION

PATENT NO. : 7,715,032 B2  Page 1 of 1
APPLICATION NO. : 10/523153
DATED : May 11, 2010
INVENTOR(S) : Nicholas Rowland Bird et al.

It is certified that error appears in the above-identified patent and that said Letters Patent is hereby corrected as shown below:

ON THE TITLE PAGE:

On the Title page, the WO publication data is corrected to read:
Item -- (87) PCT. Pub. No. WO2004/012109
PCT Pub. Date: Feb. 5, 2004 --.

Claim 18, Col. 54, Line 63, delete "said" before --the--.

Claim 21, Col. 56, Line 1, delete "system" and insert -- computer program product --.

Signed and Sealed this

Tenth Day of August, 2010

David J. Kappos
*Director of the United States Patent and Trademark Office*